US012692382B2

(12) United States Patent
Maizuru et al.

(10) Patent No.: US 12,692,382 B2
(45) Date of Patent: Jul. 28, 2026

(54) PARTICULATE AND METHOD FOR PRODUCING PARTICULATE

(71) Applicant: KANEKA CORPORATION, Osaka (JP)

(72) Inventors: Nobuyoshi Maizuru, Hyogo (JP); Kenji Teramoto, Hyogo (JP)

(73) Assignee: KANEKA CORPORATION, Osaka (JP)

(*) Notice: Subject to any disclaimer, the term of this patent is extended or adjusted under 35 U.S.C. 154(b) by 1069 days.

(21) Appl. No.: 17/698,248

(22) Filed: Mar. 18, 2022

(65) Prior Publication Data

US 2022/0213311 A1 Jul. 7, 2022

Related U.S. Application Data

(63) Continuation of application No. PCT/JP2020/036313, filed on Sep. 25, 2020.

(30) Foreign Application Priority Data

| Sep. 27, 2019 | (JP) | ................................. 2019-177485 |
| Sep. 27, 2019 | (JP) | ................................. 2019-177487 |

(51) Int. Cl.
| *C08L 51/04* | (2006.01) |
| *C08J 3/12* | (2006.01) |
| *C08L 63/00* | (2006.01) |

(52) U.S. Cl.
CPC .............. *C08L 51/04* (2013.01); *C08J 3/122* (2013.01); *C08L 63/00* (2013.01); *C08J 2351/04* (2013.01); *C08J 2491/00* (2013.01); *C08L 2201/52* (2013.01); *C08L 2205/03* (2013.01); *C08L 2205/22* (2013.01)

(58) Field of Classification Search
CPC ..................................................... C08L 51/04
See application file for complete search history.

(56) References Cited

U.S. PATENT DOCUMENTS

| 3,284,396 | A | | 11/1966 | Talalay |
| 3,804,735 | A | | 4/1974 | Radlove et al. |
| 4,778,851 | A | * | 10/1988 | Henton .................... C08L 51/04 |
| | | | | 525/902 |
| 4,857,631 | A | | 8/1989 | Moore |
| 5,290,857 | A | | 3/1994 | Ashida et al. |
| 5,362,795 | A | | 11/1994 | Matsumoto et al. |
| 5,364,729 | A | | 11/1994 | Kmiecik-Lawrynowicz et al. |
| 5,414,045 | A | | 5/1995 | Sue et al. |
| 5,569,709 | A | | 10/1996 | Sue et al. |
| 5,708,131 | A | | 1/1998 | Morgan |
| 6,153,694 | A | | 11/2000 | Miyatake et al. |
| 2002/0013438 | A1 | | 1/2002 | Grootaert et al. |
| 2002/0052429 | A1 | | 5/2002 | Weier et al. |
| 2002/0065343 | A1 | | 5/2002 | Jang et al. |
| 2003/0040555 | A1 | | 2/2003 | Sakabe |

| 2004/0018240 | A1 | | 1/2004 | Ohmachi et al. |
| 2004/0147668 | A1 | | 7/2004 | Miyake et al. |
| 2004/0171749 | A1 | | 9/2004 | Takaki et al. |
| 2005/0163925 | A1 | | 7/2005 | Sacripante et al. |
| 2006/0241045 | A1 | | 10/2006 | Ohmachi et al. |
| 2007/0027233 | A1 | | 2/2007 | Yamaguchi et al. |
| 2007/0027263 | A1 | | 2/2007 | Furukawa et al. |
| 2007/0251419 | A1 | | 11/2007 | Yamaguchi et al. |
| 2007/0270539 | A1 | | 11/2007 | Yui et al. |
| 2007/0272119 | A1 | | 11/2007 | Ichinose et al. |
| 2008/0108750 | A1 | | 5/2008 | Terada et al. |
| 2008/0139697 | A1 | | 6/2008 | Ueda |
| 2008/0146687 | A1 | | 6/2008 | Ueda |
| 2008/0167402 | A1 | | 7/2008 | Ueda |
| 2008/0176974 | A1 | | 7/2008 | Ueda |
| 2009/0294057 | A1 | | 12/2009 | Liang et al. |
| 2010/0204404 | A1 | | 8/2010 | Hongo |
| 2010/0323022 | A1 | * | 12/2010 | Hashimoto ............. A61L 27/12 |
| | | | | 424/602 |
| 2011/0269894 | A1 | | 11/2011 | Miyamoto |
| 2011/0288201 | A1 | | 11/2011 | Gottis |
| 2012/0070482 | A1 | | 3/2012 | Heming et al. |
| 2012/0101216 | A1 | | 4/2012 | Achten et al. |
| 2012/0142820 | A1 | | 6/2012 | Yamaguchi et al. |
| 2012/0142863 | A1 | | 6/2012 | Miyamoto |
| 2012/0202080 | A1 | | 8/2012 | Ehara et al. |
| 2014/0124986 | A1 | | 5/2014 | Lima et al. |
| 2014/0213729 | A1 | | 7/2014 | Shin-Ya |

(Continued)

FOREIGN PATENT DOCUMENTS

| CN | 1090861 A | 8/1994 |
| CN | 1409727 A | 4/2003 |

(Continued)

OTHER PUBLICATIONS

ELEC-F Safety Data Sheet; Kao Corporation; Nov. 5, 2020 (Year: 2020).*
International Search Report issued in corresponding International Application No. PCT/JP2020/036313 mailed Dec. 1, 2020, with translation (4 pages).
Written Opinion issued in corresponding International Application No. PCT/JP2020/036313 mailed Dec. 1, 2020 (3 pages).
International Preliminary Report on Patentability issued in corresponding International Application No. PCT/JP2020/036313 issued Mar. 15, 2022 (4 pages).
Office Action issued in corresponding Japanese Patent Application No. 2021-509698 dated Feb. 27, 2024 (4 pages).

(Continued)

*Primary Examiner* — Michael F Pepitone
(74) *Attorney, Agent, or Firm* — Osha Bergman Watanabe & Burton LLP

(57) ABSTRACT

A powdery and/or granular material which achieves excellent dispersibility of fine polymer particles in a matrix resin is provided. The powdery and/or granular material contains specific fine polymer particles (A) and a specific resin (B), and has pores with an average pore diameter of 0.03 μm to 1.00 μm, where a total volume of the pores is not less than 0.0600 mL/g.

6 Claims, No Drawings

(56) References Cited

U.S. PATENT DOCUMENTS

| | | |
|---|---|---|
| 2015/0037497 A1 | 2/2015 | Lutz |
| 2015/0267048 A1 | 9/2015 | Wakita et al. |
| 2016/0024355 A1 | 1/2016 | Wakita et al. |
| 2016/0177016 A1 | 6/2016 | Takamido |
| 2016/0244603 A1 | 8/2016 | Okamoto |
| 2016/0251510 A1 | 9/2016 | Furukawa et al. |
| 2016/0333130 A1 | 11/2016 | Wakita et al. |
| 2016/0362524 A1 | 12/2016 | Watanabe et al. |
| 2017/0210897 A1 | 7/2017 | Nakamoto et al. |
| 2017/0309955 A1 | 10/2017 | Kataoka et al. |
| 2017/0335097 A1 | 11/2017 | Takamizu |
| 2017/0362368 A1 | 12/2017 | Kitayama et al. |
| 2017/0362395 A1 | 12/2017 | France |
| 2017/0369696 A1 | 12/2017 | Inoubli et al. |
| 2018/0002520 A1 | 1/2018 | Inoubli et al. |
| 2018/0030240 A1 | 2/2018 | Matsuoka et al. |
| 2018/0094176 A1 | 4/2018 | Okamoto et al. |
| 2018/0370125 A1 | 12/2018 | Rolland et al. |
| 2019/0040182 A1 | 2/2019 | Miyatake |
| 2019/0233635 A1 | 8/2019 | Inoubli et al. |
| 2020/0095385 A1 | 3/2020 | Yoshihara |
| 2020/0172720 A1 | 6/2020 | Kitayama et al. |
| 2020/0303771 A1 | 9/2020 | Kataoka et al. |
| 2021/0024703 A1* | 1/2021 | Maizuru .............. C08F 285/00 |
| 2022/0213311 A1 | 7/2022 | Maizuru et al. |

FOREIGN PATENT DOCUMENTS

| | | |
|---|---|---|
| CN | 1503823 A | 6/2004 |
| CN | 1517400 A | 8/2004 |
| CN | 101090943 A | 12/2007 |
| CN | 104755516 A | 7/2015 |
| CN | 105452316 A | 3/2016 |
| CN | 105612215 A | 5/2016 |
| CN | 105612218 A | 5/2016 |
| CN | 105683238 A | 6/2016 |
| CN | 107250259 A | 10/2017 |
| EP | 0526895 A2 | 2/1993 |
| EP | 1245584 A1 | 10/2002 |
| EP | 1394210 A1 | 3/2004 |
| EP | 1440997 A1 | 7/2004 |
| EP | 1780239 A1 | 5/2007 |
| EP | 2123711 A1 | 11/2009 |
| EP | 2189502 A1 | 5/2010 |
| EP | 2388280 A1 | 11/2011 |
| EP | 2441784 A1 | 4/2012 |
| EP | 3031836 A1 | 6/2016 |
| EP | 3056540 A1 | 8/2016 |
| EP | 3064520 A1 | 9/2016 |
| EP | 3266827 A1 | 1/2018 |
| EP | 3587491 A1 | 1/2020 |
| EP | 3904453 A1 | 11/2021 |
| JP | H05-295237 A | 11/1993 |
| JP | H05-339471 A | 12/1993 |
| JP | H06-100704 A | 4/1994 |
| JP | H06-172734 A | 6/1994 |
| JP | H06287410 A | 10/1994 |
| JP | H07-146587 A | 6/1995 |
| JP | H07-233204 A | 9/1995 |
| JP | H08-183836 A | 7/1996 |
| JP | 2000-178405 A | 6/2000 |
| JP | 2001-123052 A | 5/2001 |
| JP | 2002-146214 A | 5/2002 |
| JP | 2002-308914 A | 10/2002 |
| JP | 2003-522232 A | 7/2003 |
| JP | 2003-327912 A | 11/2003 |
| JP | 2005-002345 A | 1/2005 |
| JP | 2005-213507 A | 8/2005 |
| JP | 2005-526165 A | 9/2005 |
| JP | 2009-062389 A | 3/2009 |
| JP | 2009-203397 A | 9/2009 |
| JP | 2009-545656 A | 12/2009 |
| JP | 2010-077379 A | 4/2010 |
| JP | 2010-209164 A | 9/2010 |
| JP | 2010-241996 A | 10/2010 |
| JP | 2011-032435 A | 2/2011 |
| JP | 4671531 B2 | 4/2011 |
| JP | 2012-520909 A | 9/2012 |
| JP | 2014-141604 A | 8/2014 |
| JP | 2015-514140 A | 5/2015 |
| JP | 2015182248 A | 10/2015 |
| JP | 2015-218317 A | 12/2015 |
| JP | 2016199673 A | 12/2016 |
| JP | 2017-149887 A | 8/2017 |
| JP | 2018-500440 A | 1/2018 |
| JP | 2018-500441 A | 1/2018 |
| JP | 2018-35210 A | 3/2018 |
| JP | 2019-019236 A | 2/2019 |
| JP | 2019503891 A | 2/2019 |
| JP | 2020-144374 A | 9/2020 |
| JP | 2021-088632 A | 6/2021 |
| KR | 10-2015-0040497 A | 4/2015 |
| WO | 03/097746 A1 | 11/2003 |
| WO | 2004/108825 A1 | 12/2004 |
| WO | 2005/028546 A1 | 3/2005 |
| WO | 2005/056624 A1 | 6/2005 |
| WO | 2005/116155 A1 | 12/2005 |
| WO | 2009/034966 A1 | 3/2009 |
| WO | 2009/060819 A1 | 5/2009 |
| WO | 2010/082482 A1 | 7/2010 |
| WO | 2010/143366 A1 | 12/2010 |
| WO | 2011016385 A1 | 2/2011 |
| WO | 2011/046086 A1 | 4/2011 |
| WO | 2016/068239 A1 | 5/2016 |
| WO | 2016/068329 A1 | 5/2016 |
| WO | 2016/102658 A1 | 6/2016 |
| WO | 2016/102666 A1 | 6/2016 |
| WO | 2016/102682 A1 | 6/2016 |
| WO | 2016/136726 A1 | 9/2016 |
| WO | 2017/179653 A1 | 10/2017 |
| WO | 2018/155677 A1 | 8/2018 |
| WO | 2018/212227 A1 | 11/2018 |
| WO | 2018212064 A1 | 11/2018 |
| WO | 2021/060482 A1 | 4/2021 |

OTHER PUBLICATIONS

Office Action issued in corresponding Chinese Patent Application No. 202080062288.9 dated Mar. 20, 2024 (19 pages).
Office Action issued in related U.S. Appl. No. 17/485,782, dated Jun. 10, 2024 (62 pages).
Office Action issued in the counterpart Chinese Application No. 202080024033.3, mailed Oct. 26, 2023 (7 pages).
Advisory Action issued in the corresponding U.S. Appl. No. 17/036,869, mailed Nov. 2, 2023 (9 pages).
First Office Action issued in Chinese Application No. 202080025049.6 mailed Nov. 25, 2023 (14 pages).
Office Action issued in related U.S. Appl. No. 17/036,869 dated Jul. 10, 2023 (40 pages).
U.S. Office Action issued in corresponding U.S. Appl. No. 17/036,869, dated Dec. 18, 2023 (34 pages).
Advisory Action issued in U.S. Appl. No. 17/036,869; Dated Aug. 15, 2024 (6 pages).
Office Action issued in related U.S. Appl. No. 17/486,036, dated Sep. 5, 2024 (8 pages).
Office Action issued in related Japanese Application No. 2021-509700 dated Sep. 19, 2023 (7 pages).
Office Action issued in corresponding Japanese Applicaiton No. 2021-509698 dated Sep. 19, 2023 (9 pages).
Extended European Search Report issued in related European Application No. 20867849.0 dated Sep. 8, 2023 (8 pages).
Hexion, "EPON and EPI-REZ Epoxy Resins"; Product Selector, pp. 1-16, Feb. 2014 (16 pages).
Office Action issued in U.S. Appl. No. 17/036,869; Dated Aug. 10, 2022 (39 pages).
Hexion, "EPON Resin 1002F"; Technical Data Sheet, Aug. 4, 2022 (2 pages).
Hexion, "EPI-REZ Resin 3522-W-60"; Technical Data Sheet, Aug. 4, 2022 (2 pages).
Burkhardt, "Liquid Polysulfide Polymers for Chemical- and Solvent-Resistant Sealants", www.adhesivesmag.com, Aug. 2018, p. 19-23 (Year: 2018) (6 pages).

(56) References Cited

OTHER PUBLICATIONS

Dow (Dow Plastics, "D.E.R. 332", Liquid Epoxy Resin, Oct. 2001) (2 pages).

Office Action issued in U.S. Appl. No. 17/036,869; Dated Mar. 2, 2022 (44 pages).

Extended European Search Report issued in European Application No. 19775340.3, dated Dec. 15, 2021(8 pages).

International Preliminary Report on Patentability issued in International Application No. PCT/JP2019/013710; mailed Oct. 15, 2020 (11 pages).

International Search Report issued in International Application No. PCT/JP2019/013710, mailed Jun. 18, 2019 (2 pages).

International Preliminary Report on Patentability issued in International Application No. PCT/JP2020/014659; mailed Oct. 7, 2021 (7 pages).

International Search Report issued in International Application No. PCT/JP2020/014659, mailed Jun. 16, 2020 (2 pages).

International Preliminary Report on Patentability issued in International Application No. PCT/JP2020/014658; mailed Oct. 7, 2021 (10 pages).

International Search Report issued in International Application No. PCT/JP2020/014658, mailed Jun. 30, 2020 (3 pages).

International Preliminary Report on Patentability issued in International Application No. PCT/JP2020/014657; mailed Oct. 7, 2021 (8 pages).

International Search Report issued in International Application No. PCT/JP2020/014657, mailed Jun. 16, 2020 (2 pages).

Extended European Search Report issued in European Application No. 20777366.4, dated Nov. 15, 2022 (6 pages).

Extended European Search Report issued in European Application No. 20779224.3, dated Nov. 18, 2022 (7 pages).

Office Action issued in related U.S. Appl. No. 17/486,166, dated May 8, 2025 (87 pages).

Written Opinion issued in corresponding International Application No. PCT/JP2022/030280, dated Oct. 25, 2022 (11 pages).

International Search Report issued in corresponding International Application No. PCT/JP2022/030280, dated Oct. 25, 2022 (4 pages).

English translation of the International Preliminary Report on Patentability issued in corresponding International Application No. PCT/JP2019/051073, dated Jun. 16, 2021 (7 pages).

English translation of the International Search Report issued in corresponding International Application No. PCT/JP2019/051073, mailed Mar. 10, 2020 (2 pages).

Office Action issued in counterpart China Patent Application No. CN 201980085731.1 issued Feb. 21, 2023 (17 pages).

Office Action issued in corresponding Japanese Patent Application No. 2020-562394 dated Jul. 4, 2023 (4 pages).

Office Action issued in related U.S. Appl. No. 17/486,036, dated Dec. 3, 2024 (51 pages).

Sigma Aldrich Thermal Transitions of Homopolymers: Glass Transition & Melting Point, 2024 (7 pages).

Office Action issued in related U.S. Appl. No. 17/485,782, dated Nov. 26, 2024 (16 pages).

Office Action issued in related U.S. Appl. No. 17/355,787, dated Sep. 25, 2024 (36 pages).

Dow GMA Product Datasheet (Year: 2024) (2 pages).

Epikote 828 Technical Data Sheet (Year: 2007) (2 pages).

Office Action issued in related U.S. Appl. No. 17/036,869 dated Jan. 25, 2023 (79 pages).

Mitsubishi Chemical Corporation, "jER TM Epoxy resins", Apr. 2021 (11 pages).

Office Action issued in related U.S. Appl. No. 17/486,036, dated May 2, 2025 (19 pages).

Office Action issued in related U.S. Appl. No. 17/036,869, dated May 24, 2024 (41 pages).

Advisory Action issued in U.S. Appl. No. 17/486,036 mailed Jul. 16, 2025 (5 pages).

Office Action issued in U.S. Appl. No. 17/485,782 mailed Jun. 17, 2025 (20 pages).

Office Action issued in Japanese Patent Application No. 2021-509698, dated Nov. 25, 2025, with translation (11 pages).

Office Action issued in U.S. Appl. No. 19/212,020, dated Nov. 18, 2025 (48 pages).

Office Action issued in U.S. Appl. No. 17/486,166, dated Nov. 7, 2025 (20 pages).

Office Action issued in U.S. Appl. No. 17/486,036, dated Oct. 22, 2025 (8 pages).

Advisory Action issued in U.S. Appl. No. 17/486,166, dated Jan. 27, 2026 (3 pages).

* cited by examiner

PARTICULATE AND METHOD FOR PRODUCING PARTICULATE

CROSS-REFERENCE TO RELATED APPLICATIONS

This application is a continuation application of International Patent Application No. PCT/JP2020/036313, filed Sep. 25, 2020, which claims foreign priority to Japanese Patent Application Nos. 2019-177485 and 2019/177487 filed Sep. 27, 2019. The contents of these applications are incorporated herein by reference.

TECHNICAL FIELD

One or more embodiments of the present invention relate to a powdery and/or granular material and a method for producing the powdery and/or granular material.

BACKGROUND

For an improvement in impact resistance of a thermoplastic resin or a thermosetting resin, a method involving adding an elastomer (in particular, fine polymer particles) to a resin is widely used.

For example, Patent Literature 1 discloses a technique to obtain a resin composition by mixing a polymer composition (obtained by mixing fine polymer particles and a solid epoxy resin and making it into powder form) and a liquid epoxy resin.

Patent Literature 2 discloses a polymer composition that includes (i) a polymer (P1) and (ii) a polymer obtained by a multistage process with: (a) one stage (A) including a polymer (A1) having a glass transition temperature of less than 10° C., (b) one stage (B) including a polymer (B1) having a glass transition temperature of at least 60° C., and (c) one stage (C) including a polymer (C1) having a glass transition temperature of at least 30° C.

Patent Literature 3 discloses a polymer composition that contains a (meth)acrylic polymer (P1) and a multistage polymer, in which the multistage polymer makes up at least 20% by weight of the polymer composition.

PATENT LITERATURE

[Patent Literature 1]
  PCT International Publication No. WO2016/102658
[Patent Literature 2]
  PCT International Publication No. WO2016/102682
[Patent Literature 3]
  PCT International Publication No. WO2016/102666

However, the conventional technique as described above is not sufficient in terms of dispersibility of fine polymer particles in a resin, and has room for further improvements.

SUMMARY

One or more embodiments of the present invention are accomplished in view of the above, and a novel powdery and/or granular material which achieves excellent dispersibility of fine polymer particles in a matrix resin, and a method for producing the powdery and/or granular material is provided.

The inventors of one or more embodiments of the present invention conducted diligent research and found on their own that a powdery and/or granular material having a specific amount of pores with a specific average pore diameter achieves excellent dispersibility of fine polymer particles in a matrix resin. On the basis of this finding, the inventors accomplished Embodiment 1 of the present invention.

That is, a powdery and/or granular material in accordance with one or more embodiments of the present invention contains fine polymer particles (A) and a resin (B), in which: the fine polymer particles (A) contain a rubber-containing graft copolymer that includes an elastic body and a graft part grafted to the elastic body; the elastic body contains at least one selected from the group consisting of diene-based rubbers, (meth)acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the resin (B) is a liquid which has a viscosity of 100 mPa·s to 1,000,000 mPa·s at 25° C., a semisolid, or a solid; the fine polymer particles (A) are contained in an amount of 50% by weight to 99% by weight and the resin (B) is contained in an amount of 1% by weight to 50% by weight, where 100% by weight represents a total amount of the fine polymer particles (A) and the resin (B); the powdery and/or granular material has pores with an average pore diameter of 0.03 μm to 1.00 μm; and a total volume of the pores is not less than 0.0600 mL/g.

Moreover, a method for producing a powdery and/or granular material in accordance with one or more embodiments of the present invention includes an agglutinating step of preparing an agglutinate containing fine polymer particles (A) and a resin (B), and a drying step of airflow-drying or freeze-drying the agglutinate, in which: the fine polymer particles (A) contain a rubber-containing graft copolymer that includes an elastic body and a graft part grafted to the elastic body; the elastic body contains at least one selected from the group consisting of diene-based rubbers, (meth) acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the resin (B) is a liquid which has a viscosity of 100 mPa·s to 1,000,000 mPa·s at 25° C., a semisolid, or a solid; and the fine polymer particles (A) are contained in an amount of 50% by weight to 99% by weight and the resin (B) is contained in an amount of 1% by weight to 50% by weight, where 100% by weight represents a total amount of the fine polymer particles (A) and the resin (B).

Advantageous Effects of Invention

According to one or more embodiments of the present invention, it is possible to provide the powdery and/or granular material which achieves excellent dispersibility of fine polymer particles in a matrix resin.

DETAILED DESCRIPTION

The following description will discuss embodiments of the present invention. One or more embodiments of the present invention are not, however, limited to these embodiments. One or more embodiments of the present invention are not limited to the configurations described below, but may be altered in various ways within the scope of the claims. One or more embodiments of the present invention also encompass, in their technical scope, any embodiments or Example derived by combining technical means disclosed in differing embodiments and Examples. Further, it is possible to form a new technical feature by combining the technical means disclosed in various embodiments. All academic and patent documents cited in one or more embodiments of the present specification are incorporated herein by reference. Any numerical range expressed as "A to B" in the present disclosure means "not less than A and not more than B (i.e., a range from A to B which includes both A and B)" unless otherwise stated.

I. Embodiment 1

I-1. Technical Idea of Embodiment 1 of the Present Invention

It is very difficult to disperse fine polymer particles having a volume-average particle size smaller than 1 μm in a resin (e.g., a thermosetting resin such as an epoxy resin) on an industrial scale. A powdery and/or granular material (also referred to as "secondary particles") which is an aggregate of primary particles of fine polymer particles (i.e., particles having a volume-average particle size smaller than 1 μm) can have a volume-average particle size of not less than 1 μm. The powdery and/or granular material of fine polymer particles can be easily mixed with the thermosetting resin by mechanical mixing. However, in a case of a conventional powdery and/or granular material of fine polymer particles, primary particles of fine polymer particles remain aggluti- nated in the thermosetting resin in a resin composition which is a mixture of the powdery and/or granular material and the thermosetting resin. Therefore, toughness and impact resis- tance of a cured product of the resin composition are not improved much by the fine polymer particles, and a surface appearance of the cured product is very poor.

One or more embodiments of the present invention are accomplished in view of the above. In other words, one or more embodiments of the present invention provide a pow- dery and/or granular material that can provide a resin composition in which the fine polymer particles are uni- formly dispersed in the matrix resin.

In the course of diligent research, the inventors of one or more embodiments of the present invention surprisingly found on their own that a powdery and/or granular material having a specific amount of pores with a specific average pore diameter achieves excellent dispersibility of fine poly- mer particles in a matrix resin. Although the reasons therefor are unclear, the following reasons are inferred.

A powdery and/or granular material having a specific amount (e.g., a total volume of pores is not less than 0.0600 mL/g) of pores with a specific average pore diameter (e.g., an average pore diameter of 0.03 μm to 1.00 μm) has a surface area greater than that of a powdery and/or granular material that does not have a specific amount of pores with a specific average pore diameter. Here, the "powdery and/or granular material that does not have a specific amount of pores with a specific average pore diameter" indicates, for example, (a) a powdery and/or granular material in which a total volume of all pores in the powdery and/or granular material is less than a specific amount (e.g., 0.0600 mL/g), or (b) a powdery and/or granular material in which most of pores in the powdery and/or granular material have an average pore diameter that is greater than a specific average pore diameter (e.g., an average pore diameter of 1.00 μm). A powdery and/or granular material having a greater surface area is inferred to "easily get wet" with a matrix resin for reasons such as that (a) a contact surface area between the matrix resin and the powdery and/or granular material is large, and/or (b) the powdery and/or granular material easily contains the matrix resin due to capillary action of pores in the powdery and/or granular material. It can be inferred that, as the powdery and/or granular material get wet with the matrix resin more easily, the fine polymer particles can be dispersed in the matrix resin more easily by subsequent mechanical crushing, or the like. The inventors accom- plished one or more embodiments of the present invention based on such novel findings. Note that one or more embodi- ments of the present invention are not limited by such novel findings.

I-2. Powdery and/or Granular Material

A powdery and/or granular material in accordance with one or more embodiments of the present invention contains fine polymer particles (A) and a resin (B). The fine polymer particles (A) contain a rubber-containing graft copolymer that includes an elastic body and a graft part grafted to the elastic body. The elastic body contains at least one selected from the group consisting of diene-based rubbers, (meth) acrylate-based rubbers, and organosiloxane-based rubbers. The graft part contains a polymer that contains, as one or more structural units, one or more structural units derived from at least one type of monomer selected from the group consisting of aromatic vinyl monomers, vinyl cyanide monomers, and (meth)acrylate monomers. The resin (B) is a liquid which has a viscosity of 100 mPa·s to 1,000,000 mPa·s at 25° C., a semisolid, or a solid. In the powdery and/or granular material, the fine polymer particles (A) are contained in an amount of 50% by weight to 99% by weight and the resin (B) is contained in an amount of 1% by weight to 50% by weight, where 100% by weight represents the total amount of the fine polymer particles (A) and the resin (B). The powdery and/or granular material has pores with an average pore diameter of 0.03 μm to 1.00 μm, and a total volume of the pores is not less than 0.0600 mL/g.

A "powdery and/or granular material in accordance with Embodiment 1 of the present invention" may be hereinafter referred to as a "first powdery and/or granular material". The first powdery and/or granular material, when mixed with a matrix resin (C) (described later), gives a resin composition.

The first powdery and/or granular material has the fore- going feature, and therefore has an advantage of excellent dispersibility of the fine polymer particles (A) in a matrix resin. In other words, the first powdery and/or granular material has the foregoing feature, and therefore the first powdery and/or granular material brings about, when being mixed with a matrix resin (C) (described later), an advantage of providing a resin composition in which the fine polymer particles (A) are uniformly dispersed in the matrix resin (C).

In the present specification, the term "powdery and/or granular material" refers to a material which can be powder and/or granule(s) and which is made up of powder particle(s), grain(s), and/or the like. In a case where a specific distinction is made between "granules" and "pow- der", the "powder" has a volume-average particle size of 0.01 mm to 0.1 mm, whereas the "granules" have a volume- average particle size of 0.1 mm to 10 mm. Note, however, that the powdery and/or granular material may contain coarse particles of 10 mm or greater. The "volume-average particle size" less than 10 μm can be measured with use of a dynamic light scattering (DLS) particle size distribution analyzer Nanotrac WaveII-EX150 (manufactured by MicrotracBEL Corp.), and the "volume-average particle size" equal to or more than 10 μm can be measured with use of a laser diffraction particle size distribution analyzer Microtrac MT3000II (manufactured by MicrotracBEL Corp.).

(I-2-1. Fine Polymer Particles (A))

The fine polymer particles (A) contain a rubber-containing graft copolymer that includes an elastic body and a graft part grafted to the elastic body.

(I-2-1-1. Elastic Body)

The elastic body contains at least one selected from the group consisting of diene-based rubbers, (meth)acrylate-based rubbers, and organosiloxane-based rubbers. The elastic body may contain natural rubber other than the above described rubber. The elastic body can also be referred to as elastic part(s) or rubber particle(s). In the present specification, (meth)acrylate means acrylate and/or methacrylate.

A case where the elastic body contains a diene-based rubber (case A) will be described. In the case A, a resin composition which contains a resulting powdery and/or granular material can provide a cured product or a molded product which has excellent toughness and excellent impact resistance. It can be said that a cured product or molded product that has excellent toughness and/or excellent impact resistance is a cured product or molded product that has excellent durability.

The diene-based rubber is an elastic body containing, as a structural unit, a structural unit derived from a diene-based monomer. The diene-based monomer can also be referred to as a conjugated diene-based monomer. In the case A, the diene-based rubber may contain (i) the structural unit derived from the diene-based monomer in an amount of 50% by weight to 100% by weight and (ii) a structural unit derived from a vinyl-based monomer, which is different from the diene-based monomer and which is copolymerizable with the diene-based monomer, in an amount of 0% by weight to 50% by weight, with respect to 100% by weight of structural units. In the case A, the diene-based rubber may contain, as a structural unit, a structural unit derived from a (meth)acrylate-based monomer in an amount smaller than the amount of the structural unit derived from the diene-based monomer.

Examples of the diene-based monomer encompass 1,3-butadiene, isoprene (2-methyl-1,3-butadiene), and 2-chloro-1,3-butadiene. These diene-based monomers may be used alone or in combination of two or more.

Examples of the vinyl-based monomer which is different from the diene-based monomer and which is copolymerizable with the diene-based monomer (hereinafter also referred to as vinyl-based monomer A) encompass: (a) vinyl arenes such as styrene, α-methylstyrene, monochlorostyrene, and dichlorostyrene; (b) vinyl carboxylic acids such as acrylic acid and methacrylic acid; (c) vinyl cyanides such as acrylonitrile and methacrylonitrile; (d) vinyl halides such as vinyl chloride, vinyl bromide, and chloroprene; (e) vinyl acetate; (f) alkenes such as ethylene, propylene, butylene, and isobutylene; and (g) polyfunctional monomers such as diallyl phthalate, triallyl cyanurate, triallyl isocyanurate, and divinylbenzene. These vinyl-based monomers A may be used alone or in combination of two or more. Out of these vinyl-based monomers A, styrene is particularly preferable.

In the case A, the diene-based rubber may be (i) butadiene rubber which is constituted by a structural unit derived from 1,3-butadiene (also referred to as polybutadiene rubber) or (ii) butadiene-styrene rubber which is a copolymer of 1,3-butadiene and styrene (also referred to as polystyrene-butadiene). The diene-based rubber may be butadiene rubber. According to the above feature, since the elastic body of the fine polymer particles (A) contains the diene-based rubber, a desired effect can be more brought about. The butadiene-styrene rubber is more preferable in that the butadiene-styrene rubber makes it possible to, by adjustment of a refractive index, increase the transparency of the resulting cured product or molded product.

A case where the elastic body includes a (meth)acrylate-based rubber (case B) will be described. The case B allows wide-ranging polymer design for the elastic body by combinations of many types of monomers.

The (meth)acrylate-based rubber is an elastic body containing, as a structural unit, a structural unit derived from a (meth)acrylate-based monomer. In the case B, the (meth)acrylate-based rubber may contain (i) the structural unit derived from the (meth)acrylate-based monomer in an amount of 50% by weight to 100% by weight and (ii) a structural unit derived from a vinyl-based monomer, which is different from the (meth)acrylate-based monomer and which is copolymerizable with the (meth)acrylate-based monomer, in an amount of 0% by weight to 50% by weight, with respect to 100% by weight of structural units. In the case B, the (meth)acrylate-based rubber may contain, as a structural unit, a structural unit derived from a diene-based monomer in an amount smaller than the amount of the structural unit derived from the (meth)acrylate-based monomer.

Examples of the (meth)acrylate-based monomer encompass: (a) alkyl (meth)acrylates such as methyl (meth)acrylate, ethyl (meth)acrylate, butyl (meth)acrylate, 2-ethylhexyl (meth)acrylate, octyl (meth)acrylate, dodecyl (meth)acrylate, stearyl (meth)acrylate, and behenyl (meth)acrylate; (b) aromatic ring-containing (meth)acrylates such as phenoxyethyl (meth)acrylate and benzyl (meth)acrylate; (c) hydroxyalkyl (meth)acrylates such as 2-hydroxyethyl (meth)acrylate and 4-hydroxybutyl (meth)acrylate; (d) glycidyl (meth)acrylates such as glycidyl (meth)acrylate and glycidyl alkyl (meth)acrylate; (e) alkoxy alkyl (meth)acrylates; (f) allyl alkyl (meth)acrylates such as allyl (meth)acrylate and allyl alkyl (meth)acrylate; and (g) polyfunctional (meth)acrylates such as monoethylene glycol di(meth)acrylate, triethylene glycol di(meth)acrylate, and tetraethylene glycol di(meth)acrylate. These (meth)acrylate-based monomers may be used alone or in combination of two or more. Out of these (meth)acrylate-based monomers, ethyl (meth)acrylate, butyl (meth)acrylate, and 2-ethylhexyl (meth)acrylate are preferred, and butyl (meth)acrylate is more preferred.

In the case B, the (meth)acrylate-based rubber may be at least one selected from the group consisting of ethyl (meth)acrylate rubbers, butyl (meth)acrylate rubbers, and 2-ethylhexyl (meth)acrylate rubbers, and may be a butyl (meth)acrylate rubber. An ethyl (meth)acrylate rubber is a rubber composed of structural units derived from ethyl (meth)acrylate(s), a butyl (meth)acrylate rubber is a rubber composed of structural units derived from butyl (meth)acrylate(s), and a 2-ethylhexyl (meth)acrylate rubber is a rubber composed of structural units derived from 2-ethylhexyl (meth)acrylate(s). According to the configuration, the glass transition temperature (Tg) of the elastic body is low, and therefore fine polymer particles (A) and a powdery and/or granular material having low Tg are obtained. As a result, (a) a resin composition which contains the resulting powdery and/or granular material can provide a cured product or molded product having excellent toughness, and (b) it is possible to cause the resin composition to have a lower viscosity.

Examples of the vinyl-based monomer which is different from the (meth)acrylate-based monomer and which is copolymerizable with the (meth)acrylate-based monomer (hereinafter also referred to as vinyl-based monomer B) encompass the monomers listed as the examples of the vinyl-based monomer A. Such vinyl-based monomers B may be used alone or in combination of two or more. Out of such vinyl-based monomers B, styrene is particularly preferable.

A case where the elastic body includes an organosiloxane-based rubber (case C) will be described. In the case C, the resin composition which contains the resulting powdery and/or granular material can provide a cured product or molded product which has sufficient heat resistance and excellent impact resistance at low temperatures.

Examples of the organosiloxane-based rubber encompass (a) organosiloxane-based polymers composed of alkyl or aryl disubstituted silyloxy units, such as dimethylsilyloxy, diethylsilyloxy, methylphenylsilyloxy, diphenylsilyloxy, and dimethylsilyloxy-diphenylsilyloxy, and (b) organosiloxane-based polymers composed of alkyl or aryl monosubstituted silyloxy units, such as organohydrogensilyloxy in which some of sidechain alkyls have been substituted with hydrogen atoms. These organosiloxane-based polymers may be used alone or in combination of two or more.

In the present specification, a polymer composed of dimethylsilyloxy unit is referred to as a dimethylsilyloxy rubber, a polymer composed of methylphenylsilyloxy unit is referred to as a methylphenylsilyloxy rubber, and a polymer composed of dimethylsilyloxy unit and diphenylsilyloxy unit is referred to as a dimethylsilyloxy-diphenylsilyloxy rubber. In the case C, the organosiloxane-based rubber may be (a) at least one selected from the group consisting of dimethylsilyloxy rubbers, methylphenylsilyloxy rubbers and dimethylsilyloxy-diphenylsilyloxy rubbers, because a resin composition which contains the resulting powdery and/or granular material can provide a cured product or molded product which has excellent heat resistance, and may be (b) a dimethylsilyloxy rubber because it can be easily obtained and is economical.

In the case C, it is preferable that the fine polymer particles (A) contain an organosiloxane-based rubber in an amount of not less than 80% by weight, more preferably not less than 90% by weight, with respect to 100% by weight of the elastic body contained in the fine polymer particles (A). According to the above feature, the resin composition which contains the resulting powdery and/or granular material can provide a cured product or a molded product which has excellent heat resistance.

In one or more embodiments of the present invention, the elastic body may be at least one selected from the group consisting of butadiene rubbers, butadiene-styrene rubbers, butadiene-(meth)acrylate rubbers, ethyl (meth)acrylate rubbers, butyl (meth)acrylate rubbers, 2-ethylhexyl (meth)acrylate rubbers, dimethylsilyloxy rubbers, methylphenylsilyloxy rubbers, and dimethylsilyloxy-diphenylsilyloxy rubbers, and may be at least one selected from the group consisting of butadiene rubbers, butadiene-styrene rubbers, butyl (meth)acrylate rubbers, and dimethylsilyloxy rubbers.

(Crosslinked Structure of Elastic Body)

The elastic body may have a crosslinked structure introduced therein, because stable dispersion of the fine polymer particles (A) in the matrix resin (C) can be maintained. A generally used method may be used to introduce a crosslinked structure into the elastic body. Examples of the generally used method encompass the following. That is, in production of the elastic body, a crosslinking monomer(s), such as a polyfunctional monomer and/or a mercapto group-containing compound, is/are mixed with a monomer which can constitute the elastic body, and then polymerization is carried out. In the present specification, producing a polymer such as the elastic body is also referred to as forming a polymer by polymerization.

A method of introducing a crosslinked structure into an organosiloxane-based rubber includes the following methods: (a) a method that involves using a polyfunctional alkoxysilane compound in combination with another material during formation of the organosiloxane-based rubber by polymerization; (b) a method that involves introducing, into the organosiloxane-based rubber, a reactive group (e.g., (a) mercapto group, (b) vinyl group having reactivity, and the like), and then adding (a) an organic peroxide, (b) a polymerizable vinyl monomer, or the like to the obtained reaction product to cause a radical reaction; and (c) a method that involves, during formation of the organosiloxane-based rubber by polymerization, mixing a crosslinking monomer(s), such as a polyfunctional monomer and/or a mercapto group-containing compound, together with another material and then carrying out polymerization.

It can also be said that the polyfunctional monomer is a monomer having two or more radical-polymerizable reactive groups in an identical molecule. The radical-polymerizable reactive groups are each may be a carbon-carbon double bond. Examples of the polyfunctional monomer exclude butadiene and include (meth)acrylates having an ethylenically unsaturated double bond(s), such as allyl alkyl (meth)acrylates and allyl oxyalkyl (meth)acrylates. Examples of a monomer having two (meth)acrylic groups encompass ethylene glycol di(meth)acrylate, butylene glycol di(meth)acrylate, butanediol di(meth)acrylate, hexanediol di(meth)acrylate, cyclohexane dimethanol di(meth)acrylate, and polyethylene glycol di(meth)acrylates. Examples of the polyethylene glycol di(meth)acrylates encompass triethylene glycol di(meth)acrylate, tripropylene glycol di(meth)acrylate, tetraethylene glycol di(meth)acrylate, and polyethylene glycol (600) di(meth)acrylate. Examples of a monomer having three (meth)acrylic groups encompass alkoxylated trimethylolpropane tri(meth)acrylates, glycerol propoxy tri(meth)acrylate, pentaerythritol tri (meth)acrylate, and tris(2-hydroxyethyl)isocyanurate tri (meth)acrylate. Examples of the alkoxylated trimethylolpropane tri(meth)acrylates encompass trimethylolpropane tri(meth)acrylate and trimethylolpropane triethoxy tri(meth)acrylate. Examples of a monomer having four (meth)acrylic groups encompass pentaerythritol tetra (meth)acrylate and ditrimethylolpropane tetra(meth)acrylate. Examples of a monomer having five (meth)acrylic groups encompass dipentaerythritol penta(meth)acrylate. Examples of a monomer having six (meth)acrylic groups encompass ditrimethylolpropane hexa(meth)acrylate. Examples of the polyfunctional monomer also encompass diallyl phthalate, triallyl cyanurate, triallyl isocyanurate, and divinylbenzene.

Examples of the mercapto group-containing compound encompass alkyl group-substituted mercaptan, allyl group-substituted mercaptan, aryl group-substituted mercaptan, hydroxy group-substituted mercaptan, alkoxy group-substituted mercaptan, cyano group-substituted mercaptan, amino group-substituted mercaptan, silyl group-substituted mercaptan, acid radical-substituted mercaptan, halo group-substituted mercaptan, and acyl group-substituted mercaptan. The alkyl group-substituted mercaptan is preferably alkyl group-substituted mercaptan having 1 to 20 carbon atoms, and is more preferably alkyl group-substituted mercaptan having 1 to 10 carbon atoms. The aryl group-substituted mercaptan is preferably phenyl group-substituted mercaptan. The alkoxy group-substituted mercaptan is preferably alkoxy group-substituted mercaptan having 1 to 20 carbon atoms, and is more preferably alkoxy group-substituted mercaptan having 1 to 10 carbon atoms. The acid radical-substituted mercaptan is preferably alkyl group-substituted mercaptan having a carboxyl group and 1 to 10 carbon atoms or aryl group-substituted mercaptan having a carboxyl group and 1 to 12 carbon atoms.

(Glass Transition Temperature of Elastic Body)

The elastic body has a glass transition temperature of preferably not higher than 80° C., more preferably not higher than 70° C., more preferably not higher than 60° C., more preferably not higher than 50° C., more preferably not higher than 40° C., more preferably not higher than 30° C., more preferably not higher than 20° C., more preferably not higher than 10° C., more preferably not higher than 0° C., more preferably not higher than –20° C., more preferably not higher than –40° C., more preferably not higher than –45° C., more preferably not higher than –50° C., more preferably not higher than –55° C., more preferably not higher than –60° C., more preferably not higher than –65° C., more preferably not higher than –70° C., more preferably not higher than –75° C., more preferably not higher than –80° C., more preferably not higher than –85° C., more preferably not higher than –90° C., more preferably not higher than –95° C., more preferably not higher than –100° C., more preferably not higher than –105° C., more preferably not higher than –110° C., more preferably not higher than –115° C., even more preferably not higher than –120° C., particularly preferably not higher than –125° C. In the present specification, the "glass transition temperature" may be referred to as "Tg". With this feature, it is possible to obtain fine polymer particles (A) having low Tg and a powdery and/or granular material having low Tg. As a result, a resin composition which contains the resulting powdery and/or granular material can provide a cured product or a molded product each of which has excellent toughness. According to the above feature, the resin composition which contains the resulting powdery and/or granular material can have a lower viscosity. The Tg of the elastic body can be obtained by carrying out viscoelasticity measurement with use of a planar plate made of the fine polymer particles (A). Specifically, the Tg can be measured as follows: (1) a graph of tan δ is obtained by carrying out dynamic viscoelasticity measurement with respect to a planar plate made of the fine polymer particles (A), with use of a dynamic viscoelasticity measurement device (for example, DVA-200, manufactured by IT Keisoku Seigyo Kabushikigaisha) under a tension condition; and (2) in the graph of tan δ thus obtained, the peak temperature of tan δ is regarded as the glass transition temperature. Note, here, that in a case where a plurality of peaks are found in the graph of tan δ, the lowest peak temperature is regarded as the glass transition temperature of the elastic body.

In view of prevention of a decrease in elastic modulus (i.e., a decrease in rigidity) of the resulting cured product or molded product, i.e., in view of obtainment of the cured product which has a sufficient elastic modulus (rigidity), the Tg of the elastic body is preferably higher than 0° C., more preferably not lower than 20° C., even more preferably not lower than 50° C., particularly preferably not lower than 80° C., most preferably not lower than 120° C.

The Tg of the elastic body can be determined by, for example, the composition of the structural unit contained in the elastic body. In other words, it is possible to adjust the Tg of the resulting elastic body, by changing the composition of the monomer used to produce (form) the elastic body.

Note, here, that monomers each of which, when polymerized to form a homopolymer (i.e., a polymer obtained by polymerizing only one type of monomer), provides a homopolymer having a Tg of higher than 0° C. will be referred to as a monomer group "a". Note also that monomers each of which, when polymerized to form a homopolymer (i.e., a polymer obtained by polymerizing only one type of monomer), provides a homopolymer having a Tg of lower than 0° C. will be referred to as a monomer group "b". Note also that an elastic body containing (i) one or more structural units derived from at least one type of monomer selected from the monomer group "a" in an amount of 50% by weight to 100% by weight (more preferably 65% by weight to 99% by weight) and (ii) one or more structural units derived from at least one type of monomer selected from the monomer group "b" in an amount of 0% by weight to 50% by weight (more preferably 1% by weight to 35% by weight) will be referred to as an elastic body X. The elastic body X has a Tg higher than 0° C. In a case where the elastic body includes the elastic body X, a resin composition which contains the resulting powdery and/or granular material can provide a cured product or molded product which has sufficient rigidity.

Also in a case where the Tg of the elastic body is higher than 0° C., it is preferable that the crosslinked structure be introduced in the elastic body. Examples of a method of introducing the crosslinked structure into the elastic body encompass the above-described methods.

Examples of the monomers which can be included in the monomer group "a" encompass, but are not limited to, unsubstituted vinyl aromatic compounds such as styrene and 2-vinyl naphthalene; vinyl-substituted aromatic compounds such as α-methyl styrene; ring-alkylated vinyl aromatic compounds such as 3-methylstyrene, 4-methylstyrene, 2,4-dimethylstyrene, 2,5-dimethylstyrene, 3,5-dimethylstyrene, and 2,4,6-trimethylstyrene; ring-alkoxylated vinyl aromatic compounds such as 4-methoxystyrene and 4-ethoxystyrene; ring-halogenated vinyl aromatic compounds such as 2-chlorostyrene and 3-chlorostyrene; ring-ester-substituted vinyl aromatic compounds such as 4-acetoxy styrene; ring-hydroxylated vinyl aromatic compounds such as 4-hydroxystyrene; vinyl esters such as vinyl benzoate and vinyl cyclohexanoate; vinyl halides such as vinyl chloride; aromatic monomers such as acenaphthalene and indene; alkyl methacrylates such as methyl methacrylate, ethyl methacrylate, and isopropyl methacrylate; aromatic methacrylates such as phenyl methacrylate; methacrylates such as isobornyl methacrylate and trimethylsilyl methacrylate; methacrylic acid derivative-containing methacryl monomers such as methacrylonitrile; certain types of acrylic acid esters such as isobornyl acrylate and tert-butyl acrylate; and acrylic acid derivative-containing acrylic monomers such as acrylonitrile. Examples of the monomers which can be included in the monomer group "a" further encompass monomers each of which, when polymerized, can provide a homopolymer having a Tg of not lower than 120° C., such as acrylamide, isopropyl acrylamide, N-vinylpyrrolidone, isobornyl methacrylate, dicyclopentanyl methacrylate, 2-methyl-2-adamanthyl methacrylate, 1-adamanthyl acrylate, and 1-adamanthyl methacrylate. These monomers "a" may be used alone or in combination of two or more.

Examples of monomers "b" encompass ethyl acrylate, butyl acrylate, 2-ethylhexyl acrylate, octyl (meth)acrylate, dodecyl (meth)acrylate, 2-hydroxyethyl acrylate, and 4-hydroxybutyl acrylate. These monomers "b" may be used alone or in combination of two or more. Out of these monomers "b", ethyl acrylate, butyl acrylate, and 2-ethyl-hexyl acrylate are particularly preferable.

(Volume-Average Particle Size of Elastic Body)

The elastic body has a volume-average particle size of preferably 0.03 μm to 50.00 μm, more preferably 0.05 μm to 10.00 μm, more preferably 0.08 μm to 2.00 μm, further preferably 0.10 μm to 1.00 μm, even more preferably 0.10 μm to 0.80 μm, particularly preferably 0.10 μm to 0.50 μm. In a case where the volume-average particle size of the elastic body is not less than 0.03 μm, the elastic body which has a desired volume-average particle size can be stably obtained. In a case where the volume-average particle size of the elastic body is not more than 50.00 μm, the resulting cured product or the resulting molded product has favorable heat resistance and impact resistance. The volume-average particle size of the elastic body can be measured with use of a dynamic light scattering type particle size distribution measurement apparatus using, as a test specimen, an aqueous latex containing the elastic body. A method of measuring the volume-average particle size of the elastic body will be described later in detail in Examples.

(Proportion of Elastic Body)

A proportion of the elastic body contained in the fine polymer particles (A) may be 40% by weight to 97% by weight, 60% by weight to 95% by weight, or 70% by weight to 93% by weight, where 100% by weight represents the entirety of the fine polymer particles (A). In the case where the proportion of the elastic body is not less than 40% by weight, a resin composition which contains the resulting powdery and/or granular material can provide a cured product or a molded product which has excellent toughness and excellent impact resistance. In a case where the proportion of the elastic body is not more than 97% by weight, the fine polymer particles (A) do not easily agglutinate (i.e., less likely to agglutinate), and therefore a resin composition which contains the resulting powdery and/or granular material does not have a high viscosity. As a result, the resin composition can be handled easily.

(Gel Content of Elastic Body)

The elastic body may be one that can swell in an appropriate solvent but is substantially insoluble in the appropriate solvent. The elastic body may be insoluble in a matrix resin (C) used.

The elastic body has a gel content of preferably not less than 60% by weight, more preferably not less than 80% by weight, even more preferably not less than 90% by weight, particularly preferably not less than 95% by weight. In a case where the gel content of the elastic body falls within the above range, a resin composition which contains the resulting powdery and/or granular material can provide a cured product or molded product which has excellent toughness.

In the present specification, a method of calculating the gel content is as follows. First, an aqueous latex containing the fine polymer particles (A) is obtained. Next, a powdery and/or granular material of the fine polymer particles (A) is obtained from the aqueous latex. A method of obtaining the powdery and/or granular material of the fine polymer particles (A) from the aqueous latex is not limited to any particular one, and examples thereof encompass a method of obtaining the powdery and/or granular material of the fine polymer particles (A) by (i) causing the fine polymer particles (A) in the aqueous latex to agglutinate, (ii) dehydrating the agglutinate thus obtained, and (iii) further drying the agglutinate. Next, 2.0 g of the powdery and/or granular material of the fine polymer particles (A) is dissolved in 50 mL of methyl ethyl ketone (MEK). The MEK solution of the powder thus obtained is separated into a part soluble in MEK (MEK-soluble part) and a part insoluble in MEK (MEK-insoluble part). Specifically, the obtained MEK solution of the powder is subjected to centrifugal separation with use of a centrifugal separator (CP60E, manufactured by Hitachi Koki Co., Ltd.) at 30000 rpm for 1 hour, and thereby separated into the MEK-soluble part and the MEK-insoluble part. Note, here, that three sets of centrifugal separations are carried out in total. The weight of the MEK-soluble part and the weight of the MEK-insoluble part are measured, and then the gel content is calculated with use of the following expression.

$$\text{Gel content (\%)} = (\text{weight of methyl ethyl ketone insoluble part}) / \{(\text{weight of methyl ethyl ketone insoluble part}) + (\text{weight of methyl ethyl ketone soluble part})\} \times 100$$

(Variations of Elastic Body)

In one or more embodiments of the present invention, the "elastic body" of the fine polymer particles (A) may be composed of one type of elastic body which has an identical structural unit composition. In such a case, the "elastic body" of the fine polymer particles (A) may be one selected from the group consisting of diene-based rubbers, (meth) acrylate-based rubbers, and organosiloxane-based rubbers.

In one or more embodiments of the present invention, the "elastic body" of the fine polymer particles (A) may be composed of a plurality of types of elastic bodies which differ in structural unit composition from each other. In such a case, the "elastic body" of the fine polymer particles (A) may be two or more types selected from the group consisting of diene-based rubbers, (meth)acrylate-based rubbers, and organosiloxane-based rubbers. In such a case, the "elastic body" of the fine polymer particles (A) may be one selected from the group consisting of diene-based rubbers, (meth) acrylate-based rubbers, and organosiloxane-based rubbers. In other words, the "elastic body" of the fine polymer particles (A) may be a plurality of types, which differ in structural unit composition from each other, of the following rubbers: diene-based rubbers, (meth)acrylate-based rubbers, and organosiloxane-based rubbers.

In one or more embodiments of the present invention, a case where the "elastic body" of the fine polymer particles (A) is composed of a plurality of types of elastic bodies which differ in structural unit composition from each other will be described. In this case, the plurality of types of elastic bodies will be referred to as an elastic body$_1$, an elastic body$_2$, . . . and an elastic body$_n$, respectively. Note, here, that "n" is an integer of 2 or more. The "elastic body" of the fine polymer particles (A) may include a complex of the elastic body$_1$, the elastic body$_2$, . . . , and the elastic body$_n$ which have been separately formed by polymerization. The "elastic body" of the fine polymer particles (A) may include one elastic body obtained by forming the elastic body$_1$, the elastic body$_2$, . . . , and the elastic body$_n$ in order by polymerization. Forming a plurality of elastic bodies (polymers) by polymerization in order in this manner is also referred to as multistage polymerization. One elastic body obtained by multistage polymerization of a plurality of types of elastic bodies is also referred to as a multistage-polymerization elastic body. A method of producing a multistage-polymerization elastic body will be later described in detail.

A multistage-polymerization elastic body constituted by the elastic body$_1$, the elastic body$_2$, . . . and the elastic body$_n$ will be described. In the multistage-polymerization elastic body, the elastic body$_n$ can cover at least part of an elastic body$_{n-1}$ or the whole of the elastic body$_{n-1}$. In the multistage-polymerization elastic body, part of the elastic body$_n$ may be located inside the elastic body$_{n-1}$.

In the multistage-polymerization elastic body, the plurality of elastic bodies may form a layer structure. For example, in a case where the multistage-polymerization elastic body is constituted by the elastic body$_1$, the elastic body$_2$, and an elastic body$_3$, aspects of one or more embodiments of the present invention also include an aspect in which the elastic body$_1$ forms the innermost layer, a layer of the elastic body$_2$ is formed on the outer side of the elastic body$_1$, and a layer of the elastic body$_3$ is formed on the outer side of the layer of the elastic body$_2$ as the outermost layer of the elastic body. Thus, it can also be said that the multistage-polymerization elastic body in which the plurality of elastic bodies form a layer structure is a multilayered elastic body. In other words, in one or more embodiments of the present invention, the "elastic body" of the fine polymer particles (A) may include (a) a complex of a plurality of types of elastic bodies, (b) a multistage-polymerization elastic body, and/or (c) a multi-layered elastic body.

(I-2-1-2. Graft Part)

In the present specification, a polymer grafted to the elastic body is referred to as a graft part. The graft part contains a polymer that contains, as one or more structural units, one or more structural units derived from at least one type of monomer selected from the group consisting of aromatic vinyl monomers, vinyl cyanide monomers, and (meth)acrylate monomers. The graft part has the above feature, and therefore can play various roles. The "various roles" are, for example, (a) improving compatibility between the matrix resin (C) and the fine polymer particles (A), (b) improving the dispersibility of the fine polymer particles (A) in the matrix resin (C), and (c) allowing the fine polymer particles (A) to be dispersed in the form of primary particles in a resin composition which contains the resulting powdery and/or granular material or in a cured product or molded product.

Specific examples of the aromatic vinyl monomers encompass styrene, α-methylstyrene, p-methylstyrene, and divinylbenzene.

Specific examples of the vinyl cyanide monomers encompass acrylonitrile and methacrylonitrile.

Specific examples of the (meth)acrylate monomers encompass methyl (meth)acrylate, ethyl (meth)acrylate, butyl (meth)acrylate, hydroxyethyl (meth)acrylate, and hydroxybutyl (meth)acrylate.

The at least one type of monomer selected from the group consisting of aromatic vinyl monomers, vinyl cyanide monomers, and (meth)acrylate monomers may be used alone or in combination of two or more.

The graft part contains, as one or more structural units, structural unit(s) derived from aromatic vinyl monomer(s), structural unit(s) derived from vinyl cyanide monomer(s), and/or structural unit(s) derived from (meth)acrylate monomer(s) in an amount of preferably 10% by weight to 95% by weight in total, more preferably 30% by weight to 92% by weight in total, even more preferably 50% by weight to 90% by weight in total, particularly preferably 60% by weight to 87% by weight in total, most preferably 70% by weight to 85% by weight in total, with respect to 100% by weight (all) of the structural units.

The graft part may contain, as a structural unit, a structural unit derived from a monomer having a reactive group. The monomer having a reactive group may be a monomer having at least one type of reactive group selected from the group consisting of epoxy group, oxetane group, hydroxy group, amino group, imide group, carboxylic acid group, carboxylic anhydride group, cyclic ester, cyclic amide, benzoxazine group, and cyanate ester group, and may be a monomer having at least one type of reactive group selected from the group consisting of epoxy group, hydroxy group, and carboxylic acid group, and may be a monomer having epoxy group. This feature makes it possible to allow the graft part of the fine polymer particles (A) and the matrix resin (C) to be chemically bonded to each other in a resin composition which contains the resulting powdery and/or granular material. This makes it possible to keep the fine polymer particles (A) in a well dispersed state without allowing the fine polymer particles (A) to agglutinate in the resin composition which contains the resulting powdery and/or granular material or in a cured product or molded product.

Specific examples of the monomer having epoxy group encompass glycidyl-group-containing vinyl monomers such as glycidyl (meth)acrylates, 4-hydroxybutyl (meth)acrylate glycidyl ethers, and allyl glycidyl ethers.

Specific examples of the monomer having hydroxy group encompass (a) hydroxy straight-chain alkyl (meth)acrylates (in particular, hydroxy straight chain C1-C6 alkyl(meth) acrylates) such as 2-hydroxyethyl (meth)acrylates, hydroxypropyl (meth)acrylates, and 4-hydroxybutyl (meth)acrylates, (b) caprolactone-modified hydroxy (meth)acrylates, (c) hydroxy branching alkyl (meth)acrylates such as α-(hydroxymethyl) methyl acrylates and α-(hydroxymethyl) ethyl acrylates, and (d) hydroxyl-group-containing (meth)acrylates such as mono (meth)acrylates of a polyester diol (particularly saturated polyester diol) obtained from a dicarboxylic acid (e.g. phthalic acid) and a dihydric alcohol (e.g. propylene glycol).

Specific examples of the monomer having carboxylic acid group encompass: monocarboxylic acids such as acrylic acid, methacrylic acid, and crotonic acid; and dicarboxylic acids such as maleic acid, fumaric acid, and itaconic acid. Any of the monocarboxylic acids is suitably used as the monomer having carboxylic acid group.

These monomers having a reactive group may be used alone or in combination of two or more.

The graft part contains structural unit(s) derived from monomer(s) having reactive group(s) in an amount of preferably 0.5% by weight to 90% by weight, more preferably 1% by weight to 50% by weight, even more preferably 2% by weight to 35% by weight, particularly preferably 3% by weight to 20% by weight, with respect to 100% by weight of the graft part. In a case where the graft part contains structural unit(s) derived from monomer(s) having a reactive group in an amount of not less than 0.5% by weight, with respect to 100% by weight of the graft part, a resin composition which contains the resulting powdery and/or granular material can provide a cured product or molded product which has sufficient impact resistance. In a case where the graft part contains structural unit(s) derived from monomer (s) having a reactive group in an amount of not more than 90% by weight, with respect to 100% by weight of the graft part, a resin composition which contains the resulting powdery and/or granular material has advantages that (i) the resin composition can provide a cured product or molded product which has sufficient impact resistance and (ii) the resin composition has favorable storage stability.

The structural unit(s) derived from the monomer(s) having reactive group(s) may be contained in the graft part, and may be contained only in the graft part.

The graft part may contain, as a structural unit, a structural unit derived from a polyfunctional monomer. In a case where the graft part contains a structural unit derived from a polyfunctional monomer, there are the following advantages, for example: (a) it is possible to prevent swelling of the fine polymer particles (A) in the resin composition which contains the resulting powdery and/or granular material; (b) since the resin composition which contains the resulting powdery and/or granular material has a low viscosity, the resin composition tends to have favorable handleability; and (c) the dispersibility of the fine polymer particles (A) in the matrix resin (C) improves.

In a case where the graft part does not contain a structural unit derived from a polyfunctional monomer, the resin composition which contains the resulting powdery and/or granular material can provide a cured product which has more excellent toughness and impact resistance, as compared to a case where the graft part contains a structural unit derived from a polyfunctional monomer.

Examples of a polyfunctional monomer which can be used to form the graft part by polymerization encompass the foregoing polyfunctional monomers. Out of such polyfunctional monomers, examples of a polyfunctional monomer which can be preferably used to form the graft part by polymerization encompass allyl methacrylate, butylene glycol di(meth)acrylate, ethylene glycol di(meth)acrylate, butanediol di(meth)acrylate, hexanediol di(meth)acrylate, cyclohexane dimethanol di(meth)acrylate, and polyethylene glycol di(meth)acrylates. The above-listed polyfunctional monomers may be used alone or in combination of two or more.

The graft part contains structural unit(s) derived from polyfunctional monomer(s) in an amount of preferably 1% by weight to 20% by weight, more preferably 5% by weight to 15% by weight, with respect to 100% by weight of the graft part.

In formation of the graft part by polymerization, the foregoing monomers may be used alone or in combination of two or more.

The graft part may contain, as a structural unit, a structural unit derived from another monomer, in addition to the structural unit(s) derived from the above-listed monomer(s).

(Glass Transition Temperature of Graft Part)

The graft part has a glass transition temperature of preferably not higher than 190° C., more preferably not higher than 160° C., more preferably not higher than 140° C., more preferably not higher than 120° C., more preferably not higher than 80° C., more preferably not higher than 70° C., more preferably not higher than 60° C., more preferably not higher than 50° C., more preferably not higher than 40° C., more preferably not higher than 30° C., more preferably not higher than 20° C., more preferably not higher than 10° C., more preferably not higher than 0° C., more preferably not higher than −20° C., more preferably not higher than −40° C., more preferably not higher than −45° C., more preferably not higher than −50° C., more preferably not higher than −55° C., more preferably not higher than −60° C., more preferably not higher than −65° C., more preferably not higher than −70° C., more preferably not higher than −75° C., more preferably not higher than −80° C., more preferably not higher than −85° C., more preferably not higher than −90° C., more preferably not higher than −95° C., more preferably not higher than −100° C., more preferably not higher than −105° C., more preferably not higher than −110° C., more preferably not higher than −115° C., even more preferably not higher than −120° C., particularly preferably not higher than −125° C.

The glass transition temperature of the graft part is preferably not lower than 0° C., more preferably not lower than 30° C., more preferably not lower than 50° C., more preferably not lower than 70° C., even more preferably not lower than 90° C., particularly preferably not higher than 110° C.

The Tg of the graft part can be determined by, for example, the composition of the structural unit contained in the graft part. In other words, it is possible to adjust the Tg of the resulting graft part, by changing the composition of the monomer used to produce (form) the graft part.

The Tg of the graft part can be obtained by carrying out viscoelasticity measurement with use of a planar plate made of fine polymer particles (A). Specifically, the Tg can be measured as follows: (1) a graph of tan δ is obtained by carrying out dynamic viscoelasticity measurement with respect to a planar plate made of the fine polymer particles (A), with use of a dynamic viscoelasticity measurement device (for example, DVA-200, manufactured by IT Keisoku Seigyo Kabushikigaisha) under a tension condition; and (2) in the graph of tan δ thus obtained, the peak temperature of tan δ is regarded as the glass transition temperature. Note, here, that in a case where a plurality of peaks are found in the graph of tan δ, the highest peak temperature is regarded as the glass transition temperature of the graft part.

(Graft Rate of Graft Part)

In one or more embodiments of the present invention, the fine polymer particles (A) may have a polymer which is identical in composition to the graft part and which is not grafted to the elastic body. In the present specification, the polymer which is identical in composition to the graft part and which is not grafted to the elastic body may be referred to as a "non-grafted polymer". The non-grafted polymer constitutes a part of the fine polymer particles (A) in accordance with one or more embodiments of the present invention. It can also be said that the non-grafted polymer is a polymer that is not grafted to the elastic body, out of polymers produced during formation of the graft part by polymerization.

In the present specification, the proportion of (i) the polymer which is grafted to the elastic body to (ii) the polymers produced during the formation of the graft part by polymerization, i.e., the proportion of the graft part, is referred to as a "graft rate". In other words, the graft rate is a value represented by the following expression: (weight of graft part)/{(weight of graft part)+(weight of non-grafted polymer)}×100.

The graft rate of the graft part may be not less than 70%, not less than 80%, or not less than 90%. In a case where the graft rate is not less than 70%, there is an advantage that the viscosity of the resin composition which contains the resulting powdery and/or granular material does not become too high.

In the present specification, the graft rate is calculated by the following method. First, an aqueous latex containing the fine polymer particles (A) is obtained. Next, a powdery and/or granular material of the fine polymer particles (A) is obtained from the aqueous latex. A specific example of a method of obtaining the powdery and/or granular material of the fine polymer particles (A) from the aqueous latex is a method of obtaining the powdery and/or granular material of the fine polymer particles (A) by (i) causing the fine polymer particles (A) in the aqueous latex to coagulate, (ii) dehydrating the coagulate thus obtained, and (iii) further drying the coagulate. Next, 2 g of the powdery and/or granular material of the fine polymer particles (A) is dissolved in 50 mL of methyl ethyl ketone (MEK). The MEK solution of the powder thus obtained is separated into a part soluble in MEK (MEK-soluble part) and a part insoluble in MEK (MEK-insoluble part). Specifically, the obtained MEK solution of the powder is subjected to centrifugal separation with use of a centrifugal separator (CP60E, manufactured by Hitachi Koki Co., Ltd.) at 30000 rpm for 1 hour, and thereby separated into the MEK-soluble part and the MEK-insoluble part. Note, here, that three sets of centrifugal separations are carried out in total. Next, 20 ml of the concentrated MEK-soluble part is mixed with 200 ml of methanol. An aqueous calcium chloride solution in which 0.01 g of calcium chloride is dissolved in water is added to the obtained mixture, and the mixture thus obtained is stirred for 1 hour. After that, the obtained mixture is separated into a methanol-soluble part and a methanol-insoluble part. The weight of the methanol-insoluble part is used as the amount of a free polymer (FP).

The graft rate is calculated with use of the following expression.

$$\text{Graft rate (\%)}=100-[(\text{amount of FP})/\{(\text{amount of FP})+(\text{weight of MEK-insoluble part})\}]/(\text{weight of polymer of graft part})\times 10000$$

Note that the weight of a polymer other than the graft part is the amount of monomer introduced for formation of the polymer other than the graft part. The polymer other than the graft part is, for example, the elastic body. In a case where the fine polymer particles (A) contain a surface-crosslinked polymer (described later), the polymer other than the graft part includes both the elastic body and the surface-cross-linked polymer. The weight of the polymer of the graft part is the amount of monomer introduced for formation of the polymer of the graft part. In calculation of the graft rate, a method of causing the fine polymer particles (A) to coagulate is not limited to any particular one, and a method in which a solvent is used, a method in which a coagulant is used, a method in which the aqueous latex is sprayed, or the like can be employed.

(Variations of Graft Part)

In one or more embodiments of the present invention, the graft part may be constituted by only one type of graft part which contains only one type of structural unit. In one or more embodiments of the present invention, the graft part may be constituted by a plurality of types of graft parts which have structural units different from each other in composition.

A case where the graft part is constituted by a plurality of types of graft parts in one or more embodiments of the present invention will be described. In this case, the plurality of types of graft parts will be referred to as a graft $part_1$, a graft $part_2$, . . . a graft $part_n$ ("n" is an integer of 2 or more). The graft part may include a complex of the graft $part_1$, the graft $part_2$ . . . , and the graft $part_n$ which are separately formed by polymerization. The graft part may include a polymer obtained by forming the graft $part_1$, the graft $part_2$, . . . , and the graft $part_n$ by multistage polymerization. A polymer obtained by multistage polymerization of a plurality of types of graft parts is also referred to as a multistage-polymerization graft part. A method of producing a multistage-polymerization graft part will be later described in detail.

In a case where the graft part is constituted by the plurality of types of graft parts, all of the plurality of types of graft parts do not need to be grafted to the elastic body. It is only necessary that at least part of at least one of the plurality of types of graft parts be grafted to the elastic body. The other of the plurality of types of graft parts (the other types of graft parts) may be grafted to the at least one of the plurality of types of graft parts which is grafted to the elastic body. In a case where the graft part is constituted by the plurality of types of graft parts, the graft part may have a plurality of types of polymers which are identical in composition to the plurality of types of graft parts and which are not grafted to the elastic body (a plurality of types of non-grafted polymers).

The multistage-polymerization graft part constituted by the graft $part_1$, the graft $part_2$, . . . the graft $part_n$ will be described. In the multistage-polymerization graft part, the graft $part_n$ can cover at least part of a graft $part_{n-1}$ or the whole of the graft $part_{n-1}$. In the multistage-polymerization graft part, part of the graft $part_n$ may be located inside the graft $part_{n-1}$.

In the multistage-polymerization graft part, the graft parts may form a layer structure. For example, in a case where the multistage-polymerization graft part is constituted by the graft $part_1$, the graft $part_2$, and a graft $part_3$, aspects of one or more embodiments of the present invention also include an aspect in which the graft $part_1$ forms the innermost layer of the graft part, a layer of the graft $part_2$ is formed on the outer side of the graft $part_1$, and a layer of the graft $part_3$ is formed on the outer side of the layer of the graft $part_2$ as the outermost layer. Thus, it can also be said that the multistage-polymerization graft part in which the graft parts form a layer structure is a multilayered graft part. In other words, in one or more embodiments of the present invention, the graft part may include (a) a mixture of plurality of types of graft parts, (b) a multistage-polymerization graft part, and/or (c) a multilayered graft part.

In a case where the elastic body and the graft part are formed in this order by polymerization in production of the fine polymer particles (A), at least part of the graft part can cover at least part of the elastic body in the resulting fine polymer particles (A). The wording "the elastic body and the graft part are formed in this order by polymerization" can be reworded as follows: the elastic body and the graft part are subjected to multistage polymerization. It can also be said that the fine polymer particles (A) obtained by multistage polymerization of the elastic body and the graft part are a multistage polymer.

In a case where the fine polymer particles (A) are constituted by a multistage polymer, the graft part can cover at least part of the elastic body or the whole of the elastic body. In a case where the fine polymer particles (A) are constituted by a multistage polymer, part of the graft part may be located inside the elastic body.

In a case where the fine polymer particles (A) are constituted by a multistage polymer, the elastic body and the graft part may form a layer structure. For example, aspects of one or more embodiments of the present invention also include an aspect in which the elastic body forms the innermost layer (also referred to as a core layer) and a layer of the graft part is formed on the outer side of the elastic body as the outermost layer (also referred to as a shell layer). It can also be said that a structure in which the elastic body is present as a core layer and the graft part is present as a shell layer is a core-shell structure. It can also be said that the fine polymer particles (A) that contain the elastic body and the graft part which form a layer structure (core-shell structure) are constituted by a multilayered polymer or a core-shell polymer. In other words, in one or more embodiments of the present invention, the fine polymer particles (A) may be constituted by a multistage polymer and/or a multilayered polymer or a core-shell polymer. Note, however, that the fine polymer particles (A) are not limited to the above feature, provided that the graft part is grafted to the elastic body.

At least part of the graft part may cover at least part of the elastic body. In other words, at least part of the graft part may be present on the outermost side of the fine polymer particles (A).

(I-2-1-3. Surface-Crosslinked Polymer)

The rubber-containing graft copolymer preferably further has a surface-crosslinked polymer in addition to the elastic body and the graft part grafted to the elastic body. In other words, the fine polymer particles (A) may further have a surface-crosslinked polymer in addition to the elastic body and the graft part grafted to the elastic body. One or more embodiments of the present invention will be described with reference to an example case in which the fine polymer particles (A) (e.g., rubber-containing graft copolymer) further has a surface-crosslinked polymer. In this case, the following advantages are achieved: (a) an anti-blocking property can be improved in the production of the fine polymer particles (A); and (b) the dispersibility of the fine polymer particles (A) in the matrix resin (C) becomes more favorable in the resin composition which contains the resulting powdery and/or granular material. Reasons for these are not limited to any particular ones, but can be inferred as follows. By the surface-crosslinked polymer covering at least part of the elastic body, the exposed area of the fine polymer particles (A) is reduced. Consequently, the elastic body is less likely to adhere to another elastic body, and therefore the dispersibility of the fine polymer particles (A) is improved.

In a case where the fine polymer particles (A) further have the surface-crosslinked polymer, the following effects can be further brought about: (a) an effect of reducing the viscosity of the resin composition which contains the resulting powdery and/or granular material; (b) an effect of increasing the crosslinking density of the elastic body; and (c) an effect of increasing the graft efficiency of the graft part. Note that the crosslinking density of the elastic body means a degree of the number of crosslinked structures in the entirety of the elastic body.

The surface-crosslinked polymer is constituted by a polymer containing, as structural units, (i) a structural unit(s) derived from a polyfunctional monomer(s) in an amount of 30% by weight to 100% by weight and (ii) a structural unit(s) derived from vinyl-based monomer(s), other than the unit(s) derived from polyfunctional monomer(s), in an amount of 0% by weight to 70% by weight, which total 100% by weight.

Examples of the polyfunctional monomer which can be used to form the surface-crosslinked polymer by polymerization encompass the foregoing polyfunctional monomers. Out of such polyfunctional monomers, examples of a polyfunctional monomer which can be preferably used to form the surface-crosslinked polymer by polymerization encompass allyl methacrylate, ethylene glycol di(meth)acrylate, butylene glycol di(meth)acrylate (such as 1,3-butylene glycol dimethacrylate), butanediol di(meth)acrylate, hexanediol di(meth)acrylate, cyclohexane dimethanol di(meth)acrylate, and polyethylene glycol di(meth)acrylates. The above-listed polyfunctional monomers may be used alone or in combination of two or more.

The fine polymer particles (A) may contain the surface-crosslinked polymer which is formed by polymerization independently of formation of the rubber-containing graft copolymer by polymerization, or may contain the surface-crosslinked polymer which is formed together with the rubber-containing graft copolymer by polymerization. The fine polymer particles (A) may be a multistage polymer obtained by forming the elastic body, the surface-crosslinked polymer, and the graft part in this order by multistage polymerization. In any of these aspects, the surface-crosslinked polymer can cover at least part of the elastic body.

The surface-crosslinked polymer can also be regarded as part of the elastic body. In other words, the surface-crosslinked polymer can also be regarded as part of the rubber-containing graft copolymer, and can be said to be a surface cross-linked polymerized part. In a case where the fine polymer particles (A) contain the surface-crosslinked polymer, the graft part may (a) be grafted to the elastic body other than the surface-crosslinked polymer, (b) be grafted to the surface-crosslinked polymer, or (c) be grafted to both the elastic body other than the surface-crosslinked polymer and the surface-crosslinked polymer. In a case where the fine polymer particles (A) contain the surface-crosslinked polymer, the above-described volume-average particle size of the elastic body means the volume-average particle size of the elastic body including the surface-crosslinked polymer.

A case will be described where the fine polymer particles (A) are a multistage polymer obtained by forming the elastic body, the surface-crosslinked polymer, and the graft part in this order by multistage polymerization (case D). In the case D, the surface-crosslinked polymer can cover part of the elastic body or the whole of the elastic body. In the case D, part of the surface-crosslinked polymer may be located inside the elastic body. In the case D, the graft part can cover part of the surface-crosslinked polymer or the whole of the surface-crosslinked polymer. In the case D, part of the graft part may be located inside the surface-crosslinked polymer. In the case D, the elastic body, the surface-crosslinked polymer, and the graft part may form a layer structure. For example, aspects of one or more embodiments of the present invention also include an aspect in which the elastic body is present as the innermost layer (core layer), a layer of the surface-crosslinked polymer is present on the outer side of the elastic body as an intermediate layer, and a layer of the graft part is present on the outer side of the surface-crosslinked polymer as the outermost layer (shell layer).

(I-2-1-4. Physical Properties of Fine Polymer Particles (A))

The following description will discuss physical properties of the fine polymer particles (A).

(Volume-Average Particle Size (Mv) of Fine Polymer Particles (A))

The volume-average particle size (Mv) of the fine polymer particles (A) is preferably 0.03 μm to 50.00 μm, more preferably 0.05 μm to 10.00 μm, more preferably 0.08 μm to 2.00 μm, further preferably 0.10 μm to 1.00 μm, even more preferably 0.10 μm to 0.80 μm, particularly preferably 0.10 μm to 0.50 μm, because it is possible to obtain a resin composition which has a desired viscosity and which is highly stable. In a case where the volume-average particle size (Mv) of the fine polymer particles (A) falls within the above range, there is also an advantage that the dispersibility of the fine polymer particles (A) in a matrix resin (C) is favorable. Note that, in the present specification, the "volume-average particle size (Mv) of the fine polymer particles (A)" means the volume-average particle size of the primary particles of the fine polymer particles (A) unless otherwise mentioned. The volume-average particle size of the fine polymer particles (A) can be measured with use of a dynamic light scattering type particle size distribution measurement apparatus using, as a test specimen, an aqueous latex containing the fine polymer particles (A). The volume-average particle size of the fine polymer particles (A) will be described later in detail in Examples. The volume-average particle size of the fine polymer particles (A) can also be measured by (i) cutting a cured product or a molded product obtained from the resin composition, (ii) capturing an image of a cut surface with use of an electron microscope or the like, and (iii) using image data thus obtained (captured image).

The particle-number-based distribution of the volume-average particle size of the fine polymer particles (A) in the matrix resin (C) preferably has a full width at half maximum which is not less than 0.5 times and not more than 1 time the volume-average particle size, because the resin composition which has a low viscosity and is easy to handle is obtained.

(I-2-1-5. Method of Producing Fine Polymer Particles (A))

The fine polymer particles (A) can be produced as follows: after an elastic body is formed by polymerization, the polymer which constitutes the graft part is graft polymerized to the elastic body in the presence of the elastic body.

The fine polymer particles (A) can be produced by a known method, for example, a method such as an emulsion polymerization method, a suspension polymerization method, or a microsuspension polymerization method. Specifically, the formation of the elastic body by polymerization in the fine polymer particles (A), the formation of the graft part by polymerization in the fine polymer particles (A) (graft polymerization), and the formation of the surface-crosslinked polymer by polymerization in the fine polymer particles (A) can be each achieved by a known method, for example, a method such as an emulsion polymerization method, a suspension polymerization method, or a microsuspension polymerization method. Out of these methods, the emulsion polymerization method is particularly preferable as the method of producing the fine polymer particles (A). The emulsion polymerization method has the following advantages: it facilitates (a) compositional design of the fine polymer particles (A), (b) industrial production of the fine polymer particles (A), and (c) obtainment of the aqueous latex of the fine polymer particles (A) which can be suitably used to produce the present resin composition (described later). A method of producing the elastic body which can be contained in the fine polymer particles (A), a method of producing the graft part which can be contained in the fine polymer particles (A), and a method of producing the surface-crosslinked polymer which can be optionally contained in the fine polymer particles (A) will be described below.

(Method of Producing Elastic Body)

A case will be considered where the elastic body includes at least one type of elastic body selected from the group consisting of diene-based rubbers and (meth)acrylate-based rubbers. In this case, the elastic body can be produced by, for example, a method such as emulsion polymerization, suspension polymerization, or microsuspension polymerization. As the method of producing the elastic body, a method disclosed in, for example, WO 2005/028546 can be used.

A case where the elastic body includes an organosiloxane-based rubber will be described. In this case, the elastic body can be produced by, for example, a method such as emulsion polymerization, suspension polymerization, or microsuspension polymerization. As the method of producing the elastic body, a method disclosed in, for example, WO 2006/070664 can be used.

A case where the "elastic body" of the fine polymer particles (A) is constituted by a plurality of types of elastic bodies (for example, an elastic $body_1$, an elastic $body_2$, ..., an elastic $body_n$) will be described. In this case, a complex which is constituted by the plurality of types of elastic bodies may be produced in the following manner: the elastic $body_1$, the elastic $body_2$, ... and the elastic $body_n$ are each formed individually by any of the above-described methods, and then these elastic bodies are mixed and complexed. Alternatively, the elastic $body_1$, the elastic $body_2$, ... and the elastic $body_n$ may be formed in order by multistage polymerization to produce one elastic body which is constituted by the plurality of types of elastic bodies.

The multistage polymerization of the elastic bodies will be described in detail. For example, the multistage-polymerization elastic body can be obtained by carrying out the following steps (1) through (4): (1) The elastic $body_1$ is formed by polymerization; (2) next, the elastic $body_2$ is formed by polymerization in the presence of the elastic $body_1$ to obtain a two-stage elastic $body_{1+2}$; (3) subsequently, an elastic $body_3$ is formed by polymerization in the presence of the elastic $body_{1+2}$ to obtain a three-stage elastic $body_{1+2+3}$; and (4) after a similar process(es) is/are carried out, the elastic $body_n$ is formed by polymerization in the presence of an elastic $body_{1+2+ \ldots +(n-1)}$ to obtain a multistage-polymerization elastic $body_{1+2+ \ldots +n}$.

(Method of Producing Graft Part)

The graft part can be formed, for example, by polymerizing, by known radical polymerization, the monomer used to form the graft part. In a case where (a) the elastic body is obtained as an aqueous latex or (b) a fine polymer particle precursor containing the elastic body and the surface-crosslinked polymer is obtained as an aqueous latex, the graft part may be formed by emulsion polymerization. The graft part can be produced by a method disclosed in, for example, WO 2005/028546.

The method of producing the graft part in a case where the graft part is constituted by a plurality of types of graft parts (for example, a graft $part_1$, a graft $part_2$, ..., a graft $part_n$) will be described. In this case, the graft part (complex) which is constituted by the plurality of types of graft parts may be produced in the following manner: the graft $part_1$, the graft $part_2$, ... and the graft $part_n$ are each formed individually by any of the above-described methods, and then these graft parts are mixed and complexed. Alternatively, the graft $part_1$, the graft $part_2$, ... the graft $part_n$ may be formed in order by multistage polymerization to produce one graft part which is constituted by the plurality of types of graft parts.

The multistage polymerization of the graft parts will be described in detail. For example, the multistage-polymerization graft part can be obtained by carrying out the following steps (1) through (4): (1) The graft $part_1$ is formed by polymerization; (2) next, the graft $part_2$ is formed by polymerization in the presence of the graft $part_1$ to obtain a two-stage graft $part_{1+2}$; (3) subsequently, a graft $part_3$ is formed by polymerization in the presence of the graft $part_{1+2}$ to obtain a three-stage graft $part_{1+2+3}$; and (4) after a similar process(es) is/are carried out, the graft $part_n$ is formed by polymerization in the presence of a graft $part_{1+2+ \ldots +(n-1)}$ to obtain a multistage-polymerization graft $part_{1+2+ \ldots +n}$.

In a case where the graft part is constituted by the plurality of types of graft parts, the fine polymer particles (A) may be produced as follows: the graft part which is constituted by the plurality of types of graft parts is formed by polymerization, and then these graft parts are graft polymerized to the elastic body. The fine polymer particles (A) may be produced as follows: in the presence of the elastic body, a plurality of types of polymers which constitute the graft part are formed in order by multistage graft polymerization with respect to the elastic body.

(Method of Producing Surface-Crosslinked Polymer)

The surface-crosslinked polymer can be formed by polymerizing, by known radical polymerization, the monomer used to form the surface-crosslinked polymer. In a case where the elastic body is obtained as an aqueous latex, the surface-crosslinked polymer may be formed by emulsion polymerization.

In a case where emulsion polymerization is employed as the method of producing the fine polymer particles (A), a known emulsifying agent (dispersion agent) can be used in the production of the fine polymer particles (A).

Examples of the emulsifying agent include anionic emulsifying agents, nonionic emulsifying agents, polyvinyl alcohols, alkyl-substituted celluloses, polyvinylpyrrolidone, polyacrylic acid derivatives, and the like. Examples of the anionic emulsifying agent include sulfur-based emulsifying agents, phosphorus-based emulsifying agents, sarcosine acid-based emulsifying agents, carboxylic acid-based emulsifying agents, and the like. Examples of the sulfur-based emulsifying agent include sodium dodecylbenzenesulfonate (abbreviated as SDBS), and the like. Examples of the phosphorus-based emulsifying agent include sodium polyoxyethylene lauryl ether phosphate and the like.

In a case where emulsion polymerization is employed as the method of producing the fine polymer particles (A), a pyrolytic initiator can be used in the production of the fine polymer particles (A). It is possible to use, as the pyrolytic initiator, a known initiator such as (a) 2,2'-azobisisobutyronitrile, and (b) peroxides such as organic peroxides and inorganic peroxides, for example. Examples of the organic peroxide encompass t-butylperoxy isopropyl carbonate, paramenthane hydroperoxide, cumene hydroperoxide, dicumyl peroxide, t-butyl hydroperoxide, di-t-butyl peroxide, and t-hexyl peroxide. Examples of the inorganic peroxide encompass hydrogen peroxide, potassium persulfate, and ammonium persulfate.

In the production of the fine polymer particles (A), a redox initiator can also be used. The redox initiator is an initiator which contains a combination of (a) a peroxide such as an organic peroxide and/or an inorganic peroxide and (b) a reducing agent such as a transition metal salt (such as iron (II) sulfate), sodium formaldehyde sulfoxylate and/or glucose. Further, as necessary, a chelating agent such as disodium ethylenediaminetetraacetate, and/or as necessary a phosphorus-containing compound such as sodium pyrophosphate may be used in combination.

Using the redox initiator makes it possible to (i) carry out polymerization even at a low temperature at which pyrolysis of the peroxide substantially does not occur and (ii) select a polymerization temperature from a wide range of temperatures. Thus, using the redox initiator is preferable. Out of redox initiators, redox initiators in which organic peroxides such as cumene hydroperoxide, dicumyl peroxide, paramenthane hydroperoxide, and t-butyl hydroperoxide are used as peroxides are preferable. The amount of the initiator used can be within a known range. In a case where the redox initiator is used, the amounts of, for example, the reducing agent used, the transition metal salt used, and the chelating agent used can be within known ranges.

In a case where, in the formation of the elastic body, the graft part, or the surface-crosslinked polymer by polymerization, a polyfunctional monomer is used to introduce a crosslinked structure into the elastic body, the graft part, or the surface-crosslinked polymer, a known chain transfer agent can be used in an amount within a known range. By using the chain transfer agent, it is possible to easily adjust the molecular weight and/or the degree of crosslinking of the resulting elastic body, the resulting graft part, or the resulting surface-crosslinked polymer.

In the production of the fine polymer particles (A), a surfactant can be further used, in addition to the above-described components. The type and the amount of the surfactant used are set within known ranges.

In the production of the fine polymer particles (A), conditions of polymerization such as polymerization temperature, pressure, and deoxygenation can be, as appropriate, conditions within known numerical ranges.

(I-2-2. Resin (B))

The first powdery and/or granular material contains the resin (B), in addition to having a specific amount of pores with a specific average pore diameter, and therefore has a remarkable advantage, i.e., excellent dispersibility of the fine polymer particles (A) in the matrix resin (C).

The resin (B) may be, for example, a thermosetting resin, a thermoplastic resin, or a combination of a thermosetting resin and a thermoplastic resin.

(I-2-2-1. Thermosetting Resin)

The thermosetting resin in the resin (B) may include, but not particularly limited to, at least one type selected from the group consisting of: resins each containing a polymer obtained by polymerization of an ethylenically unsaturated monomer; epoxy resins; phenolic resins; polyol resins; and amino-formaldehyde resins. Examples of the thermosetting resin in the resin (B) also encompass resins each containing a polymer obtained by polymerization of an aromatic polyester raw material. In the resin (B), the thermosetting resins may be used alone or in combination of two or more.

(Ethylenically Unsaturated Monomer)

The ethylenically unsaturated monomer is not limited to any particular one, provided that the ethylenically unsaturated monomer has at least one ethylenically unsaturated bond in its molecule.

Examples of the ethylenically unsaturated monomer encompass acrylic acid, α-alkyl acrylic acids, α-alkyl acrylic acid esters, β-alkyl acrylic acids, β-alkyl acrylic acid esters, methacrylic acid, esters of acrylic acid, esters of methacrylic acid, vinyl acetate, vinyl esters, unsaturated esters, polyunsaturated carboxylic acids, polyunsaturated esters, maleic acid, maleic acid esters, maleic anhydride, acetoxy styrene, and the like. These may be used alone or in combination of two or more.

(Epoxy Resins)

The epoxy resins are not limited to any particular ones, provided that the epoxy resins each have at least one epoxy group in its molecule.

Specific examples of the epoxy resins encompass bisphenol A epoxy resin, bisphenol F epoxy resin, bisphenol AD epoxy resin, bisphenol S epoxy resin, glycidyl ester type epoxy resin, glycidyl amine type epoxy resin, novolac type epoxy resin, glycidyl ether epoxy resin of bisphenol A propylene oxide adduct, hydrogenated bisphenol A (or F) epoxy resin, fluorinated epoxy resin, rubber-modified epoxy resin containing polybutadiene or NBR, flame-resistant epoxy resin such as glycidyl ether of tetrabromo bisphenol A, p-oxybenzoic acid glycidyl ether ester type epoxy resin, m-aminophenol type epoxy resin, diaminodiphenylmethane-based epoxy resin, urethane-modified epoxy resin containing urethane bond, various types of alicyclic epoxy resin, glycidyl ether of a polyhydric alcohol, hydantoin-type epoxy resin, epoxidized unsaturated polymer such as petroleum resin, and amino-containing glycidyl ether resin. Examples of the polyhydric alcohol encompass N,N-diglycidyl aniline, N,N-diglycidyl-o-toluidine, triglycidyl isocyanurate, polyalkylene glycol diglycidyl ether, and glycerin. Other examples of the epoxy resins encompass an epoxy compound obtained by causing an addition reaction between one of the above epoxy resins and e.g. a bisphenol A (or F) or a polybasic acid. The epoxy resins are not limited to these examples, and a generally used epoxy resin can be used. These epoxy resins may be used alone or in combination of two or more.

Out of these epoxy resins, epoxy resins each of which has at least two epoxy groups in one molecule are preferable in that, e.g., such resins have high reactivity during curing of the resin composition and make it easy for an obtained cured product to create a three-dimensional mesh. In addition, out of the epoxy resins each of which has at least two epoxy groups in one molecule, epoxy resins each of which contains a bisphenol type epoxy resin as a main component are preferable, because they are economical and easily available.

(Phenolic Resins)

The phenolic resins are not limited to any particular ones, provided that the phenolic resins are each a compound obtained through a reaction between a phenol and an aldehyde. The phenol is not limited to any particular one, and examples thereof encompass phenols such as phenol, ortho-cresol, meta-cresol, para-cresol, xylenol, para-tertiary butylphenol, para-octylphenol, para-phenylphenol, bisphenol A, bisphenol F, and resorcin. In particular, phenol and cresol are preferred as the phenol.

The aldehyde is not limited to any particular one, and examples thereof encompass formaldehyde, acetaldehyde, butylaldehyde, and acrolein, and mixtures thereof. Alternatively, substances which are sources of the above aldehydes or solutions of the above aldehydes can be used. The aldehyde may be formaldehyde because an operation for reacting the phenol and the aldehyde is easy.

The molar ratio (F/P) between the phenol (P) and the aldehyde (F) in a reaction between the phenol and the aldehyde (such a molar ratio may be hereinafter referred to as a "reaction molar ratio") is not limited to any particular one. In a case where an acid catalyst is used in the reaction, the reaction molar ratio (F/P) may be 0.4 to 1.0, or 0.5 to 0.8. In a case where an alkali catalyst is used in the reaction, the reaction molar ratio (F/P) may be 0.4 to 4.0, or 0.8 to 2.5. In a case where the reaction molar ratio is equal to or higher than the above lower limit, a yield is less likely to excessively decrease and the resulting phenolic resin is less likely to have a low molecular weight. On the contrary, in a case where the reaction molar ratio is equal to or lower than the above upper limit, the phenolic resin is less likely to have an excessively high molecular weight and an excessively high softening point, and it is therefore possible to achieve sufficient flowability during heating. Furthermore, in a case where the reaction molar ratio is equal to or lower than the above upper limit, the molecular weight is easily controlled, and gelation may be less likely to occur or a partially gelatinized product may be less likely to be formed, each of which results from the conditions under which the reaction takes place.

(Polyol Resins)

The polyol resins are each a compound containing two or more active hydrogens as its terminal group(s), and are each bi- or more functional polyol with a molecular weight of about 50 to 20,000. Examples of the polyol resins encompass aliphatic alcohols, aromatic alcohols, polyether type polyols, polyester type polyols, polyolefin polyols, and acrylic polyols.

The aliphatic alcohols may be dihydric alcohols or trihydric or higher polyhydric alcohols (such as trihydric alcohols or tetrahydric alcohols). Examples of the dihydric alcohols encompass: (a) alkylene glycols (in particular, alkylene glycols having about 1 to 6 carbon atoms) such as ethylene glycol, propylene glycol, 1,3-propanediol, 1,3-butanediol, 1,4-butanediol, 1,5-pentanediol, 1,6-hexanediol, 3-methyl- 1,5-pentanediol, and neopentylglycol; and (b) substances obtained through dehydrogenative condensation of two or more molecules (e.g., about 2 to 6 molecules) of a compound of any of the above alkylene glycols (such as diethylene glycol, dipropylene glycol, and tripropylene glycol). Examples of the trihydric alcohols encompass glycerin, trimethylolpropane, trimethylolethane, and 1,2,6-hexanetriol (in particular, trihydric alcohols having about 3 to 10 carbon atoms). Examples of the tetrahydric alcohols encompass pentaerythritol and diglycerin. Other examples encompass saccharides such as monosaccharides, oligosaccharides, and polysaccharides.

Examples of the aromatic alcohols encompass: bisphenols such as bisphenol A and bisphenol F; biphenyls such as dihydroxybiphenyl; polyhydric phenols such as hydroquinone and phenol-formaldehyde condensate; and naphthalenediol.

Examples of the polyether type polyols encompass: (a) random copolymers and block copolymers obtained by ring-opening polymerization of ethylene oxide, propylene oxide, butylene oxide, styrene oxide, or the like in the presence of one or more active-hydrogen-containing initiators; and (b) mixtures of these copolymers. Examples of the active-hydrogen-containing initiators used for the ring-opening polymerization to obtain the polyether type polyols encompass diols such as ethylene glycol, diethylene glycol, propylene glycol, dipropylene glycol, 1,3-butanediol, 1,4-butanediol, 1,6-hexanediol, neopentylglycol, and bisphenol A; triols such as trimethylolethane, trimethylolpropane, and glycerin; saccharides such as monosaccharides, oligosaccharides, and polysaccharides; sorbitol; and amines such as ammonia, ethylenediamine, urea, monomethyl diethanolamine, and monoethyl diethanolamine.

Examples of the polyester type polyols encompass polymers obtained by, in the presence of an esterification catalyst at a temperature falling within the range of 150° C. to 270° C., polycondensation of, for example, a polybasic acid and/or an anhydride of polybasic acid and a polyhydric alcohol. Examples of the polybasic acid encompass maleic acid, fumaric acid, adipic acid, sebacic acid, phthalic acid, dodecanedioic acid, isophthalic acid, and azelaic acid. Examples of the polyhydric alcohol encompass ethylene glycol, propylene glycol, 1,4-butanediol, 1,6-hexanediol, diethylene glycol, dipropylene glycol, neopentylglycol, and 3-methyl-1,5-pentanediol. Examples of the polyester type polyols further encompass (a) polymers obtained by ring-opening polymerization of ε-caprolactone, valerolactone, or the like; and (b) active hydrogen compounds containing two or more active hydrogens, such as polycarbonate diol and castor oil.

Examples of the polyolefin type polyols encompass polybutadiene polyol, polyisoprene polyol, and hydrogenated versions thereof.

Examples of the acrylic polyols encompass: copolymers of, for example, (a) a hydroxyl-containing monomer such as hydroxyethyl (meth)acrylate, hydroxybutyl (meth)acrylate, or vinylphenol and (b) a general-purpose monomer such as n-butyl (meth)acrylate or 2-ethylhexyl (meth)acrylate; and mixtures thereof.

Out of these polyol resins, the polyether type polyols are preferred, because the resin composition which contains the resulting powdery and/or granular material has a lower viscosity and has excellent workability, and the resin composition can provide the cured product which is well balanced between its hardness and toughness. Further, out of these polyol resins, the polyester type polyols are preferred, because the resin composition which contains the resulting powdery and/or granular material can provide the cured product which has excellent adhesiveness.

(Amino-Formaldehyde Resins)

The amino-formaldehyde resins are not limited to any particular ones, provided that the amino-formaldehyde resins are each a compound obtained through a reaction between an amino compound and an aldehyde in the presence of an alkaline catalyst. Examples of the amino compound encompass: melamine; 6-substituted guanamines such as guanamine, acetoguanamine, and benzoguanamine; amine-substituted triazine compounds such as CTU guanamine (3,9-bis[2-(3,5-diamino-2,4,6-triazaphenyl)ethyl]-2, 4,8,10-tetraoxaspiro[5,5]undecane) and CMTU guanamine (3,9-bis[(3,5-diamino-2,4,6-triazaphenyl)methyl]-2,4,8,10-tetraoxaspiro[5,5]undecane); and ureas such as urea, thiourea, and ethyleneurea. Examples of the amino compound also encompass: (a) substituted melamine compounds which are different from melamine in that the hydrogen of an amino group is substituted by an alkyl group, an alkenyl group, and/or a phenyl group (described in Specification of U.S. Pat. No. 5,998,573 (a Japanese family member thereof: Japanese Patent Application Publication Tokukaihei No. 9-143238)); and (b) substituted melamine compounds which are different from melamine in that the hydrogen of an amino group is substituted by a hydroxyalkyl group, a hydroxyalkyloxyalkyl group, and/or an aminoalkyl group (described in Specification of U.S. Pat. No. 5,322,915 (a Japanese family member thereof: Japanese Patent Application Publication Tokukaihei No. 5-202157)). Out of the above-listed compounds, melamine, guanamine, acetoguanamine and benzoguanamine, which are polyfunctional amino compounds, are preferable, and melamine is particularly preferable, as the amino compound, because they are industrially produced and inexpensive. These amino compounds may be used alone or in combination of two or more. In addition to these amino compounds, any of (a) phenols, such as phenol, cresol, alkylphenol, resorcin, hydroquinone, and/or pyrogallol, (b) anilines, and the like may be used.

Examples of the aldehyde encompass formaldehyde, paraformaldehyde, acetaldehyde, benzaldehyde, and furfural. Preferred aldehydes are formaldehyde and paraformaldehyde, because they are inexpensive and well react with the foregoing amino compound. In producing an amino-formaldehyde resin, it is preferable to use the aldehyde in the following amount: the amount of an effective aldehyde group in the aldehyde compound may be 1.1 mol to 6.0 mol, or 1.2 mol to 4.0 mol, per mole of the amino compound.

(Aromatic Polyester Raw Material)

Examples of the aromatic polyester raw material encompass aromatic vinyl compounds, (meth)acrylic acid derivatives, vinyl cyanide compounds, radical-polymerizable monomers such as maleimide compounds, dimethyl terephthalate, and alkylene glycol. In the present specification, the term "(meth)acrylic acid" refers to an acrylic acid and/or a methacrylic acid.

(I-2-2-2. Thermoplastic Resin)

Examples of a thermoplastic resin in the resin (B) encompass acrylic-based polymers, vinyl-based copolymers, polycarbonate, polyamides, polyesters, polyphenylene ether, polyurethane, and polyvinyl acetate. These may be used alone or in combination of two or more.

An acrylic-based polymer is a polymer that contains acrylic ester monomer as a main component. The ester portion of the acrylic ester monomer may have 1 to 20 carbon atoms. Examples of the acrylic-based polymer encompass: (a) homopolymers obtained from acrylic ester monomer; and (b) copolymers of (i) acrylic ester monomer and (ii) (a) monomer such as an unsaturated fatty acid, acrylamide-based monomer, maleimide-based monomer, or vinyl acetate or (b) a vinyl-based copolymer (such copolymers hereinafter may be referred to as acrylic-based copolymers).

Examples of the acrylic ester monomer encompass methyl acrylate (MA), ethyl acrylate (EA), 2-ethylhexyl acrylate (2EHA), acrylic acid (AA), methacrylic acid (MAA), 2-hydroxyethyl acrylate (2HEA), 2-hydroxyethyl methacrylate (2HEMA), butyl acrylate (BA), methyl methacrylate (MMA), ethyl methacrylate (EMA), n-butyl methacrylate (nBMA), isobutyl methacrylate (iBMA), propyl acrylate, isopropyl acrylate, isobutyl acrylate, t-butyl acrylate, neopentyl acrylate, isodecyl acrylate, lauryl acrylate, tridecyl acrylate, stearyl acrylate, cyclohexyl acrylate, isobornyl acrylate, tricyclodecynyl acrylate, hydroxyethyl acrylate, hydroxybutyl acrylate, hydroxypropyl acrylate, hydroxyethyl acrylate, 2-methoxyethyl acrylate, dimethylaminoethyl acrylate, chloroethyl acrylate, tryfluoroethyl acrylate, and tetrahydrofurfuryl acrylate. These may be used alone or in combination of two or more.

In an acrylic-based copolymer, the ratio between (i) a structural unit (structural unit (a)) derived from the acrylic ester monomer and (ii) structural unit(s) (structural unit (b)) derived from monomer(s) such as unsaturated fatty acid, acrylamide-based monomer, maleimide-based monomer, or vinyl acetate or from the vinyl-based copolymer may be as follows: the structural unit (a) is 50% by weight to 100% by weight; and the structural unit (b) is 0% by weight to 50% by weight.

The acrylic-based polymer contains a structural unit derived from butyl acrylate (BA) in an amount of preferably not less than 50% by weight, more preferably not less than 60% by weight, even more preferably not less than 70% by weight, particularly preferably not less than 80% by weight, most preferably not less than 90% by weight.

The vinyl-based copolymer is obtained by copolymerizing a vinyl-based monomer mixture containing at least one type selected from the group consisting of aromatic vinyl-based monomers, vinyl cyanide-based monomers, and/or unsaturated alkyl carboxylate ester-based monomers. The vinyl-based monomer mixture may further contain some other monomer (which may also be referred to as "monomer C") that is copolymerizable with the above listed monomer (s).

Examples of the aromatic vinyl-based monomers encompass styrene, α-methylstyrene, o-methylstyrene, m-methylstyrene, p-methylstyrene, t-butylstyrene, and vinyltoluene. These vinyl-based monomers may be used alone or in combination of two or more. Out of those listed above, aromatic vinyl-based monomers are preferred, styrene is more preferred, because such monomers make it possible to easily increase refractive index.

The unsaturated alkyl carboxylate ester-based monomer is not particularly limited, and may be, for example, an ester of a C1 to C6 alcohol and acrylic acid or methacrylic acid. The ester of a C1 to C6 alcohol and acrylic acid or methacrylic acid may further contain a substituent such as hydroxy group or halogen group.

Examples of the ester of a C1 to C6 alcohol and acrylic acid or methacrylic acid encompass methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 3-hydroxypropyl (meth)acrylate, 2,3,4,5,6-pentahydroxyhexyl (meth)acrylate, and 2,3,4,5-tetrahydroxypentyl (meth)acrylate. These may be used alone or in combination of two or more.

Examples of the vinyl cyanide-based monomers encompass acrylonitrile, methacrylonitrile, and ethacrylonitrile. These may be used alone or in combination of two or more.

The monomer C is not particularly limited, provided that the monomer C is a vinyl-based monomer other than the foregoing aromatic vinyl-based monomer, unsaturated alkyl carboxylate ester-based monomer, and vinyl cyanide-based monomer and does not impair the effects of one or more embodiments of the present invention. Specific examples of the monomer C encompass unsaturated fatty acids, acrylamide-based monomers, maleimide-based monomers, vinyl acetate, and acrylic ester monomers. These may be used alone or in combination of two or more.

An unsaturated fatty acid can be selected from, for example, itaconic acid, maleic acid, fumaric acid, butenoic acid, acrylic acid, methacrylic acid, and the like.

An acrylamide-based monomer can be selected from, for example, acrylamide, methacrylamide, N-methylacrylamide and the like.

A maleimide-based monomer can be selected from, for example, N-methylmaleimide, N-ethylmaleimide, N-isopropylmaleimide, N-butylmaleimide, N-hexylmaleimide, N-octylmaleimide, N-dodecylmaleimide, N-cyclohexylmaleimide, N-phenylmaleimide, and the like.

A method of producing the vinyl-based copolymer is not particularly limited, and is, for example, emulsion polymerization, suspension polymerization, mass polymerization, solution polymerization, or the like.

The method of producing the vinyl-based copolymer may involve using a polymerization initiator as necessary. The polymerization initiator can be at least one appropriately selected from the group consisting of, for example, peroxides, azo-based compounds, potassium persulfate, and the like. The amount of a polymerization initiator added is not particularly limited.

Examples of peroxides encompass benzoyl peroxide, cumene hydroperoxide, dicumyl peroxide, diisopropylbenzene hydroperoxide, t-butylhydroperoxide, t-butyl peroxyacetate, t-butyl peroxybenzoate, t-butyl isopropyl carbonate, di-t-butyl peroxide, t-butyl peroctoate, 1,1-bis(t-butylperoxy)3,3,5-trimethylcyclohexane, 1,1-bis(t-butylperoxy)cyclohexane, and t-butylperoxy-2-ethylhexanoate. Out of those listed above, cumene hydroperoxide, 1,1-bis(t-butylperoxy)3,3,5-trimethylcyclohexane, and 1,1-bis(t-butylperoxy)cyclohexane are particularly preferred.

Examples of azo-based compounds encompass azobisisobutyronitrile, azobis(2,4-dimethylvaleronitrile), 2-phenyl azo-2,4-dimethyl-4-methoxyvaleronitrile, 2-cyano-2-propylazoformamide, 1,1'-azobiscyclohexane-1-carbonitrile, azobis(4-methoxy-2,4-dimethylvaleronitrile), dimethyl 2,2'-azobisisobutyrate, 1-t-butyl azo-2-cyanobutane, and 2-t-butyl azo-2-cyano-4-methoxy-4-methylpentane. Out of those listed above, 1,1'-azobiscyclohexane-1-carbonitrile is particularly preferred.

Specific examples of the vinyl-based copolymer encompass polyvinyl chloride, chlorinated polyvinyl chloride, polystyrene, styrene-acrylonitrile copolymers, styrene-acrylonitrile-N-phenylmaleimide copolymers, α-methylstyrene-acrylonitrile copolymers, poly(methyl methacrylate), and methyl methacrylate-styrene copolymers. These may be used alone or in combination of two or more.

Examples of polyesters encompass polyethylene terephthalate and polybutylene terephthalate.

The resin (B) may be the same resin (i.e., a resin having the same composition) as or a different resin from the matrix resin (C) (described later) with which the powdery and/or granular material is to be mixed. It is preferable that the matrix resin (C) and the resin (B) do not undergo phase separation in the resin composition. The resin (B) may be a resin compatible with the matrix resin (C).

In a case where the resin (B) is a resin identical with the matrix resin (C) (described later) with which the powdery and/or granular material is to be mixed, there is an advantage that the resin (B) does not exert influence on the various physical properties of a resin composition which contains the resulting powdery and/or granular material or a cured product or molded product.

For example, the following description will assume a case where the resin (B) is of the same type as the matrix resin (C). In this case, it is not possible to distinguish between the matrix resin (C) and the resin (B) in the resin composition which contains the resulting powdery and/or granular material. Therefore, the resin composition which contains the resulting powdery and/or granular material appears to have only the resin (B) or only the matrix resin (C) in addition to the fine polymer particles (A). Next, the following description will assume a case where the resin (B) is of a different type from the matrix resin (C). In this case, it is possible to distinguish between the matrix resin (C) and the resin (B) in the resin composition which contains the resulting powdery and/or granular material. In this case, the ultimately obtained resin composition containing the powdery and/or granular material can contain the resin (B) as a resin other than the matrix resin (C), in addition to the fine polymer particles (A).

(I-2-2-3. Others)

In the present specification, fats and oils as well as fatty acid esters are also included in the resin (B). Examples of the fats and oils which can be suitably used as the resin (B) encompass epoxidized fats and oils such as epoxidized soybean oil and epoxidized linseed oil. Commercially available epoxidized soybean oil can also be used, and examples thereof encompass ADK CIZER O-130P manufactured by ADEKA Co., Ltd. Examples of the fatty acid esters which can be suitably used as the resin (B) encompass epoxidized fatty acid esters such as epoxidized fatty acid butyl, epoxidized fatty acid 2-ethylhexyl, epoxidized fatty acid octyl ester, and epoxidized fatty acid alkyl ester.

The epoxidized fats and oils and the epoxidized fatty acid esters are sometimes referred to as epoxy-based plasticizers. That is, in the present specification, epoxy-based plasticizers are also included in the resin (B). Examples of the epoxy-based plasticizers, other than the epoxidized fats and oils and the epoxidized fatty acid esters, encompass diepoxystearyl epoxyhexahydrophthalate and epoxyhexahydro di(2-ethylhexyl) phthalate.

The above-described thermosetting resins, thermoplastic resins, mixtures of the thermosetting resins and the thermoplastic resins, fats and oils, and fatty acid esters can be each used in admixture with an antioxidant. In the present specification, the antioxidant is regarded as part of the resin (B), as long as the antioxidant is used in admixture with each of the above-described substances. In a case where only the antioxidant is used, the antioxidant is not regarded as the resin (B). The following description will discuss a case where only an antioxidant is used instead of the resin (B). The antioxidant is a component which does not contribute to crosslinking. Therefore, in a case where the obtained powdery and/or granular material is mixed with the matrix resin (C), a product which is ultimately obtained (i.e., an end product; e.g., a cured product, when the matrix resin (C) is a thermosetting resin) tends to have inferior physical properties. For example, the end product may have lower Tg or inferior impact resistance.

The antioxidant is not limited to any particular one. Examples of the antioxidant encompass (a) primary antioxidants such as phenol-based antioxidants, amine-based antioxidants, lactone-based antioxidants, and hydroxylamine-based antioxidants and (b) secondary antioxidants such as sulfur-based antioxidants and phosphorus-based antioxidants.

Examples of the phenol-based antioxidants encompass hindered phenol-based antioxidants. Examples of the hindered phenol-based antioxidants encompass a compound having a hindered phenol structure or a semi-hindered phenol structure in its molecule. Commercially available phenol-based antioxidants can also be used, and examples thereof encompass Irganox 245 (manufactured by BASF Japan Ltd.).

The amine-based antioxidants are not limited to any particular ones, and a wide range of conventionally known amine-based antioxidants can be used. Specific examples of the amine-based antioxidants encompass a 2,2,4-trimethyl-1,2-dihydroquinoline polymer, 6-ethoxy-1,2-dihydro-2,2,4-trimethylquinoline, and a reaction product of diphenylamine and acetone, each of which is an amine-ketone-based compound.

The amine-based antioxidants also encompass aromatic amine compounds. Examples of the aromatic amine compounds encompass naphthylamine-based antioxidants, diphenylamine-based antioxidants, and p-phenylenediamine-based antioxidants.

The lactone-based antioxidants, the hydroxylamine-based antioxidants, and the sulfur-based antioxidants are not limited to any particular ones. A wide range of conventionally known lactone-based antioxidants, hydroxylamine-based antioxidants, and sulfur-based antioxidants can be used.

The phosphorus-based antioxidants are not limited to any particular ones, and a wide range of conventionally known phosphorus-based antioxidants can be used. Phosphoric acid and phosphoric ester, each of which contains active hydrogen, can adversely affect the storage stability of the resin composition which contains the resulting powdery and/or granular material, and can adversely affect the heat resistance of the cured product or the molded product provided by the resin composition. Therefore, as the phosphorus-based antioxidants, alkyl phosphite, aryl phosphite, alkyl aryl phosphite compounds, and the like which do not contain phosphoric acid or phosphoric ester in their molecules are preferable.

The antioxidant can be other conventionally known substance. Examples of such an antioxidant encompass various substances described in, for example, "Sanka Boshizai Handobukku (Antioxidant Handbook)" published by Taiseisha (the date of publication of the first edition: Oct. 25, 1976), "Kobunshitenkazai handobukku (Polymeric additive Handbook)" published by CMC Publishing Co., Ltd. (the author and editor: HARUNA, Toru, the date of publication of the first edition: Nov. 7, 2010), and the like.

The resin (B) may be at least one selected from the group consisting of the thermosetting resins, mixtures of the thermosetting resins and the antioxidants, the thermoplastic resins, mixtures of the thermoplastic resins and the antioxidants, the fats and oils, mixtures of the fats and oils and the antioxidants, the fatty acid esters, mixtures of the fatty acid esters and the antioxidants, epoxy curing agents, and mixtures of the epoxy curing agents and the antioxidants, at least one selected from the group consisting of epoxy resins, acrylic polymers, mixtures of the epoxy resins and the antioxidants, mixtures of the acrylic polymers and the antioxidants, and mixtures of the epoxy-based plasticizers and the antioxidants, at least one selected from the group consisting of the mixtures of the epoxy resins and the antioxidants, the mixtures of the acrylic polymers and the antioxidants, and the mixtures of the epoxy-based plasticizers and the antioxidants, or any of the mixtures of the epoxy-based plasticizers and the antioxidants. According to the above feature, the resin composition which contains the resulting powdery and/or granular material has advantages that (a) it is possible to provide the cured product or the molded product each of which has excellent heat resistance and (b) it is possible to improve the dispersibility of the fine polymer particles (A) in the matrix resin (C).

(I-2-2-4. Physical Properties of Resin (B))

The resin (B) is not particularly limited in its properties, provided that the resin (B) is a liquid having a viscosity of 100 mPa·s to 1,000,000 mPa·s at 25° C., a semisolid, or a solid. Note that the wording "the resin (B) has a viscosity of 100 mPa·s to 1,000,000 mPa·s at 25° C." means that "the resin (B) which is at 25° C. has a viscosity of 100 mPa·s to 1,000,000 mPa·s".

In a case where the resin (B) is a liquid, the viscosity of the resin (B) is preferably not more than 750,000 mPa·s, more preferably not more than 700,000 mPa·s, more preferably not more than 500,000 mPa·s, more preferably not more than 350,000 mPa·s, more preferably not more than 300,000 mPa·s, more preferably not more than 250,000 mPa·s, more preferably not more than 100,000 mPa·s, more preferably not more than 75,000 mPa·s, more preferably not more than 50,000 mPa·s, more preferably not more than 30,000 mPa·s, more preferably not more than 25,000 mPa·s, even more preferably not more than 20,000 mPa·s, and particularly preferably not more than 15,000 mPa·s, at 25° C. According to the above feature, the powdery and/or granular material has an advantage of having excellent flowability.

The viscosity of the resin (B) is more preferably not less than 200 mPa·s, more preferably not less than 300 mPa·s, more preferably not less than 400 mPa·s, more preferably not less than 500 mPa·s, even more preferably not less than 750 mPa·s, still more preferably not less than 1000 mPa·s, and particularly preferably not less than 1500 mPa·s, at 25° C. With this feature, the resin (B) is not impregnated into the fine polymer particles (A) but can enter gaps between the plurality of fine polymer particles (A) and remain in the vicinity of the surfaces of the fine polymer particles (A). Thus, the fine polymer particles (A) are prevented, by the resin (B), from fusing together.

The viscosity of the resin (B) is more preferably 100 mPa·s to 750,000 mPa·s, more preferably 100 mPa·s to 700,000 mPa·s, more preferably 100 mPa·s to 350,000 mPa·s, more preferably 100 mPa·s to 300,000 mPa·s, more preferably 100 mPa·s to 50,000 mPa·s, even more preferably 100 mPa·s to 30,000 mPa·s, and particularly preferably 100 mPa·s to 15,000 mPa s, at 25° C.

In a case where the resin (B) is a semisolid at 25° C., it can be said that the resin (B) is a semiliquid at 25° C., and it can be said that the resin (B) has a viscosity of more than 1,000,000 mPa·s at 25° C. In a case where the resin (B) is a semisolid or a solid at 25° C., the resin composition which contains the resulting powdery and/or granular material has an advantage of being less sticky and being easy to handle.

Furthermore, the viscosity of the resin (B) at 25° C. is preferably not more than a value obtained by adding 50000 mPa·s to the viscosity of the matrix resin (C) at 25° C. From the viewpoint of easiness in uniformly mixing the resin (B) with the matrix resin (C), in a case where the viscosity of the resin (B) at 25° C. is not lower than the viscosity of the matrix resin (C) at 25° C., the viscosity of the resin (B) at 25° C. is more preferably not more than a value obtained by adding 20000 mPa·s, more preferably not more than a value obtained by adding 10000 mPa·s, even more preferably not more than a value obtained by adding 5000 mPa·s, most preferably not more than a value obtained by adding 0 mPa·s, to the viscosity of the matrix resin (C) at 25° C.

The viscosity of the resin (B) can be measured by a viscometer. A method of measuring the viscosity of the resin (B) will be described later in detail in Examples.

The resin (B) is preferably a resin whose differential scanning calorimetry (DSC) thermogram shows an endothermic peak at 25° C. or below, more preferably a resin whose differential scanning calorimetry (DSC) thermogram shows an endothermic peak at 0° C. or below.

The amount of the resin (B) contained in the first powdery and/or granular material is as follows: the fine polymer particles (A) are contained in an amount of 50% by weight to 99% by weight and the resin (B) is contained in an amount of 1% by weight to 50% by weight, where 100% by weight represents the total amount of the fine polymer particles (A) and the resin (B). The amount of the resin (B) can be set as appropriate according to the type of resin (B), physical properties (solid, semisolid, liquid, viscosity, or the like) of the resin (B), and the like, provided that the amount of the resin (B) is within the above numerical range and that a powdery and/or granular material can be obtained. In a case where the resin (B) is liquid at 25° C. and the amount of the resin (B) contained in the powdery and/or granular material is large, there may be cases where a powdery and/or granular material is not obtained. In a case where the resin (B) is liquid at 25° C. and the amount of the resin (B) contained in the powdery and/or granular material is large, the flowability (thinness) of the powdery and/or granular material may decrease.

The following description discusses the amount of the resin (B) contained in the first powdery and/or granular material, from the viewpoint of achieving excellent anti-blocking property. In a case where 100% by weight represents the total amount of the fine polymer particles (A) and the resin (B), it is more preferable that the fine polymer particles (A) be contained in an amount of 55% by weight to 99% by weight and the resin (B) be contained in an amount of 1% by weight to 45% by weight, more preferable that the fine polymer particles (A) be contained in an amount of 60% by weight to 99% by weight and the resin (B) be contained in an amount of 1% by weight to 40% by weight, more preferable that the fine polymer particles (A) be contained in an amount of 65% by weight to 99% by weight and the resin (B) be contained in an amount of 1% by weight to 35% by weight, more preferable that the fine polymer particles (A) be contained in an amount of 70% by weight to 99% by weight and the resin (B) be contained in an amount of 1% by weight to 30% by weight, more preferable that the fine polymer particles (A) be contained in an amount of 75% by weight to 99% by weight and the resin (B) be contained in an amount of 1% by weight to 25% by weight, more preferable that the fine polymer particles (A) be contained in an amount of 80% by weight to 99% by weight and the resin (B) be contained in an amount of 1% by weight to 20% by weight, even more preferable that the fine polymer particles (A) be contained in an amount of 85% by weight to 99% by weight and the resin (B) be contained in an amount of 1% by weight to 15% by weight, even more preferable that the fine polymer particles (A) be contained in an amount of 90% by weight to 99% by weight and the resin (B) be contained in an amount of 1% by weight to 10% by weight, particularly preferable that the fine polymer particles (A) be contained in an amount of 95% by weight to 99% by weight and the resin (B) be contained in an amount of 1% by weight to 5% by weight.

The following description discusses the amount of the resin (B) contained in the first powdery and/or granular material, from the viewpoint of achieving good dispersibility of the fine polymer particles (A) in the matrix resin (C). It is preferable that, in a case where 100% by weight represents the total amount of the fine polymer particles (A) and the resin (B), the fine polymer particles (A) be contained in an amount of 50% by weight to 97% by weight and the resin (B) be contained in an amount of 3% by weight to 50% by weight, more preferable that the fine polymer particles (A) be contained in an amount of 50% by weight to 95% by weight and the resin (B) be contained in an amount of 5% by weight to 50% by weight, more preferable that the fine polymer particles (A) be contained in an amount of 50% by weight to 92% by weight and the resin (B) be contained in an amount of 8% by weight to 50% by weight, more preferable that the fine polymer particles (A) be contained in an amount of 50% by weight to 90% by weight and the resin (B) be contained in an amount of 10% by weight to 50% by weight, more preferable that the fine polymer particles (A) be contained in an amount of 50% by weight to 87% by weight and the resin (B) be contained in an amount of 13% by weight to 50% by weight, more preferable that the fine polymer particles (A) be contained in an amount of 50% by weight to 85% by weight and the resin (B) be contained in an amount of 15% by weight to 50% by weight, even more preferable that the fine polymer particles (A) be contained in an amount of 50% by weight to 82% by weight and the resin (B) be contained in an amount of 18% by weight to 50% by weight, even more preferable that the fine polymer particles (A) be contained in an amount of 50% by weight to 80% by weight and the resin (B) be contained in an amount of 20% by weight to 50% by weight, particularly preferable that the fine polymer particles (A) be contained in an amount of 60% by weight to 80% by weight and the resin (B) be contained in an amount of 20% by weight to 40% by weight.

(I-2-3. Anti-Blocking Agent)

The first powdery and/or granular material preferably further contains an anti-blocking agent. With this feature, the resulting powdery and/or granular material (a) has an excellent anti-blocking property, and (b) achieves excellent dispersibility of the fine polymer particles (A) in the matrix resin (C).

The anti-blocking agent is not particularly limited, provided that the effect of one or more embodiments of the present invention is obtained. Examples of the anti-blocking agent encompass: anti-blocking agents composed of inorganic fine particles, such as fine particles of silicon dioxide, titanium oxide, aluminum oxide, zirconium oxide, aluminum silicate, diatomaceous earth, zeolite, kaolin, talc, calcium carbonate, calcium phosphate, barium sulfate, or magnesium hydrosilicate; anti-blocking agents composed of organic fine particles; and fat-based and/or oil-based anti-blocking agents such as polyethylene wax, higher fatty acid amides, metal soap, and silicone oil. Out of such anti-blocking agents, anti-blocking agents composed of fine particles are preferred, anti-blocking agents composed of organic fine particles are more preferred. The anti-blocking agent composed of organic fine particles may be an anti-blocking agent composed of organic fine particles of a polymer that contains, as one or more structural units, one or more structural units derived from at least one type of monomer selected from aromatic vinyl-based monomers, vinyl cyanide monomers, and (meth)acrylate monomers.

An anti-blocking agent composed of fine particles, in general, is in the form of a dispersion composed of the fine particles and a medium in which the particles are dispersed or is in the form of a colloid. The fine particles in the anti-blocking agent have a volume-average particle size (Mv) of usually not greater than 10 μm, preferably 0.05 μm to 10.00 μm. The amount of the anti-blocking agent with respect to the total weight (100% by weight) of the powdery and/or granular material is preferably 0.01% by weight to 5.00% by weight, more preferably 0.50% by weight to 3.00% by weight.

(I-2-4. Other Optional Components)

The first powdery and/or granular material may contain, as necessary, other optional component(s) other than the above-described components. Examples of the other optional components include various kinds of components which will be described later in the section (4-5. Other optional components).

The anti-blocking agent and other optional component(s) can be added as appropriate during any step of a method of production of the first powdery and/or granular material. For example, the anti-blocking agent and other optional component(s) can be added to an aqueous suspension (aqueous latex) before or after flocculation of the fine polymer particles (A) or the fine polymer particles (A) and resin (B). Alternatively, the anti-blocking agent and other optional component(s) can be added to a powdery and/or granular material containing the fine polymer particles (A), the resin (B), or the fine polymer particles (A) and resin (B).

(I-2-5. Physical Properties of Powdery and/or Granular Material)

(Domain of Resin (B) in TEM Image)

For the fine polymer particles (A) in the powdery and/or granular material to be prevented from fusing together, it is preferable that, in the powdery and/or granular material, the resin (B) having a longitudinal dimension not less than 1.5 times the volume-average particle size of the fine polymer particles (A) in the form of primary particles be small in amount. Specifically, when the powdery and/or granular material is subjected to transmission electron microscopy (TEM) and a TEM image is obtained, in the TEM image, the number of domains in each of which the longitudinal dimension of the resin (B) is not less than 1.5 times the average particle size of the fine polymer particles (A) may be not more than five, not more than three, not more than one, or not more than zero.

A known method can be used as the transmission electron microscopy. An example is a method involving: freezing a powdery and/or granular material and then slicing the frozen product with use of an ultramicrotome to obtain a slice sample having a thickness of about 100 nm; and then staining the slice with osmium ($OsO_4$) and then subjecting the sample to transmission electron microscopy (TEM). The "longitudinal dimension" of the resin (B) refers to the longest dimension (the longest straight line connecting two points on the periphery) in the TEM image. The "average particle size" of the fine polymer particles (A) in the form of primary particles can be calculated from, for example, the average of diameters of virtual circles equal in area to the projections (such diameters are area-equivalent circle diameters) of randomly selected thirty fine polymer particles (A) in a TEM image.

(Volume-Average Particle Size of Powdery and/or Granular Material)

The volume-average particle size (Mv) of the powdery and/or granular material may be 30 μm to 500 μm, 30 μm to 300 μm, 50 μm to 300 μm, or 100 μm to 300 μm. With this feature, the powdery and/or granular material is such that the fine polymer particles (A) are highly dispersible in the matrix resin (C). Furthermore, with the above feature, the powdery and/or granular material can provide a resin composition in which the fine polymer particles (A) are uniformly dispersed in the matrix resin (C), which has a desired viscosity, and which is highly stable. In the present specification, the volume-average particle size of the powdery and/or granular material is a value obtained by carrying out measurement using a laser diffraction particle size distribution analyzer (Microtrac MT3000II) manufactured by MicrotracBEL Corp.

The particle-number-based distribution of the volume-average particle size of the powdery and/or granular material may have a full width at half maximum which is not less than 0.5 times and not more than 1 time the volume-average particle size, because of the following advantages: the resulting powdery and/or granular material is less likely to contain fine powder that is a possible cause of dust explosion or coarse particles that are poorly dispersed.

The granules having a volume-average particle size of not less than 1000 μm is preferably not more than 6.00% by weight, more preferably not more than 5.00% by weight, more preferably not more than 4.50% by weight, more preferably not more than 4.00% by weight, more preferably not more than 3.50% by weight, more preferably not more than 3.00% by weight, more preferably not more than 2.50% by weight, more preferably not more than 2.00% by weight, more preferably not more than 1.50% by weight, more preferably not more than 1.00% by weight, even more preferably not more than 0.50% by weight, particularly preferably not more than the detection limit (e.g., 0.00%), with respect to the total amount (100% by weight) of the powdery and/or granular material. With this feature, the powdery and/or granular material has an advantage of remarkably excellent dispersibility of the fine polymer particles (A) in the matrix resin (C). Note that the "granules having a volume-average particle size of not less than 1000 μm" means powder having a particle size of not less than 1000 μm when the volume-average particle size (Mv) of the fine polymer particles (A) is measured with use of a laser diffraction particle size distribution analyzer Microtrac MT3000II (manufactured by MicrotracBEL Corp.).

The amount of the granules having a volume-average particle size of not less than 600 μm is preferably not more than 6.00% by weight, more preferably not more than 5.50% by weight, preferably not more than 5.00% by weight, more preferably not more than 4.50% by weight, more preferably not more than 4.00% by weight, more preferably not more than 3.50% by weight, more preferably not more than 3.00% by weight, more preferably not more than 2.50% by weight, more preferably not more than 1.90% by weight, more preferably not more than 2.00% by weight, more preferably not more than 1.50% by weight, more preferably not more than 1.00% by weight, even more preferably not more than 0.50% by weight, particularly preferably not more than the detection limit (e.g., 0.00%), with respect to the total amount (100% by weight) of the powdery and/or granular material. With this feature, the powdery and/or granular material has an advantage of remarkably excellent dispersibility of the fine polymer particles (A) in the matrix resin (C). Note that the "granules having a volume-average particle size of not less than 600 μm" means powder having a particle size of not less than 600 μm when the volume-average particle size (Mv) of the powdery and/or granular material is measured with use of a laser diffraction particle size distribution analyzer Microtrac MT3000II (manufactured by Microtrac-BEL Corp.).

The method for setting the proportion of the granules having the volume-average particle size of not less than 1000 μm or 600 μm with respect to the total amount of the powdery and/or granular material to fall within the above preferable numerical range is not particularly limited, and methods as follows can be employed: (1) a method in which gas phase flocculation in the agglutinating step (described later) is carried out in the method for producing a powdery and/or granular material; and (2) a method in which the obtained powdery and/or granular material is sieved with use of a mesh having a predetermined pore diameter.

(Pore in Powdery and/or Granular Material)

The powdery and/or granular material has pores with an average pore diameter of 0.03 μm to 1.00 μm, and a total volume of the pores is not less than 0.0600 mL/g. In the present specification, the average pore diameter of the powdery and/or granular material and the total volume of pores having a specific average pore diameter are values obtained by measurement with use of an automatic mercury porosimeter (pore size distribution measuring device).

The total volume of pores having an average pore diameter of 0.03 μm to 1.00 μm in the powdery and/or granular material is more preferably not less than 0.0650 mL/g, more preferably not less than 0.0700 mL/g, more preferably not less than 0.0720 mL/g, more preferably not less than 0.0750 mL/g, more preferably not less than 0.0800 mL/g, more preferably not less than 0.0850 mL/g, more preferably not less than 0.0900 mL/g, more preferably not less than 0.0950 mL/g, more preferably not less than 0.1000 mL/g, even more preferably not less than 0.1050 mL/g, particularly preferably not less than 0.1100 mL/g. With this feature, the powdery and/or granular material has an advantage of remarkably excellent dispersibility of the fine polymer particles (A) in the matrix resin (C).

The powdery and/or granular material may have pores having an average pore diameter of 0.03 μm to 4.50 μm. The total volume of pores having an average pore diameter of 0.03 μm to 4.50 μm in the powdery and/or granular material is more preferably not less than 0.0900 mL/g, more preferably not less than 0.0950 mL/g, more preferably not less than 0.1000 mL/g, more preferably not less than 0.1050 mL/g, more preferably not less than 0.1100 mL/g, more preferably not less than 0.1150 mL/g, more preferably not less than 0.1200 mL/g, more preferably not less than 0.1250 mL/g, even more preferably not less than 0.1300 mL/g, particularly preferably not less than 0.1350 mL/g. With this feature, the powdery and/or granular material has an advantage of remarkably excellent dispersibility of the fine polymer particles (A) in the matrix resin (C).

(Anti-Blocking Property)

The first powdery and/or granular material has an excellent anti-blocking property. In the present specification, the anti-blocking property of the powdery and/or granular material can be evaluated on the basis of a force required to break a block of the powdery and/or granular material. The first powdery and/or granular material may be such that a force required to break a block of the powdery and/or granular material is not more than 30000 Pa. It is noted here that the block is a block obtained by applying, to the powdery and/or granular material which is being allowed to stand, a load of 6.3 kg at 60° C. for 2 hours by placing a 6.3 kg weight on 30 g of the powdery and/or granular material contained in a cylindrical container having a diameter of 50 mm. It is also noted that the force (force required to break the block of the powdery and/or granular material) is a value obtained by measurement using a rheometer.

I-3. Method for Producing Powdery and/or Granular Material

A method for producing a powdery and/or granular material in accordance with one or more embodiments of the present invention includes an agglutinating step of preparing an agglutinate containing fine polymer particles (A) and a resin (B), and a drying step of airflow-drying or freeze-drying the agglutinate. The fine polymer particles (A) contain a rubber-containing graft copolymer that includes an elastic body and a graft part grafted to the elastic body. The elastic body contains at least one selected from the group consisting of diene-based rubbers, (meth)acrylate-based rubbers, and organosiloxane-based rubbers. The graft part contains a polymer that contains, as one or more structural units, one or more structural units derived from at least one type of monomer selected from the group consisting of aromatic vinyl monomers, vinyl cyanide monomers, and (meth)acrylate monomers. The resin (B) is a liquid which has a viscosity of 100 mPa·s to 1,000,000 mPa·s at 25° C., a semisolid, or a solid. The fine polymer particles (A) are contained in an amount of 50% by weight to 99% by weight and the resin (B) is contained in an amount of 1% by weight to 50% by weight, where 100% by weight represents the total amount of the fine polymer particles (A) and the resin (B). A "method for producing a powdery and/or granular material in accordance with one or more embodiments of the present invention" may be referred to as a "first production method".

The first production method has the above features, and therefore has an advantage of providing a powdery and/or granular material which achieves excellent dispersibility of the fine polymer particles (A) in a matrix resin. In other words, the first production method has the foregoing feature, and therefore has an advantage of providing a powdery and/or granular material that can provide, when being mixed with the matrix resin (C), a resin composition in which the fine polymer particles (A) are uniformly dispersed in the matrix resin (C).

The following description will discuss the steps of the first production method in detail. Matters other than those described below (for example, components and amounts thereof, etc.) are not particularly limited, and the foregoing descriptions in the section [I-2. Powdery and/or granular material] apply as appropriate.

(I-3-1. Agglutinating Step)

The agglutinating step is not particularly limited, provided that an agglutinate containing the fine polymer particles (A) and the resin (B) can be ultimately obtained, in other words, provided that an agglutinate that is ultimately obtained contains the fine polymer particles (A) and the resin (B).

The agglutinating step may include, for example, the following steps in order: a preparation step (a1) of preparing an aqueous latex containing fine polymer particles (A) and a resin (B); and an agglutinating step (a2) of agglutinating the fine polymer particles (A) and the resin (B) together in the obtained aqueous latex.

The preparation step (a1) is not particularly limited, provided that an aqueous latex containing the fine polymer particles (A) and the resin (B) can be obtained. A method of obtaining an aqueous latex containing the fine polymer particles (A) and the resin (B) is, for example, (i) a method involving adding the resin (B) to a reaction solution during a polymerization step for the fine polymer particles (A); (ii) a method involving adding the resin (B) to an aqueous latex of the fine polymer particles (A); and (iii) a method involving forming the resin (B) by polymerization in an aqueous latex of the fine polymer particles (A).

A method of adding the resin (B) to the reaction solution or to the aqueous latex of the fine polymer particles (A) during the polymerization step for the fine polymer particles (A) is not particularly limited. Examples of the method encompass (i) a method involving adding the resin (B) directly to the reaction solution or the aqueous latex, (ii) a method involving separately preparing an aqueous latex that contains the resin (B) and then adding the aqueous latex that contains the resin (B) to the reaction solution or the aqueous latex, and (iii) a method involving separately preparing a solution that contains the resin (B) and then adding the solution that contains the resin (B) to the reaction solution or the aqueous latex. A method of adding the resin (B) may be the method involving separately preparing an aqueous latex that contains the resin (B) and then adding the aqueous latex that contains the resin (B) to the reaction solution or the aqueous latex.

In a case where the agglutinating step (a2) is in a mode of using a flocculant, a point in time at which the resin (B) is added to the aqueous latex of the fine polymer particles (A) can be a point in time before or after adding the flocculant, or the resin (B) can be added to the fine polymer particles (A) together with the flocculant.

The method of obtaining the aqueous latex containing the fine polymer particles (A) and the resin (B) may be a method involving adding the resin (B) in the form of aqueous latex to an aqueous latex of the fine polymer particles (A).

The agglutinating step (a2) is not particularly limited, provided that an agglutinate containing the fine polymer particles (A) and the resin (B) can be obtained. A method for allowing the fine polymer particles (A) and the resin (B) in the aqueous latex to agglutinate together is not particularly limited. The method can be, for example, a known method such as a method using a flocculant, a method using a solvent, or a method involving spraying the aqueous latex. It is noted here that, when the fine polymer particles (A) and the resin (B) in the aqueous latex are allowed to agglutinate together, a mixture that contains (i) the agglutinate containing the fine polymer particles (A) and the resin (B) and (ii) an aqueous solvent may also be referred to as slurry.

In order to achieve a good anti-blocking property and to allow the fine polymer particles (A) to be well dispersed in the matrix resin (C), it is preferable that the fine polymer particles (A) and the resin (B) in the aqueous latex be allowed to agglutinate in the presence of an anti-blocking agent.

It is preferable to employ, as the agglutinating step (a2), a method in which a flocculant is used. In other words, in the agglutinating step in the first production method, it is preferable to use a flocculant.

The flocculant is not particularly limited, provided that the flocculant is a substance having a characteristic that can allow the fine polymer particles (A) and the resin (B) contained in an aqueous latex to agglutinate (or coagulate or flocculate) when being brought into contact with the aqueous latex. Examples of the flocculant include aqueous solutions of inorganic salts, aqueous solutions of inorganic acids, aqueous solutions of organic salts, aqueous solutions of organic acids, polymer flocculants, and the like.

Examples of the inorganic salts include chloride salts, bromide salts, iodide salts, sulfates, nitrates, ammonium salts, phosphates, and the like. Specific examples of the inorganic salt include sodium chloride, potassium chloride, lithium chloride, sodium bromide, potassium bromide, lithium bromide, potassium iodide, sodium iodide, potassium sulfate, sodium sulfate, ammonium sulfate, ammonium chloride, sodium nitrate, potassium nitrate, calcium chloride, ferrous sulfate, magnesium sulfate, zinc sulfate, copper sulfate, barium chloride, ferrous chloride, ferric chloride, magnesium chloride, ferric sulfate, aluminum sulfate, potassium alum, iron alum, and the like.

Examples of the inorganic acids include hydrochloric acid, sulfuric acid, nitric acid, phosphoric acid, and the like.

Examples of the organic salts include acetates, citrates, formates, gluconates, lactates, oxalates, tartrates, and the like of alkali metals or alkaline-earth metals. Specific examples of the organic acid salts include sodium acetate, calcium acetate, sodium formate, calcium formate, and the like.

Examples of the organic acids include acetic acid, formic acid, and the like.

The polymer flocculant is not particularly limited, provided that the polymer flocculant is a polymer compound having a hydrophilic group and a hydrophobic group, and may be any of anionic, cationic, and nonionic polymer flocculants. From the viewpoint of heightening the functional effect of one or more embodiments of the present invention, the polymer flocculant may be a cationic polymer flocculant. The cationic polymer flocculant only needs to be a polymer flocculant having a cationic group in molecules, i.e., a polymer flocculant which exhibits a cationic property when being dissolved in water. Examples of the cationic polymer flocculant encompass polyamines, polydicyandiamides, cationized starch, cation-based poly(meth)acrylamide, water-soluble aniline resin, polythiourea, polyethyleneimine, quaternary ammonium salts, polyvinylpyridines, chitosan, and the like.

As the flocculant, these compounds may be used alone or in combination of two or more. As the flocculant, among these compounds, an aqueous solution of a monovalent or bivalent inorganic salt or inorganic acid of sodium chloride, potassium chloride, sodium sulfate, ammonium chloride, calcium chloride, magnesium chloride, magnesium sulfate, barium chloride, hydrochloric acid, sulfuric acid, or the like can be suitably used. A method of adding the flocculant is not particularly limited, and the flocculant can be added at a time, added batchwise, or continuously added.

By making an aqueous latex containing the fine polymer particles (A) and the resin (B) contact with the flocculant or a solution (e.g., aqueous solution) of the flocculant, it is possible to allow the fine polymer particles (A) and the resin (B) to agglutinate. A method of making the aqueous latex containing the fine polymer particles (A) and the resin (B) contact with the flocculant or the solution of the flocculant is not particularly limited. Examples of the method include (i) a method in which the aqueous latex containing the fine polymer particles (A) and the resin (B) is brought into contact with the flocculant or the solution of the flocculant (hereinafter, referred to as "agglutination method 1") and (ii) a method in which droplets containing the fine polymer particles (A) and the resin (B) obtained by spraying the aqueous latex containing the fine polymer particles (A) and the resin (B) are brought into contact with the flocculant or the solution of the flocculant (hereinafter, referred to as "agglutination method 2").

The agglutination method 1 is a method in which the aqueous latex containing the fine polymer particles (A) and the resin (B) is used in the liquid phase, in other words, the aqueous latex containing the fine polymer particles (A) and the resin (B) is not sprayed. In the present specification, the agglutination method 1 is also referred to as "liquid phase flocculation".

The agglutination method 1 will be described in detail. Specific examples of the agglutination method 1 include (1-i) a method involving adding the flocculant to the aqueous latex containing the fine polymer particles (A) and the resin (B), (1-ii) a method involving mixing the aqueous latex containing the fine polymer particles (A) and the resin (B) with a solution of the flocculant, and (1-iii) a method involving spraying the flocculant or a solution of the flocculant into the aqueous latex containing the fine polymer particles (A) and the resin (B). It can also be said that the method (1-iii) is a method involving spraying the flocculant or the solution of the flocculant in the presence of the fine polymer particles (A) and the resin (B). With the agglutination method 1, an aqueous latex containing the fine polymer particles (A), the resin (B), and the flocculant can be obtained.

The agglutination method 1 may further include a step of heating the obtained aqueous latex (i.e., the aqueous latex containing the fine polymer particles (A), the resin (B), and the flocculant). In a case where the step of heating the aqueous latex that contains the fine polymer particles (A), the resin (B), and the flocculant is included, this makes it possible to bring about an advantage of reducing the water content of the resulting agglutinate and/or an advantage of reducing the amount of fine powder contained in the resulting powdery and/or granular material. The temperature of the aqueous latex obtained by heating the aqueous latex containing the fine polymer particles (A), the resin (B), and the flocculant in the heating step (heating temperature) is not particularly limited.

The agglutination method 2 is a method in which the aqueous latex containing the fine polymer particles (A) and the resin (B) is sprayed, in other words, the aqueous latex containing the fine polymer particles (A) and the resin (B) is used as droplets. In the present specification, the agglutination method 2 is also referred to as "gas phase flocculation".

The agglutination method 2 will be described in detail. Specific examples of the agglutination method 2 include (2-i) a method involving spraying the aqueous latex containing the fine polymer particles (A) and the resin (B) into the flocculant or a solution of the flocculant, and (2-ii) a method involving spraying the aqueous latex containing the fine polymer particles (A) and the resin (B), and spraying the flocculant or a solution of the flocculant. It can also be said that the method (2-i) is a method including a fine polymer particle spraying step of spraying the aqueous latex containing the fine polymer particles (A) and the resin (B) in the presence of the flocculant.

The method (2-ii) will be described in detail. The method (2-ii) can include the following modes: (2-ii-a) a method involving bringing droplets, which contain the fine polymer particles (A) and/or the resin (B) and have been obtained by spraying, into contact with droplets which contain the flocculant and have been obtained by spraying; (2-ii-b) a method involving spraying an aqueous latex containing the fine polymer particles (A) and the resin (B) in a region (space) in which droplets which contain the flocculant and have been obtained by spraying are present; and (2-ii-c) a method involving spraying a solution of the flocculant in a region (space) in which droplets which contain the fine polymer particles (A) and/or the resin (B) and have been obtained by spraying are present. It can also be said that the region (space) in which droplets which contain the flocculant are present is "in the presence of the flocculant". It can also be said that the region (space) in which droplets which contain the fine polymer particles (A) and/or the resin (B) are present is "in the presence of the fine polymer particles (A) and the resin (B)". Therefore, it can also be said that the method (2-ii) is a method including a fine polymer particle spraying step of spraying the aqueous latex containing the fine polymer particles (A) and the resin (B) in the presence of the flocculant, and a flocculant spraying step of spraying the flocculant or a solution of the flocculant in the presence of the fine polymer particles (A) and the resin (B).

The agglutinating step in the first production method may be carried out by the agglutination method 2, i.e., the "gas phase flocculation". In other words, the agglutinating step in the first production method may further include a fine polymer particle spraying step of spraying the aqueous latex containing the fine polymer particles (A) and the resin (B) in the presence of the flocculant. According to the feature, it is possible to bring about an advantage of obtaining a powdery and/or granular material which has a small proportion of granules having a volume-average particle size of not less than 1000 μm or granules having a volume-average particle size of not less than 600 μm with respect to the total amount of the powdery and/or granular material. The agglutinating step in the first production method may further include a flocculant spraying step of spraying the flocculant or a solution containing the flocculant in the presence of the fine polymer particles (A) and the resin (B), in addition to the fine polymer particle spraying step. According to the feature, it is possible to bring about an advantage of obtaining a powdery and/or granular material which has a smaller proportion of granules having a volume-average particle size of not less than 1000 μm or granules having a volume-average particle size of not less than 600 μm with respect to the total amount of the powdery and/or granular material.

With the foregoing preparation step (a1) and agglutinating step (a2), it is possible to obtain slurry that contains the agglutinate containing the fine polymer particles (A) and the resin (B). The agglutinating step may further include a collecting step (a3) of collecting, from the slurry, the obtained agglutinate, i.e., the agglutinate containing the fine polymer particles (A) and the resin (B).

The collecting step (a3) is not particularly limited, provided that the aqueous solvent and the agglutinate in the slurry can be separated. A known method can be employed. The collecting step (a3) can be, for example, a method involving subjecting the slurry to filtration, a method involving subjecting the slurry to centrifugal dehydration, or the like.

Examples of other modes of the agglutinating step may include, for example, the following steps in order: an agglutinating step (b1) of using an aqueous latex that contains only the fine polymer particles (A) and allowing the fine polymer particles (A) in the aqueous latex to agglutinate; a collecting step (b2) of collecting the obtained agglutinate of the fine polymer particles (A); and a mixing step (b3) of mixing the collected agglutinate of the fine polymer particles (A) with the resin (B).

The agglutinating step (b1) may be in the same mode as the foregoing agglutinating step (a2) including the preferable mode of the agglutinating step (a2), except for using an aqueous latex containing only the fine polymer particles (A) instead of the aqueous latex containing the fine polymer particles (A) and the resin (B).

The collecting step (b2) may be in the same mode as the foregoing collecting step (a3) including the preferable mode of the collecting step (a3), except that the agglutinate does not contain both the fine polymer particles (A) and the resin (B) but contains only the fine polymer particles (A).

A method for mixing the collected agglutinate of the fine polymer particles (A) with the resin (B) in the mixing step (b3) is not particularly limited. The method can be, for example, a mechanical mixing method using a planetary centrifugal mixer, a planetary mixer, a disper mixer, or the like.

(I-3-2. Water Content in Agglutinate)

The agglutinate containing the fine polymer particles (A) and the resin (B) obtained in the agglutinating step can contain water. The water content in the agglutinate may be 10% to 70%, 20% to 60%, 30% to 60%, 30% to 50%, or 30% to 40%, with respect to the total weight (100% by weight) of the agglutinate. The water content of the agglutinate can be measured by drying the obtained agglutinate in an oven at 120° C. for 1 hour, and comparing the weights before and after the drying.

(I-3-3. Drying Step)

The drying step is a step of drying the agglutinate containing the fine polymer particles (A) and the resin (B) obtained in the foregoing agglutinating step. In the first production method, the agglutinate is airflow-dried or freeze-dried in the drying step.

In the present specification, the airflow drying means drying that is carried out while the agglutinate is allowed to float in a certain space. The method of airflow drying is not particularly limited, and a conventionally known method can be employed. An example of airflow drying includes a method in which the agglutinate is accommodated in a container, and gas at a predetermined temperature is supplied into the container so as to dry the agglutinate while allowing the agglutinate to float in the container.

The atmospheric temperature at which the drying step is carried out is not particularly limited. The drying step is preferably carried out at a temperature of not higher than 100° C., more preferably carried out at a temperature of not higher than 90° C., more preferably carried out at a temperature of not higher than 80° C., more preferably carried out at a temperature of not higher than 70° C., more preferably carried out at a temperature of not higher than 60° C., more preferably carried out at a temperature of not higher than 50° C., more preferably carried out at a temperature of not higher than 40° C., more preferably carried out at a temperature of not higher than 30° C., more preferably carried out at a temperature of not higher than 20° C., even more preferably carried out at a temperature of not higher than 10° C., particularly preferably carried out at a temperature of not higher than 0° C., because the obtained powdery and/or granular material can achieve more excellent dispersibility of the fine polymer particles (A) in the matrix resin (C).

In the airflow drying, the atmospheric temperature at which the drying step is carried out can be adjusted by changing the temperature in the container accommodating the agglutinate, the temperature of the gas supplied into the container, and/or the like.

The gas supplied into the container in the airflow drying is not particularly limited. Examples of the gas include air, nitrogen, a mixture of nitrogen and air, a mixture of nitrogen and oxygen, rare gases, and the like.

The method of freeze drying is not particularly limited, and a conventionally known method can be employed. In a case where the freeze drying is employed as the drying step, the drying step can be easily carried out at not higher than 0° C.

The time of the drying step is not particularly limited, and can be set as appropriate in accordance with a degree of drying the agglutinate. The drying time is, for example, 1 minute to 3 hours, preferably 1 minute to 1 hour, more preferably 1 minute to 30 minutes, even more preferably 1 minute to 20 minutes, particularly preferably 1 minute to 10 minutes. The drying step may be carried out, for example, for a time until the temperature of the agglutinate (powdery and/or granular material) reaches 40° C.

In the present specification, a mode in which the agglutinate containing the fine polymer particles (A) and the resin (B) is dried while being allowed to stand in a container such as an oven as in conventional techniques is also referred to as "stationary drying".

(I-3-4. Rinsing Step)

The first production method may further include, between the agglutinating step and the drying step, a step of rinsing the agglutinate obtained in the agglutinating step. By rinsing the agglutinate, it is possible to obtain a powdery and/or granular material containing a small amount of contaminants, and the like. In the rinsing step, the agglutinate may be rinsed with water, or rinsed with ion exchanged water or pure water.

The rinsing step is not particularly limited in terms of a specific method, provided that the agglutinate is rinsed. Examples of the specific method of the rinsing step include: a method involving mixing the agglutinate with water and stirring the mixture by a stirrer; a method involving kneading the agglutinate and water with use of a kneader; a method involving mixing the agglutinate with water with use of a planetary centrifugal mixer; a method involving spraying water onto the agglutinate; and a method involving carrying out cake rinsing with use of a press filter. Examples of the kneader include various types of kneaders such as batch type kneaders, continuous type kneaders, extrusion kneaders, and extruders.

The period of time during which the rinsing is carried out is not particularly limited, and is, for example, 1 second to 60 minutes. The period of time during which the rinsing is carried out is preferably 1 second to 45 minutes, more preferably 1 second to 30 minutes, more preferably 1 minute to 30 minutes, even more preferably 3 minutes to 30 minutes, particularly preferably 5 minutes to 30 minutes, particularly preferably 10 minutes to 30 minutes.

The number of times the rinsing is carried out is not particularly limited, and is, for example, 1 (cycle) to 10 (cycles). The number of times the rinsing is carried out is preferably 1 (cycle) to 6 (cycles), more preferably 1 (cycle) to 5 (cycles), even more preferably 1 (cycle) to 4 (cycles), most preferably 1 (cycle) to 3 (cycles).

The amount of rinse water is not particularly limited, and is, for example, 0.1 parts by weight to 1000 parts by weight with respect to 1 part by weight of the agglutinate. The amount of rinse water with respect to 1 part by weight of the agglutinate is preferably 1 part by weight to 1000 parts by weight, more preferably 1 part by weight to 500 parts by weight, more preferably 1 part by weight to 200 parts by weight, more preferably 10 part by weight to 200 parts by weight, even more preferably 15 part by weight to 200 parts by weight, particularly preferably 20 parts by weight to 200 parts by weight. The amount of rinse water with respect to 1 part by weight of the agglutinate is also preferably 1 part by weight to 10 parts by weight, also preferably 2 parts by weight to 10 parts by weight, also preferably 2 parts by weight to 5 parts by weight. Rinsing by kneading the agglutinate and water with use of a kneader is preferred, because a small amount of rinse water will suffice.

The temperature of rinse water is not limited. Rinse water can be, for example, water at room temperature or water warmer than room temperature. Rinse water warmer than room temperature is preferred because such warmer water is more effective in rinsing. The temperature of rinse water is, for example, 10° C. to 100° C. The temperature of rinse water is preferably 15° C. to 100° C., more preferably 20° C. to 100° C., more preferably 40° C. to 100° C., more preferably 40° C. to 90° C., even more preferably 40° C. to 85° C., even more preferably 40° C. to 80° C., particularly preferably 40° C. to 70° C.

In the rinsing step, a method of removing rinse water used in rinsing is not particularly limited. Examples of the method include wiping away rinse water used in rinsing, filtration under reduced pressure, oil-water separation, filter press, centrifugation, belt press, screw press, membrane separation, and press dehydration.

An object to be removed by rinsing is intended to mean impurities contained in the agglutinate in general, and is not particularly limited. Examples of the object include: contaminants derived from an emulsifying agent (e.g., phosphorus-based emulsifying agent, sulfonic acid-based emulsifying agent); and, in a case where the flocculant is used, contaminants derived from the flocculant.

(I-3-5. Temperature)

An agglutinate containing the fine polymer particles (A) and the resin (B) and a powdery and/or granular material containing the fine polymer particles (A) and the resin (B) may be operated (handled) in the environment at a temperature lower than the glass transition temperature of the graft part of the fine polymer particles (A) throughout the production method. In other words, the time for which an agglutinate containing the fine polymer particles (A) and the resin (B) and a powdery and/or granular material containing the fine polymer particles (A) and the resin (B) are subjected to the environment at a temperature equal to or higher than the glass transition temperature of the graft part of the fine polymer particles (A) may be shorter, throughout the production method. With this feature, the resulting powdery and/or granular material is such that the fine polymer particles (A) are even more dispersible in the matrix resin (C). As a result, the resulting powdery and/or granular material can provide a resin composition in which the fine polymer particles (A) are more uniformly dispersed in the matrix resin (C).

Adjusting the following temperatures in the first production method makes it possible to shorten the time (period) for which an agglutinate containing the fine polymer particles (A) and the resin (B) and a powdery and/or granular material containing the fine polymer particles (A) and the resin (B) are subjected to the environment at a temperature equal to or higher than the glass transition temperature of the graft part of the fine polymer particles (A): the temperature of an aqueous latex that contains the fine polymer particles (A); the temperature of an aqueous latex (to which a flocculant has not been added) that contains the fine polymer particles (A) and the resin (B); the temperature of an aqueous solution of a flocculant; the temperature of an aqueous latex that contains the fine polymer particles (A), the resin (B), and the flocculant; the temperature during a heating step; the temperature during a drying step; the temperature of rinse water during a rinsing step; and/or the like.

The temperature lower than the glass transition temperature of the graft part of the fine polymer particles (A) varies depending on the composition of the graft part, and is appropriately set according to the composition of the graft part. The agglutinate that contains the fine polymer particles (A) and the resin (B) and the powdery and/or granular material that contains the fine polymer particles (A) and the resin (B) are handled, throughout the production method, preferably in the environment at a temperature lower than 90° C., more preferably in the environment at a temperature lower than 80° C., even more preferably in the environment at a temperature lower than 70° C. That is, each of the foregoing temperatures is preferably lower than 90° C., more preferably lower than 80° C., more preferably lower than 70° C., more preferably lower than 60° C., more preferably lower than 50° C., even more preferably lower than 40° C.

I-4. Resin Composition

One or more embodiments of the present invention also encompass a resin composition which contains the foregoing powdery and/or granular material (first powdery and/or granular material) and a matrix resin (C). A "resin composition in accordance with one or more embodiments of the present invention" may be hereinafter referred to as a "present resin composition".

(I-4-1. Matrix Resin (C))

The matrix resin (C) may be, for example, a thermosetting resin, a thermoplastic resin, or a combination of a thermosetting resin and a thermoplastic resin.

Each of the thermosetting resin and the thermoplastic resin in the matrix resin (C) may be in the same mode as the thermosetting resin or the thermoplastic resin described in the section (I-2-2. Resin (B)) above including the preferable mode of that thermosetting resin or thermoplastic resin.

With conventional techniques, it is very difficult to disperse the fine polymer particles (A) in the form of primary particles in a thermosetting resin. However, the powdery and/or granular material in accordance with one or more embodiments of the present invention has an advantage of providing a resin composition in which the fine polymer particles (A) are uniformly dispersed in the matrix resin (C) even in a case where a thermosetting resin is used as the matrix resin (C). The matrix resin (C) may be a thermosetting resin. The first powdery and/or granular material may be a powdery and/or granular material for a thermosetting resin.

(I-4-2. Physical Properties of Matrix Resin (C))

The matrix resin (C) is not particularly limited in terms of the properties thereof. The matrix resin (C) preferably has a viscosity of 100 mPa·s to 1,000,000 mPa·s at 25° C. The viscosity of the matrix resin (C) is more preferably not more than 50,000 mPa·s, even more preferably not more than 30,000 mPa·s, and particularly preferably not more than 15,000 mPa·s, at 25° C. According to the above feature, the matrix resin (C) has an advantage of having excellent flowability. It can also be said that the matrix resin (C) having a viscosity of 100 mPa·s to 1,000,000 mPa·s at 25° C. is a liquid.

As the flowability of the matrix resin (C) becomes greater, in other words, as the viscosity of the matrix resin (C) becomes lower, it becomes more difficult to disperse, in the matrix resin (C), the fine polymer particles (A) in the form of primary particles. Conventionally, it has been extremely difficult to disperse, in the matrix resin (C) having a viscosity of not more than 1,000,000 mPa·s at 25° C., the fine polymer particles (A) in the form of the primary particles. However, the resin composition in accordance with one or more embodiments of the present invention has an advantage that the fine polymer particles (A) having the above feature are well dispersed in the matrix resin (C) having a viscosity of not more than 1,000,000 mPa·s at 25° C.

Further, the viscosity of the matrix resin (C) is more preferably not less than 100 mPa·s, even more preferably not less than 500 mPa·s, still more preferably not less than 1000 mPa·s, and particularly preferably not less than 1500 mPa·s at 25° C., because such a viscosity allows the matrix resin (C) to get between the fine polymer particles (A) and thereby allows prevention of fusion between the fine polymer particles (A).

The viscosity of the matrix resin (C) is more preferably 100 mPa·s to 750,000 mPa·s, more preferably 100 mPa·s to 700,000 mPa·s, more preferably 100 mPa·s to 350,000 mPa·s, more preferably 100 mPa·s to 300,000 mPa·s, more preferably 100 mPa·s to 50,000 mPa·s, even more preferably 100 mPa·s to 30,000 mPa·s, and particularly preferably 100 mPa·s to 15,000 mPa s, at 25° C.

The matrix resin (C) may have a viscosity of more than 1,000,000 mPa·s. The matrix resin (C) may be a semisolid (semiliquid) or may be alternatively a solid. In a case where the matrix resin (C) has a viscosity of more than 1,000,000 mPa·s, the resin composition which contains the resulting powdery and/or granular material has advantages that the resin composition is less sticky and easy to handle.

The matrix resin (C) has an endothermic peak at preferably not higher than 25° C., more preferably not higher than 0° C., in its differential scanning calorimetry (DSC) thermogram. According to the above feature, the matrix resin (C) has an advantage of having excellent flowability.

(I-4-3. Blending Ratio Between Powdery and/or Granular Material and Matrix Resin (C))

The blending ratio between the first powdery and/or granular material and the matrix resin (C) is as follows. In a case where the total amount of the powdery and/or granular material and the matrix resin (C) is regarded as 100% by weight, it is usually preferable that the amount of the powdery and/or granular material be 0.5% by weight to 50% by weight and the amount of the matrix resin (C) be 50% by weight to 99.5% by weight, it is more preferable that the amount of the powdery and/or granular material be 1% by weight to 50% by weight and the amount of the matrix resin (C) be 50% by weight to 99% by weight, it is more preferable that the amount of the powdery and/or granular material be 1% by weight to 45% by weight and the amount of the matrix resin (C) be 55% by weight to 99% by weight, it is more preferable that the amount of the powdery and/or granular material be 1% by weight to 40% by weight and the amount of the matrix resin (C) be 60% by weight to 99% by weight, it is more preferable that the amount of the powdery and/or granular material be 1% by weight to 35% by weight and the amount of the matrix resin (C) be 65% by weight to 99% by weight, it is more preferable that the amount of the powdery and/or granular material be 1% by weight to 30% by weight and the amount of the matrix resin (C) be 70% by weight to 99% by weight, it is more preferable that the amount of the powdery and/or granular material be 1% by weight to 25% by weight and the amount of the matrix resin (C) be 75% by weight to 99% by weight, it is more preferable that the amount of the powdery and/or granular material be 1.5% by weight to 25% by weight and the amount of the matrix resin (C) be 75% by weight to 98.5% by weight, it is even more preferable that the amount of the powdery and/or granular material be 1.5% by weight to 20% by weight and the amount of the matrix resin (C) be 80% by weight to 98.5% by weight, it is particularly preferable that the amount of the powdery and/or granular material be 2.5% by weight to 20% by weight and the amount of the matrix resin (C) be 80% by weight to 97.5% by weight.

The blending ratio of the first powdery and/or granular material and the matrix resin (C) can be set as appropriate in accordance with (a) the contained amount of components other than the fine polymer particles (A) and the water content in the powdery and/or granular material and (b) a method of mixing the powdery and/or granular material with the matrix resin (C), for the purpose of obtaining an intended proportion of the amounts of the fine polymer particles (A) and the matrix resin (C) contained in the obtained resin composition.

The content ratio between the fine polymer particles (A) and the matrix resin (C) in the resin composition is as follows. In a case where the total amount of the fine polymer particles (A) and the matrix resin (C) is regarded as 100% by weight, it is usually preferable that the amount of the fine polymer particles (A) be 0.5% by weight to 50% by weight and the amount of the matrix resin (C) be 50% by weight to 99.5% by weight, it is more preferable that the amount of the fine polymer particles (A) be 1% by weight to 50% by weight and the amount of the matrix resin (C) be 50% by weight to 99% by weight, it is more preferable that the amount of the fine polymer particles (A) be 1% by weight to 45% by weight and the amount of the matrix resin (C) be 55% by weight to 99% by weight, it is more preferable that the amount of the fine polymer particles (A) be 1% by weight to 40% by weight and the amount of the matrix resin (C) be 60% by weight to 99% by weight, it is more preferable that the amount of the fine polymer particles (A) be 1% by weight to 35% by weight and the amount of the matrix resin (C) be 65% by weight to 99% by weight, it is more preferable that the amount of the fine polymer particles (A) be 1% by weight to 30% by weight and the amount of the matrix resin (C) be 70% by weight to 99% by weight, it is more preferable that the amount of the fine polymer particles (A) be 1% by weight to 25% by weight and the amount of the matrix resin (C) be 75% by weight to 99% by weight, it is more preferable that the amount of the fine polymer particles (A) be 1.5% by weight to 25% by weight and the amount of the matrix resin (C) be 75% by weight to 98.5% by weight, it is even more preferable that the amount of the fine polymer particles (A) be 1.5% by weight to 20% by weight and the amount of the matrix resin (C) be 80% by weight to 98.5% by weight, it is particularly preferable that the amount of the fine polymer particles (A) be 2.5% by weight to 20% by weight and the amount of the matrix resin (C) be 80% by weight to 97.5% by weight.

In a case where the matrix resin (C) is a thermosetting resin, the state of the matrix resin (C) is not particularly limited, provided that the matrix resin (C) is flowable when mixed with the powdery and/or granular material. The matrix resin (C) may be in its solid state at room temperature. In terms of achieving workability, the matrix resin (C) may be in its liquid state.

Typically, the temperature at which the powdery and/or granular material and the matrix resin (C) are mixed together is set to a temperature at which the matrix resin (C) is flowable. In regard to the temperature, if the resin (B) in the powdery and/or granular material is flowable at a temperature at which the matrix resin (C) is flowable, the resin (B) and the matrix resin (C) can be easily mixed uniformly.

In a case where the present resin composition contains a thermosetting resin as the matrix resin (C), it is possible to obtain a cured product by curing the resin composition. In a case where the present resin composition contains a thermoplastic resin as the matrix resin (C), it is possible to obtain a molded product by molding the resin composition. The cured product obtained by curing the present resin composition and the molded product obtained by molding the present resin composition are also encompassed in embodiments of the present invention.

The present resin composition may further contain a known thermosetting resin other than the matrix resin (C), and may further contain a known thermoplastic resin.

(I-4-4. Organic Solvent)

The present resin composition may contain substantially no organic solvents. In a case where the foregoing powdery and/or granular material contains substantially no organic solvents, it is possible to obtain a resin composition that contains substantially no organic solvents. The wording "contains substantially no organic solvents" means that the resin composition contains organic solvent(s) in an amount of not more than 100 ppm.

The amount of an organic solvent contained in the present resin composition (also referred to as a solvent content) may be not more than 100 ppm, not more than 50 ppm, not more than 25 ppm, or not more than 10 ppm. It can also be said that the amount of an organic solvent contained in the present resin composition is the amount of a volatile component (other than water) contained in the present resin composition. The amount of an organic solvent (volatile component) contained in the present resin composition can be determined, for example, as follows. That is, a given amount of the resin composition is heated with use of a hot air dryer or the like, the weight of the resin composition is measured before and after heating, and the weight lost in the heating is regarded as the amount of the organic solvent. Alternatively, the amount of an organic solvent (volatile component) contained in the present resin composition can also be determined by gas chromatography. In a case where no organic solvents are used in production of the present resin composition and a powdery and/or granular material contained in the resin composition, the amount of an organic solvent contained in the obtained resin composition can be regarded as 0 ppm.

Examples of organic solvents substantially not contained in the present resin composition encompass (a) esters such as methyl acetate, ethyl acetate, propyl acetate, and butyl acetate, (b) ketones such as acetone, methyl ethyl ketone, diethyl ketone, and methyl isobutyl ketone, (c) alcohols such as ethanol, (iso)propanol, and butanol, (d) ethers such as tetrahydrofuran, tetrahydropyran, dioxane, and diethyl ether, (e) aromatic hydrocarbons such as benzene, toluene, and xylene, and (f) halogenated hydrocarbons such as methylene chloride and chloroform.

(I-4-5. Other Optional Components)

The present resin composition may contain, as necessary, other optional component(s) which is different from the above-described components. Examples of the optional component encompass: curing agents; coloring agents such as pigments and colorants; extenders; pigment dispersing agents; ultraviolet ray absorbing agents; the foregoing antioxidants; heat stabilizers (antigelling agents); plasticizing agents; leveling agents; defoaming agents; silane coupling agents; antistatic agents; flame retardants; lubricants; viscosity reducers; viscosity modifiers; thixotropy-imparting agents; shrinkage reducing agents; inorganic filler; organic filler; thermoplastic resins; desiccants; dispersion agents; thermal conductivity improving agents; water binders; anti-sag agents; antiflooding agents; anti-settling agents; coating film wear regulating agents; surface control agents; monobasic organic acids; camphor; and castor oil.

(I-4-6. Method for Producing Resin Composition)

A method for producing a resin composition in accordance with one or more embodiments of the present invention includes a step of mixing the powdery and/or granular material described in the section [I-2. Powdery and/or granular material] and the matrix resin (C). The method for producing a resin composition in accordance with one or more embodiments of the present invention may include a step of mixing a powdery and/or granular material obtained by the method for producing a powdery and/or granular material described in the section [I-3. Method for producing powdery and/or granular material] and the matrix resin (C). With those features, it is possible to obtain a resin composition in which the fine polymer particles (A) are uniformly dispersed in the matrix resin (C).

In regard to the method for producing a resin composition, various kinds of components and specific steps are not particularly limited, and the foregoing descriptions apply as appropriate.

A specific method of mixing the powdery and/or granular material with the matrix resin (C) is not particularly limited and, for example, a method involving using a planetary centrifugal mixer, a planetary mixer, a disper mixer, or the like can be employed. A method of mixing the powdery and/or granular material with the matrix resin (C) may be, for example, a method involving mixing for 40 minutes with use of a planetary centrifugal mixer at 2000 rpm.

Further, the method for producing the present resin composition may include a step of rinsing the obtained resin composition. By rinsing the resin composition, it is possible to produce a resin composition containing a smaller amount of contaminants. For this rinsing step, the descriptions of the section (3-3. Rinsing step) above apply while replacing the term "powdery and/or granular material" with the term "resin composition".

Furthermore, the method for producing a resin composition in accordance with one or more embodiments of the present invention may include other steps. In addition to the foregoing steps, the method may include a step of devolatilizing/drying the obtained resin composition by heating. Such a step can be achieved by any of various methods which are not particularly limited. Examples of the devolatilizing/drying step include heating, vacuum devolatilization, and the like.

I-5. Cured Product

A cured product obtained by curing the present resin composition in which the matrix resin (C) is a thermosetting resin as described in the section [I-4. Resin composition] is also encompassed in one or more embodiments of the present invention. The "cured product in accordance with one or more embodiments of the present invention" is hereinafter also referred to as a "present cured product".

The present cured product has the foregoing feature, and therefore has (a) an excellent surface appearance, (b) high rigidity and a high elastic modulus, and (c) excellent toughness and excellent adhesiveness.

I-6. Other Uses

A powdery and/or granular material or resin composition in accordance with one or more embodiments of the present invention (first powdery and/or granular material) can be used in various applications, and the applications are not limited to any particular ones. The first powdery and/or granular material or resin composition may be used in applications such as, for example, metal-clad laminated plates, adhesive agents, coating materials, films, binders for reinforcement fibers, resin concrete, composite materials, molding materials for 3D printers, sealants, electronic substrates, ink binders, wood chip binders, binders for rubber chips, foam chip binders, binders for castings, rock mass consolidation materials for floor materials and ceramics, and urethane foams. Examples of the urethane foams encompass automotive seats, automotive interior parts, sound absorbing materials, damping materials, shock absorbers (shock absorbing materials), heat insulating materials, and floor material cushions for construction.

The first powdery and/or granular material or resin composition may be used for, out of the above applications, adhesive agents, coating materials, films, binders for reinforcement fibers, composite materials, molding materials for 3D printers, sealants, and electronic substrates.

(I-6-1. Metal-Clad Laminated Plate)

A metal-clad laminated plate in accordance with one or more embodiments of the present invention may be formed by using the present resin composition described in the section [I-4. Resin composition] in which the matrix resin (C) is a thermosetting resin. A metal-clad laminated plate in accordance with one or more embodiments of the present invention may be hereinafter simply referred to as a present metal-clad laminated plate.

The present metal-clad laminated plate has the above feature, and therefore has an advantage of having excellent toughness and excellent impact resistance.

Purposes of use of the present metal-clad laminated plate are not particularly limited. Examples of the purposes of use encompass printed circuits, printed wiring, printed circuit boards, products provided with a printed circuit therein, printed wiring boards, and printed boards.

(I-6-2. Adhesive Agent)

An adhesive agent in accordance with one or more embodiments of the present invention includes the above-described first powdery and/or granular material or resin composition. The adhesive agent in accordance with one or more embodiments of the present invention has the above feature, and therefore has excellent adhesiveness.

The adhesive agent in accordance with one or more embodiments of the present invention is also simply referred to as a present adhesive agent.

The present adhesive agent can be suitably used in various applications such as automotive interior materials, general woodworking, furniture, interior decoration, wall materials, and food packaging.

The present adhesive agent exhibits favorable adhesiveness to various adherends such as cold-rolled steel, aluminum, fiberglass-reinforced polyester (FRP), panels made of cured products obtained by curing thermosetting resins (for example, epoxy resin) reinforced with carbon fibers, panels made of thermoplastic resin sheets reinforced with carbon fibers, sheet molding compounds (SMC), an acrylonitrile-butadiene-styrene copolymer (ABS), polyvinyl chloride (PVC), polycarbonate, polypropylene, TPO, wood, and glass.

The present adhesive agent has excellent adhesiveness and excellent plasticity not only at low temperatures (approximately −20° C.) to ordinary temperatures but also at high temperatures (approximately 80° C.). Therefore, the present adhesive agent can be more suitably used as an adhesive agent for structures.

The adhesive agent for structures which employs the present adhesive agent can be used as an adhesive agent for, for example, structural members in the fields of automobiles, cars (for example, shinkansen (bullet trains) and trains), civil engineering, construction, building materials, woodworking, electricity, electronics, aircrafts, space industry, and the like. Specific examples of automobile-related applications encompass: bonding of interior materials such as ceilings, doors, and seats; bonding of automotive luminaires such as lamps; and bonding of exterior materials such as body side molding.

The present adhesive agent can be produced from the first powdery and/or granular material or resin composition. A method of producing the present adhesive agent is not limited to any particular one, and a known method can be employed.

(I-6-3. Coating Material)

A coating material in accordance with one or more embodiments of the present invention contains the above-described first powdery and/or granular material or resin composition. The coating material in accordance with one or more embodiments of the present invention has the above feature, and therefore can provide a coating film having excellent load-bearing property and excellent wear resistance.

The coating material in accordance with one or more embodiments of the present invention is also simply referred to as a present coating material.

The present coating material is, for example, a material that contains an organic solvent and the first powdery and/or granular material, in which the fine polymer particles (A) are dispersed in the form of primary particles in the organic solvent. The present coating material is, for example, a material that contains an organic solvent and the present resin composition, in which the fine polymer particles (A) are dispersed in the form of primary particles in the organic solvent. With conventional techniques, it is very difficult to disperse the fine polymer particles (A) in the form of primary particles in an organic solvent. In contrast, the first powdery and/or granular material is advantageous in that it can provide a coating material in which the fine polymer particles (A) are more uniformly dispersed in the organic solvent. The first powdery and/or granular material may be a powdery and/or granular material for a coating material.

In a case where the present coating material is applied to, for example, a floor or a corridor, a generally used application method can be employed. For example, after a primer is applied to a base material which has been subjected to surface preparation, the primer is uniformly coated with the present coating material with use of a trowel, a roller, a rake, a spray gun, and/or the like depending on conditions under which the primer is coated with the present coating material. After the primer is coated with the present coating material, curing of the present coating material proceeds, so that a good-performance coating is obtained. The coating film obtained by curing the present coating material can be a coating film having excellent load-bearing property and excellent wear resistance.

Depending on a method of applying the present coating material, the viscosity of a resin composition used for the coating material may be adjusted. For example, in a case where a trowel or a rake is used to apply the present coating material, the viscosity of the resin composition used for the present coating material can be adjusted to, generally, approximately 500 cps/25° C. to 9,000 cps/25° C. In a case where a roller or a spray is used to apply the present coating material, the viscosity of the resin composition used for the present coating material can be adjusted to, generally, approximately 100 cps/25° C. to 3,000 cps/25° C.

The base material (in other words, the material of the floor or the corridor) to which the present coating material is applied is not limited to any particular one. Specific examples of the base material encompass: (a) inorganic base materials such as concrete walls, concrete plates, concrete blocks, concrete masonry unit (CMU), mortar plates, auto-claved light-weight concrete (ALC) plates, gypsum boards (such as Dens Glass Gold manufactured by Georgia Pacific), and slate boards; (b) organic base materials such as wood-based base materials (such as wood, plywood, and oriented strand board (OSB)), asphalt, waterproof sheets made of modified bitumen, waterproof sheets made of ethylene-propylene-diene rubber (EPDM), waterproof sheets made of TPO, plastics, FRP, and urethane foam heat insulating materials; and (c) metal-based base materials such as metal panels.

A case will be described where the present coating material is applied to a metal base material or a porous base material. A laminate, obtained by applying and then curing the coating material, imparts excellent corrosion resistance to the base material. Furthermore, a coating film, obtained by applying and then curing the coating material, can impart excellent crack resistance and excellent load-bearing property to the base material. Therefore, a mode in which the present coating material is applied to a metal base or a porous base material is a particularly preferable mode.

A method of applying the present coating material is not limited to any particular one, and the present coating material can be applied by a known method such as a trowel, a rake, a brush, a roller, an air spray, and/or an airless spray.

Purposes of use of the present coating material are not particularly limited. Examples of the purposes of use encompass automobiles, electrical apparatuses, office equipment, construction materials, wood, coated floors, paving, heavy-duty anticorrosion, anticorrosion of concrete, water-proofing of rooftops and roofs, anticorrosion of rooftops and roofs, coating film waterproof materials for underground waterproofing, automotive refinishing, can coating, topcoat, intercoat, undercoat, primer, electro-deposition paint, highly weather resistant paint, non-yellowing paint, and the like. In a case where the present coating material is used for a coating material for coated floors, a coating material for paving, and the like, the present coating material can be used in factories, laboratories, warehouses, clean rooms, and the like.

The present coating material can be produced with use of the first powdery and/or granular material or resin composition. A method of producing the present coating material is not limited to any particular one, and a known method can be employed.

(I-6-4. Film)

A film in accordance with one or more embodiments of the present invention contains the foregoing first powdery and/or granular material or resin composition. The film in accordance with one or more embodiments of the present invention has the above feature, and therefore has excellent load-bearing property and excellent wear resistance.

The film in accordance with the present disclosure is also simply referred to as a present film.

The present film is, for example, a film obtained by allowing an organic solvent to evaporate from a dope solution that contains the organic solvent and the first powdery and/or granular material. The present film is, for example, a film obtained by allowing an organic solvent to evaporate from a dope solution that contains the organic solvent and the present resin composition. In such dope solutions, the fine polymer particles (A) are dispersed in the form of primary particles in the organic solvent. With conventional techniques, it is very difficult to disperse the fine polymer particles (A) in the form of primary particles in an organic solvent. In contrast, the first powdery and/or granular material can provide a dope solution in which the fine polymer particles (A) are more uniformly dispersed in an organic solvent, and therefore is advantageous in that it can provide a film in which the fine polymer particles (A) are more uniformly dispersed. The first powdery and/or granular material may be a powdery and/or granular material for a film.

Purposes of use of the present film are not particularly limited. The present film can be used as an optical film such as a polarizer protective film, a decorative film, a conductive film, an electromagnetic wave absorption sheet, an antireflective film, and the like.

The present film can be produced with use of the first powdery and/or granular material or resin composition. A method of producing the present film is not particularly limited, and a known method can be used.

(I-6-5. Composite Material)

A composite material in accordance with one or more embodiments of the present invention contains, as a binder for reinforcement fibers, the above-described first powdery and/or granular material or resin composition. The composite material in accordance with one or more embodiments of the present invention has the above feature, and therefore has an advantage of having excellent toughness and excellent impact resistance.

The composite material in accordance with the present disclosure is also simply referred to as a present composite material.

The present composite material can contain reinforcement fibers. The reinforcement fibers are not limited to any particular ones. Example of the reinforcement fibers encompass glass fibers, continuous glass fibers, carbon fibers, natural fibers, metal fibers, thermoplastic resin fibers, boron fibers, aramid fibers, polyethylene fibers, and xyron-reinforced fibers. Out of these reinforcement fibers, glass fibers and carbon fibers are particularly preferable.

A method of producing the present composite material (molding method) is not limited to any particular one. Examples of the method encompass: an autoclave molding method in which a prepreg is used; a filament winding molding method; a hand lay-up molding method; a vacuum bag molding method; a resin transfer molding (RTM) method; a vacuum-assisted resin transfer molding (VARTM) method; a pultrusion molding method; an injection molding method, a sheet winding molding method; a spray up molding method; a bulk molding compound (BMC) method; and a sheet molding compound (SMC) method.

In particular, in a case where carbon fibers are used as the reinforcement fibers, an autoclave molding method in which a prepreg is used; a filament winding molding method; a hand lay-up molding method; a vacuum bag molding method; a resin transfer molding (RTM) method; a vacuum-assisted resin transfer molding (VARTM) method; or the like may be employed as the method of producing the present composite material.

Purposes of use of the present composite material are not particularly limited. Examples of the purposes of use encompass aircraft, spacecraft, automobiles, bicycles, watercraft, weapons, wind turbines, sports goods, containers, building materials, water-proof materials, printed circuit boards, and electrical insulating materials.

The present composite material can be produced with use of the first powdery and/or granular material or resin composition. In regard to further details of the reinforcement fibers, the production method (molding method), producing conditions (molding conditions), agents blended, uses, and the like concerning the present composite material, any of those disclosed in the following documents can be employed: United States Patent Application Publication No. 2006/0173128, United States Patent Application Publication No. 2012/0245286, Published Japanese Translation of PCT International Application, Tokuhyo, No. 2002-530445 (PCT International Application WO2000/029459), Japanese Patent Application Publication, Tokukaisho, No. 55-157620 (U.S. Pat. No. 4,251,428), Published Japanese Translation of PCT International Application, Tokuhyo, No. 2013-504007 (PCT International Application WO2011/028271), Japanese Patent Application Publication, Tokukai, No. 2007-125889 (United States Patent Application Publication No. 2007/0098997), and Japanese Patent Application Publication, Tokukai, No. 2003-220661 (United States Patent Application Publication No. 2003/0134085).

(I-6-6. Molding Material for 3D Printer)

A molding material for 3D printers in accordance with one or more embodiments of the present invention contains the above-described first powdery and/or granular material or resin composition. The molding material for 3D printers in accordance with one or more embodiments of the present invention has the above feature, and therefore has an advantage of having excellent toughness and excellent impact resistance.

The molding material for 3D printers in accordance with the present disclosure is also simply referred to as a present molding material.

Purposes of use of the present molding material are not particularly limited. Examples of the purposes of use encompass: goods made as samples for testing design, functions, and the like before making actual products; aircraft components, building components, and medical components.

The present molding material can be produced with use of the first powdery and/or granular material or resin composition. A method of producing the present molding material is not limited to any particular one, and a known method can be employed.

(I-6-7. Sealant)

A sealant in accordance with one or more embodiments of the present invention is obtained with use of the above-described first powdery and/or granular material or resin composition. The sealant in accordance with one or more embodiments of the present invention has the above feature, and therefore has an advantage of having excellent toughness and excellent impact resistance.

The sealant in accordance with the present disclosure is also simply referred to as a present sealant.

Purposes of use of the present sealant are not particularly limited. Examples of the purposes of use encompass sealing for use in electrical devices such as semiconductors and in power devices.

The present sealant can be produced with use of the first powdery and/or granular material or resin composition. A method of producing the present sealant is not limited to any particular one, and a known method can be employed.

II. Embodiment 2

As with Embodiment 1 of the present invention, Embodiment 2 is also accomplished in view of the problem of the conventional techniques as in Patent Literatures 1 through 3, i.e., the problem of dispersibility of fine polymer particles in a resin. That is, Embodiment 2 of the present invention provides a novel powdery and/or granular material which achieves excellent dispersibility of fine polymer particles in a matrix resin, and a method for producing the powdery and/or granular material, as with Embodiment 1.

The inventors of one or more embodiments of the present invention conducted diligent research from another viewpoint. As a result, the inventors of one or more embodiments of the present invention found that a powdery and/or granular material which achieves excellent dispersibility of fine polymer particles in a matrix resin can be provided by mixing an aqueous latex of fine polymer particles with an aqueous latex of a resin so that a mixture solution containing a specific amount of droplets with a specific volume-average particle size can be obtained. On the basis of this finding, the inventors accomplished Embodiment 2 of the present invention.

That is, the method for producing a powdery and/or granular material in accordance with one or more embodiments of the present invention includes a mixing step of mixing an aqueous latex (A) containing fine polymer particles (A) with an aqueous latex (B) containing a resin (B), and a preparation step of preparing a powdery and/or granular material containing the fine polymer particles (A) and the resin (B) from a mixture solution obtained in the mixing step, in which: the fine polymer particles (A) contain a rubber-containing graft copolymer that includes an elastic body and a graft part grafted to the elastic body; the elastic body contains at least one selected from the group consisting of diene-based rubbers, (meth)acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the resin (B) is a liquid which has a viscosity of 100 mPa·s to 1,000,000 mPa·s at 25° C., a semisolid, or a solid; the powdery and/or granular material contains the fine polymer particles (A) in an amount of 50% by weight to 99% by weight and the resin (B) in an amount of 1% by weight to 50% by weight, with respect to 100% by weight in total of the fine polymer particles (A) and the resin (B); the mixture solution contains droplets having a volume-average particle size of not less than $x-\sigma$ and not more than $x+5\sigma$ in an amount of 0.0% by weight to 14.0% by weight, with respect to 100% by weight of the resin (B) in the mixture solution, where x (μm) is a volume-average particle size of droplets in the aqueous latex (B), and σ is a standard deviation of the volume-average particle size.

The powdery and/or granular material in accordance with one or more embodiments of the present invention contains fine polymer particles (A) and a resin (B), in which: the fine polymer particles (A) contain a rubber-containing graft copolymer that includes an elastic body and a graft part grafted to the elastic body; the elastic body contains at least one selected from the group consisting of diene-based rubbers, (meth)acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the resin (B) is a liquid which has a viscosity of 100 mPa·s to 1,000,000 mPa·s at 25° C., a semisolid, or a solid; the powdery and/or granular material contains the fine polymer particles (A) in an amount of 50% by weight to 99% by weight and the resin (B) in an amount of 1% by weight to 50% by weight, where 100% by weight represents a total amount of the fine polymer particles (A) and the resin (B); in a case where a resin composition that is obtained by mixing the powdery and/or granular material with a matrix resin (C) is stirred under a stirring condition below, a stirring time taken from when stirring is started to when favorable dispersibility is obtained is not more than 80 minutes: where, as the stirring condition, a disper mixer having a blade diameter of 32 mm is used as a stirring device, and a rotation speed is 3000 rpm; and where the phrase "favorable dispersibility" means a state in which, when the resin composition is placed on a grindometer, the resin composition on a gauge is scraped with use of a metal scraper, and a state of dispersion is visually checked, a point on the grindometer is 0 μm, at which five to ten particles having an average particle size of not less than 10 μm have become apparent by scraping within a range 3 mm in width.

According to one or more embodiments of the present invention, it is possible to provide the powdery and/or granular material which achieves excellent dispersibility of fine polymer particles in a matrix resin.

The following description will discuss one or more embodiments (Embodiment 2) of the present invention. One or more embodiments of the present invention are not, however, limited to these embodiments. For aspects of Embodiment 2 of the present invention except for those described below in detail, the descriptions of Embodiment 1 apply as appropriate.

II-1. Method for Producing Powdery and/or Granular Material

A method for producing a powdery and/or granular material in accordance with one or more embodiments of the present invention includes a mixing step of mixing an aqueous latex (A) containing fine polymer particles (A) with an aqueous latex (B) containing a resin (B), and a preparation step of preparing a powdery and/or granular material containing the fine polymer particles (A) and the resin (B) from a mixture solution obtained in the mixing step. The fine polymer particles (A) contain a rubber-containing graft copolymer that includes an elastic body and a graft part grafted to the elastic body. The elastic body contains at least one selected from the group consisting of diene-based rubbers, (meth)acrylate-based rubbers, and organosiloxane-based rubbers. The graft part contains a polymer that contains, as one or more structural units, one or more structural units derived from at least one type of monomer selected from the group consisting of aromatic vinyl monomers, vinyl cyanide monomers, and (meth)acrylate monomers. The resin (B) is a liquid which has a viscosity of 100 mPa·s to 1,000,000 mPa·s at 25° C., a semisolid, or a solid. The powdery and/or granular material contains the fine polymer particles (A) in an amount of 50% by weight to 99% by weight and the resin (B) in an amount of 1% by weight to 50% by weight, where 100% by weight represents the total amount of the fine polymer particles (A) and the resin (B). The mixture solution contains droplets having a volume-average particle size of not less than $x-\sigma$ and not more than $x+5\sigma$ in an amount of 0.0% by weight to 14.0% by weight, with respect to 100% by weight of the resin (B) in the mixture solution, where x (μm) is a volume-average particle size of droplets in the aqueous latex (B), and σ is a standard deviation of the volume-average particle size.

A "method for producing a powdery and/or granular material in accordance with Embodiment 2 of the present invention" may be hereinafter referred to as a "second production method". The powdery and/or granular material obtained by the second production method, when mixed with a matrix resin (C) (described later), gives a resin composition.

The second production method has the above features, and therefore has an advantage of providing a powdery and/or granular material which achieves excellent dispersibility of the fine polymer particles (A) in a matrix resin. The second production method has the foregoing feature, and therefore the powdery and/or granular material obtained by the second production method brings about, when being mixed with a matrix resin (C) (described later), an advantage of providing a resin composition in which the fine polymer particles (A) are uniformly dispersed in the matrix resin (C).

(II-1-1. Fine Polymer Particles (A))

The fine polymer particles (A) in accordance with Embodiment 2 may be identical with the fine polymer particles (A) in accordance with Embodiment 1. For example, the fine polymer particles (A) in accordance with Embodiment 2 contain a rubber-containing graft copolymer that includes an elastic body and a graft part grafted to the elastic body.

(II-1-1-1. Elastic Body)

(Volume-Average Particle Size of Elastic Body)

In Embodiment 2, the elastic body has a volume-average particle size of preferably 0.03 μm to 50.00 μm, more preferably 0.05 μm to 10.00 μm, more preferably 0.08 μm to 2.00 μm, more preferably 0.09 μm to 1.00 μm, more preferably 0.09 μm to 0.80 μm, more preferably 0.09 μm to 0.50 μm, further preferably 0.09 μm to 0.23 μm, particularly preferably 0.10 μm to 0.23 μm. In a case where the volume-average particle size of the elastic body is not less than 0.03 μm, the elastic body which has a desired volume-average particle size can be stably obtained. In a case where the volume-average particle size of the elastic body is not more than 50.00 μm, the resulting cured product or the resulting molded product has favorable heat resistance and impact resistance.

(Volume-Average Particle Size (Mv) of Fine Polymer Particles (A))

In Embodiment 2, the volume-average particle size (Mv) of the fine polymer particles (A) is preferably 0.03 μm to 50.00 μm, more preferably 0.05 μm to 10.00 μm, more preferably 0.08 μm to 2.00 μm, more preferably 0.09 μm to 1.00 μm, more preferably 0.09 μm to 0.80 μm, more preferably 0.09 μm to 0.50 μm, further preferably 0.09 μm to 0.23 μm, particularly preferably 0.10 μm to 0.23 μm, because it is possible to obtain a resin composition which has a desired viscosity and which is highly stable. In a case where the volume-average particle size (Mv) of the fine polymer particles (A) falls within the above range, there is also an advantage that the dispersibility of the fine polymer particles (A) in the matrix resin (C) is favorable. As the volume-average particle size (Mv) of the fine polymer particles (A) increases, the cohesive force of the fine polymer particles (A) becomes smaller.

(II-1-2. Mixing Step)

In the mixing step, an aqueous latex (A) containing the fine polymer particles (A) and an aqueous latex (B) containing the resin (B) are mixed together. Thus, in the mixing step, a mixture solution containing the fine polymer particles (A) and the resin (B) can be obtained. It can also be said that the mixing step is a step of preparing a mixture solution containing the fine polymer particles (A) and the resin (B).

In the aqueous latex (A), the fine polymer particles (A) exist, due to an effect of an emulsifying agent or the like for example, as droplets (hereinafter, also referred to as "droplets (A)) each contain one or more fine polymer particles (A). In the aqueous latex (B), the resin (B) exists, due to an effect of an emulsifying agent or the like for example, as droplets (hereinafter, also referred to as "droplets (B)) each contain one or more pieces of the resin (B). Therefore, it can also be said that the mixing step is a step of mixing droplets containing one or more fine polymer particles (A) with droplets containing one or more pieces of the resin (B). The mixture solution obtained in the mixing step contains droplets having a volume-average particle size of not less than x−σ and not more than x+5σ in an amount of 0.0% by weight to 14.0% by weight, with respect to 100% by weight of the resin (B) in the mixture solution. The following description will discuss this feature.

In the course of diligent research, the inventors of one or more embodiments of the present invention found on their own that it is important to integrate the droplets (A) and the droplets (B) in the mixture solution in order to obtain a powdery and/or granular material that achieves excellent dispersibility of the fine polymer particles (A) in the matrix resin (C). When the droplets (A) and the droplets (B) are integrated, the droplets (B) disappear. Therefore, it is inferred that, as the contained amount of droplets having a volume-average particle size equivalent to the droplets (B) with respect to the added amount of droplets (B) is smaller in the mixture solution, the droplets (A) and the droplets (B) are integrated more in the mixture solution. The added amount of droplets (B) can also be said to be the contained amount of the droplets (B) in the aqueous latex (B) that has been used in the mixing. That is, it is inferred that, as the contained amount of droplets having a volume-average particle size of not less than x−σ and not more than x+5σ with respect to 100% by weight of the resin (B) is smaller in the mixture solution, the droplets (A) and the droplets (B) are integrated more in the mixture solution.

The mixture solution contains droplets having a volume-average particle size of not less than x−σ and not more than x+5σ in an amount of preferably not less than 0.0% by weight as a lower limit with respect to 100% by weight of the resin (B) in the mixture solution. The mixture solution contains droplets having a volume-average particle size of not less than x−σ and not more than x+5σ in an amount of preferably not more than 13.5% by weight, more preferably not more than 13.0% by weight, more preferably not more than 12.5% by weight, more preferably not more than 12.0% by weight, more preferably not more than 11.5% by weight, more preferably not more than 11.0% by weight, more preferably not more than 10.5% by weight, more preferably not more than 10.0% by weight, more preferably not more than 9.5% by weight, more preferably not more than 9.0% by weight, more preferably not more than 8.5% by weight, more preferably not more than 8.0% by weight, more preferably not more than 7.5% by weight, more preferably not more than 7.0% by weight, more preferably not more than 6.5% by weight, more preferably not more than 6.0% by weight, more preferably not more than 5.5% by weight, particularly preferably not more than 5.0% by weight, as an upper limit with respect to 100% by weight of the resin (B) in the mixture solution. Note that, in a case where the mixture solution contains droplets having a volume-average particle size of not less than x−σ and not more than x+5σ in an amount of not less than 0.0% by weight, with respect to 100% by weight of the resin (B) in the mixture solution, this case means that the mixture solution does not contain the droplets or the mixture solution contains the droplets in an amount of more than 0.0% by weight. Therefore, it can also be said that the mixture solution obtained in the mixing step does not contain droplets having a volume-average particle size of not less than x−σ and not more than x+5σ, or contains the droplets in an amount of more than 0.0% by weight and not more than 14.0% by weight, with respect to 100% by weight of the resin (B) in the mixture solution.

A mode in which the droplets (A) and the droplets (B) are integrated is not particularly limited. The mode in which the droplets (A) and the droplets (B) are integrated can be, for example, a mode in which the droplets (B) are dispersed into droplets smaller than the droplets (B), in other words, the droplets (B) become finer, and the droplets thus dispersed are taken into the droplets (A) (hereinafter, also referred to as "mode A"). In the mode A, it may be possible to facilitate (i) integration of the droplets (A) and the droplets (B) and (ii) dispersion and size reduction of the droplets (B), by adjusting the stability of the droplets (B) to a degree that the droplets (B) are dispersed into droplets smaller than the droplets (B). However, one or more embodiments of the present invention are not limited to the above inference and the mode A.

In the second production method, it is possible to facilitate (i) integration of the droplets (A) and the droplets (B) and (ii) dispersion and size reduction of the droplets (B) in the mixture solution by, for example, adjusting the following conditions (a) through (c): (a) the volume-average particle size of the fine polymer particles (A); (b) the stability of the droplets (A) in the aqueous latex (A) containing the fine polymer particles (A); and (c) the stability of the droplets (B) in the aqueous latex (B) containing the resin (B).

For an aspect of the volume-average particle size of the fine polymer particles (A), the aspect (including the preferable aspect) described in the section (Volume-average particle size (Mv) of fine polymer particles (A)) may apply. As the volume-average particle size (Mv) of the fine polymer particles (A) decreases, the surface area of the fine polymer particles (A) with respect to its volume becomes greater. This can enhance the integration of the droplets (A) and the droplets (B), for example, the migration of the droplets (B) to the droplets (A).

The mixing step may have an aqueous latex (A) preparation step of preparing an aqueous latex (A) containing fine polymer particles (A). It can also be said that the aqueous latex (A) preparation step is a step of preparing fine polymer particles (A). It can also be said that the aqueous latex (A) preparation step is a step of adjusting the stability of droplets (A) in the aqueous latex (A) containing fine polymer particles (A).

A specific operation in the aqueous latex (A) preparation step is not particularly limited. For example, the aqueous latex (A) containing fine polymer particles (A) can be prepared by producing fine polymer particles (A) by a method such as emulsion polymerization, suspension polymerization, or microsuspension polymerization as described in the section (2-1-5. Method of producing fine polymer particles (A)) above. For example, by adjusting the type and used amount (amount) of an emulsifying agent in the production of fine polymer particles (A), it is possible to adjust the volume-average particle size of the droplets (A) in the aqueous latex (A) containing fine polymer particles (A). Furthermore, for example, by adjusting (i) the type and used amount (amount) of an emulsifying agent and (ii) the volume-average particle size of the droplets (A) in the production of fine polymer particles (A), it is possible to adjust the stability of the droplets (A) in the aqueous latex (A) containing fine polymer particles (A).

The mixing step may have an aqueous latex (B) preparation step of preparing an aqueous latex (B) containing the resin (B). It can also be said that the aqueous latex (B) preparation step is a step of adjusting the stability of droplets (B) in the aqueous latex (B) containing the resin (B).

A specific operation in the aqueous latex (B) preparation step is not particularly limited. The specific operation can be, for example, an operation in which water, the resin (B), and an emulsifying agent are mixed and stirred together. By adjusting the type and used amount (amount) of an emulsifying agent and the stirring speed and stirring time in the aqueous latex (B) preparation step, it is possible to adjust the volume-average particle size of the droplets (B) in the obtained aqueous latex (B). Furthermore, by adjusting (i) the type and used amount (amount) of an emulsifying agent, (ii) the stirring speed and stirring time, and (iii) the volume-average particle size of the droplets (B) in the aqueous latex (B) preparation step, it is possible to adjust the stability of the droplets (B) in the obtained aqueous latex (B).

The used amount of the emulsifying agent in the aqueous latex (B) preparation step is not particularly limited. The used amount of the emulsifying agent in the aqueous latex (B) preparation step is preferably 1.0 parts by weight to 30.0 parts by weight, more preferably 1.0 parts by weight to 30.0 parts by weight, more preferably 1.5 parts by weight to 30.0 parts by weight, more preferably 2.0 parts by weight to 29.0 parts by weight, more preferably 2.5 parts by weight to 28.0 parts by weight, more preferably 3.0 parts by weight to 27.5 parts by weight, more preferably 3.5 parts by weight to 27.0 parts by weight, more preferably 4.0 parts by weight to 26.5 parts by weight, more preferably 4.5 parts by weight to 26.0 parts by weight, more preferably 5.0 parts by weight to 25.5 parts by weight, more preferably 5.5 parts by weight to 25.0 parts by weight, even more preferably 6.0 parts by weight to 24.5 parts by weight, particularly preferably 6.5 parts by weight to 24.0 parts by weight, with respect to 100 parts by weight of the resin (B).

The emulsifying agent is not particularly limited, and examples of the emulsifying agent include (a) anionic emulsifying agents, e.g., acids such as those listed below, alkali metal salts of such acids, and ammonium salts of such acids, (b) nonionic emulsifying agents, (c) polyvinyl alcohols, alkyl-substituted celluloses, polyvinylpyrrolidone, and polyacrylic acid derivatives. Examples of the acids include (a1) alkyl sulfonic acids, aryl sulfonic acids, alkyl ether sulfonic acids, and aryl ether sulfonic acids, (a2) alkyl sulfuric acids, aryl sulfuric acids, alkyl ether sulfuric acids, and aryl ether sulfuric acids, (a3) alkyl-substituted phosphoric acids, aryl-substituted phosphoric acids, alkyl ether-substituted phosphoric acids, and aryl ether-substituted phosphoric acids, (a4) N-alkyl sarcosine acids and N-aryl sarcosine acids, and (a5) alkyl carboxylic acids, aryl carboxylic acids, alkyl ether carboxylic acids, and aryl ether carboxylic acids. Specific examples of the emulsifying agent include sodium dodecylbenzenesulfonate, sodium polyoxyethylene lauryl ether phosphate, and the like. It is possible to use, as the emulsifying agent, sodium polyoxyethylene lauryl ether phosphate which is produced by using polyoxyethylene lauryl ether phosphate in combination with sodium hydroxide.

The stirring speed in the aqueous latex (B) preparation step is not particularly limited. The stirring speed is preferably 1000 rpm to 50000 rpm, more preferably 2000 rpm to 45000 rpm, more preferably 3000 rpm to 40000 rpm, more preferably 4000 rpm to 35000 rpm, more preferably 5000 rpm to 30000 rpm, more preferably 6000 rpm to 25000 rpm, even more preferably 7000 rpm to 20000 rpm, particularly preferably 8000 rpm to 12000 rpm.

The stirring time in the aqueous latex (B) preparation step is not particularly limited. The stirring time is preferably 1 minute to 10 minutes, more preferably 2 minutes to 9 minutes, even more preferably 3 minutes to 7 minutes, particularly preferably 4 minutes to 6 minutes.

(II-1-3. Preparation Step)

It can also be said that the preparation step is a step of obtaining a powdery and/or granular material containing the fine polymer particles (A) and the resin (B).

A specific step (operation) of obtaining a powdery and/or granular material in the preparation step is not particularly limited. The preparation step may further have an agglutinating step of preparing an agglutinate containing the fine polymer particles (A) and the resin (B) from a mixture solution.

The agglutinating step is not particularly limited, provided that an agglutinate containing the fine polymer particles (A) and the resin (B) can be obtained. A method for allowing the fine polymer particles (A) and the resin (B) in the mixture solution to agglutinate together is not particularly limited. The method can be, for example, a known method such as a method using a flocculant, a method using a solvent, or a method involving spraying the aqueous latex. It is noted here that, when the fine polymer particles (A) and the resin (B) in the mixture solution are allowed to agglutinate together, a mixture that contains (i) the agglutinate containing the fine polymer particles (A) and the resin (B) and (ii) an aqueous solvent may also be referred to as slurry.

In order to achieve a good anti-blocking property and to allow the fine polymer particles (A) to be well dispersed in the matrix resin (C), it is preferable that the fine polymer particles (A) and the resin (B) in the mixture solution be allowed to agglutinate in the presence of an anti-blocking agent.

The preparation step may have a collecting step of collecting, from slurry, the agglutinate containing the fine polymer particles (A) and the resin (B) (e.g., the agglutinate obtained in the agglutinating step).

The collecting step is not particularly limited, provided that the aqueous solvent and the agglutinate in the slurry can be separated. A known method can be employed. The collecting step can be, for example, a method involving subjecting the slurry to filtration, a method involving subjecting the slurry to centrifugal dehydration, or the like.

The preparation step may have a rinsing step of rinsing the agglutinate containing the fine polymer particles (A) and the resin (B) (e.g., the agglutinate obtained in the agglutinating step or the collecting step). In a case where the preparation step further has the rinsing step, it is possible to obtain a powdery and/or granular material containing a small amount of contaminants, and the like. In the rinsing step, the agglutinate may be rinsed with water, or rinsed with ion exchanged water or pure water.

The rinsing step is not particularly limited in terms of a specific method, provided that the agglutinate is rinsed. Examples of the specific method of the rinsing step include: a method involving mixing the agglutinate with water and stirring the mixture by a stirrer; a method involving kneading the agglutinate and water with use of a kneader; a method involving mixing the agglutinate with water with use of a planetary centrifugal mixer; a method involving spraying water onto the agglutinate; and a method involving carrying out cake rinsing with use of a press filter. Examples of the kneader include various types of kneaders such as batch type kneaders, continuous type kneaders, extrusion kneaders, and extruders.

The period of time during which the rinsing is carried out is not particularly limited, and is, for example, 1 second to 60 minutes. The period of time during which the rinsing is carried out is preferably 1 second to 45 minutes, more preferably 1 second to 30 minutes, more preferably 1 minute to 30 minutes, even more preferably 3 minutes to 30 minutes, particularly preferably 5 minutes to 30 minutes, particularly preferably 10 minutes to 30 minutes.

The number of times the rinsing is carried out is not particularly limited, and is, for example, 1 (cycle) to 10 (cycles). The number of times the rinsing is carried out is preferably 1 (cycle) to 6 (cycles), more preferably 1 (cycle) to 5 (cycles), even more preferably 1 (cycle) to 4 (cycles), most preferably 1 (cycle) to 3 (cycles).

The amount of rinse water is not particularly limited, and is, for example, 0.1 parts by weight to 1000 parts by weight with respect to 1 part by weight of the agglutinate. The amount of rinse water with respect to 1 part by weight of the agglutinate is preferably 1 part by weight to 1000 parts by weight, more preferably 1 part by weight to 500 parts by weight, more preferably 1 part by weight to 200 parts by weight, more preferably 10 part by weight to 200 parts by weight, even more preferably 15 part by weight to 200 parts by weight, particularly preferably 20 parts by weight to 200 parts by weight. The amount of rinse water with respect to 1 part by weight of the agglutinate is also preferably 1 part by weight to 10 parts by weight, also preferably 2 parts by weight to 10 parts by weight, also preferably 2 parts by weight to 5 parts by weight. Rinsing by kneading the agglutinate and water with use of a kneader is preferred, because a small amount of rinse water will suffice.

The temperature of rinse water is not limited. Rinse water can be, for example, water at room temperature or water warmer than room temperature. Rinse water warmer than room temperature is preferred because such warmer water is more effective in rinsing. The temperature of rinse water is, for example, 10° C. to 100° C. The temperature of rinse water is preferably 15° C. to 100° C., more preferably 20° C. to 100° C., more preferably 40° C. to 100° C., more preferably 40° C. to 90° C., even more preferably 40° C. to 85° C., even more preferably 40° C. to 80° C., particularly preferably 40° C. to 70° C.

In the rinsing step, a method of removing rinse water used in rinsing is not particularly limited. Examples of the method include wiping away rinse water used in rinsing, filtration under reduced pressure, oil-water separation, filter press, centrifugation, belt press, screw press, membrane separation, and press dehydration.

An object to be removed by rinsing is intended to mean impurities contained in the agglutinate in general, and is not particularly limited. Examples of the object include: contaminants derived from an emulsifying agent (e.g., phosphorus-based emulsifying agent, sulfonic acid-based emulsifying agent); and, in a case where a flocculant is used, contaminants derived from the flocculant.

The preparation step may have a drying step of drying the agglutinate containing the fine polymer particles (A) and the resin (B) (e.g., the agglutinate obtained in the agglutinating step, the collecting step, or the rinsing step). The drying step is not particularly limited, provided that the agglutinate containing the fine polymer particles (A) and the resin (B) can be dried. A method of drying the agglutinate is not particularly limited, and examples thereof encompass a method involving drying the agglutinate with use of a dryer, a method involving introducing the agglutinate in a container and raising the temperature and reducing the pressure inside the container, a method involving introducing the agglutinate in a container and subjecting a dry gas and the agglutinate to countercurrent contact within the container, and the like method.

The temperature at which the drying is carried out in the drying step, e.g., the temperature inside the dryer or the temperature of the dry gas, is not particularly limited. The drying temperature in the drying step is, for example, preferably lower than 90° C., more preferably lower than 80° C., more preferably lower than 70° C., more preferably lower than 60° C., more preferably lower than 50° C., even more preferably lower than 40° C.

The preparation step may have the agglutinating step, the collecting step, and the drying step, may have the agglutinating step, the collecting step, the rinsing step, and the drying step.

Another aspect of the preparation step includes a method involving spray-drying the mixture solution containing the fine polymer particles (A) and the resin (B).

(II-1-3. Temperature)

Adjusting the following temperatures in the second production method makes it possible to shorten the time (period) for which an agglutinate containing the fine polymer particles (A) and the resin (B) and a powdery and/or granular material containing the fine polymer particles (A) and the resin (B) are subjected to the environment at a temperature equal to or higher than the glass transition temperature of the graft part of the fine polymer particles (A): the temperature of an aqueous latex (A) that contains the fine polymer particles (A); the temperature of an aqueous latex (B) that contains the resin (B); the temperature of a mixture solution (before flocculation); the temperature of an aqueous solution of a flocculant; the temperature of an aqueous latex that contains the fine polymer particles (A), the resin (B), and the flocculant; the temperature during a heating step; the temperature during a drying step; the temperature of rinse water during a rinsing step; and/or the like.

II-2. Powdery and/or Granular Material

A powdery and/or granular material in accordance with one or more embodiments of the present invention contains fine polymer particles (A) and a resin (B). The fine polymer particles (A) contain a rubber-containing graft copolymer that includes an elastic body and a graft part grafted to the elastic body. The elastic body contains at least one selected from the group consisting of diene-based rubbers, (meth) acrylate-based rubbers, and organosiloxane-based rubbers. The graft part contains a polymer that contains, as one or more structural units, one or more structural units derived from at least one type of monomer selected from the group consisting of aromatic vinyl monomers, vinyl cyanide monomers, and (meth)acrylate monomers. The resin (B) is a liquid which has a viscosity of 100 mPa·s to 1,000,000 mPa·s at 25° C., a semisolid, or a solid. The powdery and/or granular material contains the fine polymer particles (A) in an amount of 50% by weight to 99% by weight and the resin (B) in an amount of 1% by weight to 50% by weight, where 100% by weight represents the total amount of the fine polymer particles (A) and the resin (B). In a case where a resin composition that is obtained by mixing the powdery and/or granular material with a matrix resin (C) is stirred under a stirring condition below, a stirring time taken from when stirring is started to when favorable dispersibility is obtained is not more than 80 minutes. As the stirring condition, a disper mixer having a blade diameter of 32 mm is used as a stirring device, and a rotation speed is 3000 rpm. The phrase "favorable dispersibility" means a state in which, when the resin composition is placed on a grindometer, the resin composition on a gauge is scraped with use of a metal scraper, and a state of dispersion is visually checked, a point on the grindometer is 0 μm, at which five to ten particles having an average particle size of not less than 10 μm have become apparent by scraping within a range 3 mm in width.

A "powdery and/or granular material in accordance with Embodiment 2 of the present invention" may be hereinafter referred to as a "second powdery and/or granular material". The second powdery and/or granular material, when mixed with a matrix resin (C) (described later), gives a resin composition.

The second powdery and/or granular material has the above feature, and therefore has an advantage of excellent dispersibility of the fine polymer particles (A) in a matrix resin (C). In other words, the second powdery and/or granular material has the foregoing feature, and therefore the second powdery and/or granular material brings about, when being mixed with a matrix resin (C) (described later), an advantage of providing a resin composition in which the fine polymer particles (A) are uniformly dispersed in the matrix resin (C).

The following description will discuss aspects of the second powdery and/or granular material in detail. Matters other than those described below (for example, physical properties of the fine polymer particles (A), the resin (B), and the powdery and/or granular material, etc.) are not particularly limited, and the foregoing descriptions in the sections [I-2. Powdery and/or granular material] and [II-1. Method for producing powdery and/or granular material] apply as appropriate.

(II-2-1. Dispersibility)

In a case where a resin composition that is obtained by mixing the second powdery and/or granular material with a matrix resin (C) is stirred under a specific stirring condition, a stirring time taken from when stirring is started to when favorable dispersibility is obtained is not more than 80 minutes.

The disper mixer having a blade diameter of 32 mm, which is used as the stirring device under the specific stirring condition, can be, for example, a disper mixer manufactured by PRIMIX Corporation. As a container for accommodating the resin composition in stirring the resin composition, it is possible to suitably use a container having a volume which is 1.5 times to 3 times the volume of the resin composition, a container in which a ratio between a diameter of a bottom surface of the container and a height of the container (diameter:height) is 1:1 to 1:5, or the like. In stirring the resin composition, a location of the stirring device in the container accommodating the resin composition can be, for example, a location at which the center of the blade (stirring blade) is at a height of 0.5 cm to 3 cm from the bottom of the container.

The second powdery and/or granular material can be said to be a powdery and/or granular material which achieves more excellent dispersibility of the fine polymer particles (A) in the matrix resin (C) as the stirring time becomes shorter. In regard to the second powdery and/or granular material, the stirring time is preferably not more than 75 minutes, more preferably not more than 70 minutes, more preferably not more than 65 minutes, more preferably not more than 60 minutes, more preferably not more than 55 minutes, more preferably not more than 50 minutes, even more preferably not more than 45 minutes, particularly preferably not more than 40 minutes.

(III-2-2. Method of Producing Powdery and/or Granular Material)

A method for producing the second powdery and/or granular material is not particularly limited. Examples of the method for producing a powdery and/or granular material include the following methods (a) and (b): (a) a method involving preparing an aqueous latex containing the fine polymer particles (A) and the resin (B), subjecting the fine polymer particles (A) and the resin (B) in the aqueous latex to salting out, dehydrating an obtained agglutinate of the fine polymer particles (A) and the resin (B), and drying the agglutinate; and (b) a method involving spray-drying an aqueous latex containing the fine polymer particles (A).

The method for producing the second powdery and/or granular material may be the production method described in the section [II-1. Method for producing powdery and/or granular material] above. In other words, the production method described in [II-1. Method for producing powdery and/or granular material] can easily provide the second powdery and/or granular material.

II-3. Resin Composition

One or more embodiments of the present invention also encompass a resin composition which contains the second powdery and/or granular material and the matrix resin (C). For aspects related to the resin composition containing the second powdery and/or granular material, the descriptions of the section [I-4. Resin composition] apply as appropriate while replacing the term "first powdery and/or granular material" with the term "second powdery and/or granular material".

II-4. Cured Product

A cured product obtained by curing the resin composition in which the matrix resin (C) is a thermosetting resin in accordance with one or more embodiments of the present invention as described in the section [II-3. Resin composition] is also encompassed in one or more embodiments of the present invention.

The cured product in accordance with one or more embodiments of the present invention has the foregoing feature, and therefore has (a) an excellent surface appearance, (b) high rigidity and a high elastic modulus, and (c) excellent toughness and excellent adhesiveness.

II-5. Other Uses

A powdery and/or granular material (second powdery and/or granular material) or resin composition in accordance with one or more embodiments of the present invention can be used in various applications, and the applications are not limited to any particular ones. For aspects related to uses of the second powdery and/or granular material or the resin composition containing the second powdery and/or granular material, the descriptions of the section [I-6. Other Uses] apply as appropriate while replacing the term "first powdery and/or granular material" with the term "second powdery and/or granular material".

In one or more embodiments of the present invention, it is possible to carry out the first production method described in the section [I-3. Method for producing powdery and/or granular material] in combination with the second production method described in the section [II-1. Method for producing powdery and/or granular material]. In other words, it is possible to produce a powdery and/or granular material by a production method in which the first production method is combined with the second production method. A powdery and/or granular material that is produced by the production method in which the first production method is combined with the second production method is also encompassed in one or more embodiments of the present invention.

The method in which the first production method is combined with the second production method is not particularly limited. The "production method in which the first production method is combined with the second production method" may be referred to also as "third production method". The third production method is not particularly limited, and is preferably a production method as follows:

A method for producing a powdery and/or granular material, the method including a mixing step of mixing an aqueous latex (A) containing fine polymer particles (A) with an aqueous latex (B) containing a resin (B), an agglutinating step of preparing an agglutinate containing fine polymer particles (A) and a resin (B) from a mixture solution obtained in the mixing step, and a drying step of airflow-drying or freeze-drying the agglutinate, in which:

the mixture solution contains droplets having a volume-average particle size of not less than x−σ and not more than x+5σ in an amount of 0.0% by weight to 14.0% by weight, with respect to 100% by weight of the resin (B) in the mixture solution, where x (μm) is a volume-average particle size of droplets in the aqueous latex (B), and σ is a standard deviation of the volume-average particle size;

the fine polymer particles (A) contain a rubber-containing graft copolymer that includes an elastic body and a graft part grafted to the elastic body;

the elastic body contains at least one selected from the group consisting of diene-based rubbers, (meth)acrylate-based rubbers, and organosiloxane-based rubbers;

the graft part contains a polymer that contains, as one or more structural units, one or more structural units derived from at least one type of monomer selected from the group consisting of aromatic vinyl monomers, vinyl cyanide monomers, and (meth)acrylate monomers;

the resin (B) is a liquid which has a viscosity of 100 mPa·s to 1,000,000 mPa·s at 25° C., a semisolid, or a solid; and the powdery and/or granular material contains the fine polymer particles (A) in an amount of 50% by weight to 99% by weight and the resin (B) in an amount of 1% by weight to 50% by weight, where 100% by weight represents a total amount of the fine polymer particles (A) and the resin (B).

It can also be said that the mixing step in the third production method is a step of preparing a mixture solution containing the fine polymer particles (A) and the resin (B). The mixing step in the third production method may be the mixing step in the second production method. Therefore, for aspects related to the mixing step in the third production method, the descriptions in the section [II-1. Method for producing powdery and/or granular material], for example, the section (II-1-2. Mixing step) apply as appropriate. It can also be said that the mixing step in the third production method is the preparation step (a1) in the first production method. Therefore, for aspects related to the mixing step in the third production method, the descriptions in the section

[I-3. Method for producing powdery and/or granular material] may apply as appropriate.

The agglutinating step in the third production method may be the agglutinating step in the first production method, more specifically, the agglutinating step (a2). Therefore, for aspects related to the agglutinating step in the third production method, the descriptions related to the agglutinating step (a2) in the section [I-3. Method for producing powdery and/or granular material], for example, the section (I-3-1. Agglutinating step) apply as appropriate.

The drying step in the third production method may be the drying step in the first production method. Therefore, for aspects related to the drying step in the third production method, the descriptions related to the drying step in the section [I-3. Method for producing powdery and/or granular material], for example, the section (I-3-3. Drying step) apply as appropriate.

It can also be said that the step in which the agglutinating step is combined with the drying step in the third production method is the preparation step in the second production method.

For aspects of the third production method other than those described above, the foregoing descriptions in, for example, the sections [I-3. Method for producing powdery and/or granular material] and [II-1. Method for producing powdery and/or granular material] apply as appropriate.

A "powdery and/or granular material produced by the production method in which the first production method is combined with the second production method" may be referred to also as "third powdery and/or granular material". The third powdery and/or granular material is not particularly limited, and may have a feature as follows:

A powdery and/or granular material containing fine polymer particles (A) and a resin (B), in which:

the fine polymer particles (A) contain a rubber-containing graft copolymer that includes an elastic body and a graft part grafted to the elastic body;

the elastic body contains at least one selected from the group consisting of diene-based rubbers, (meth)acrylate-based rubbers, and organosiloxane-based rubbers;

the graft part contains a polymer that contains, as one or more structural units, one or more structural units derived from at least one type of monomer selected from the group consisting of aromatic vinyl monomers, vinyl cyanide monomers, and (meth)acrylate monomers;

the resin (B) is a liquid which has a viscosity of 100 mPa·s to 1,000,000 mPa·s at 25° C., a semisolid, or a solid; and the fine polymer particles (A) are contained in an amount of 50% by weight to 99% by weight and the resin (B) is contained in an amount of 1% by weight to 50% by weight, where 100% by weight represents a total amount of the fine polymer particles (A) and the resin (B);

the powdery and/or granular material has pores with an average pore diameter of 0.03 μm to 1.00 μm, and a total volume of the pores is not less than 0.0600 mL/g; and in a case where a resin composition that is obtained by mixing the powdery and/or granular material with a matrix resin (C) is stirred under a stirring condition below, a stirring time taken from when stirring is started to when favorable dispersibility is obtained is not more than 80 minutes.

For aspects related to the third powdery and/or granular material, the foregoing descriptions in, for example, the sections [I-2. Powdery and/or granular material] and [II-2. Powdery and/or granular material] apply as appropriate.

One or more embodiments of the present invention may be configured as follows.

[X1] A powdery and/or granular material containing fine polymer particles (A) and a resin (B), in which: the fine polymer particles (A) contain a rubber-containing graft copolymer that includes an elastic body and a graft part grafted to the elastic body; the elastic body contains at least one selected from the group consisting of diene-based rubbers, (meth)acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the resin (B) is a liquid which has a viscosity of 100 mPa·s to 1,000,000 mPa·s at 25° C., a semisolid, or a solid; the fine polymer particles (A) are contained in an amount of 50% by weight to 99% by weight and the resin (B) is contained in an amount of 1% by weight to 50% by weight, where 100% by weight represents a total amount of the fine polymer particles (A) and the resin (B); the powdery and/or granular material has pores with an average pore diameter of 0.03 μm to 1.00 μm; and a total volume of the pores is not less than 0.0600 mL/g; and an amount of granules having a volume-average particle size of not less than 1000 μm is not more than 3.00% by weight, with respect to 100% by weight of the powdery and/or granular material.

[X2] The powdery and/or granular material described in [X1], in which an amount of granules having a volume-average particle size of not less than 600 μm is not more than 6.00% by weight, with respect to 100% by weight of the powdery and/or granular material.

[X3] The powdery and/or granular material described in [X1] or [X2], in which: the powdery and/or granular material has pores with an average pore diameter of 0.03 μm to 1.00 μm; and a total volume of the pores is not less than 0.0800 mL/g.

[X4] The powdery and/or granular material described in any one of [X1] through [X3], in which: the powdery and/or granular material has pores with an average pore diameter of 0.03 μm to 4.50 μm; and a total volume of the pores is not less than 0.1100 mL/g.

[X5] The powdery and/or granular material described in any one of [X1] through [X4], in which an amount of granules having a volume-average particle size of not less than 600 μm is not more than 1.90% by weight, with respect to 100% by weight of the powdery and/or granular material.

[X6] The powdery and/or granular material described in any one of [X1] through [X5], in which a force required to break a block of the powdery and/or granular material is not more than 30000 Pa, in which: the block is a block obtained by applying, to the powdery and/or granular material which is being allowed to stand, a load of 6.3 kg at 60° C. for 2 hours by placing a 6.3 kg weight on 30 g of the powdery and/or granular material contained in a cylindrical container having a diameter of 50 mm, and the force is a value obtained by measurement using a rheometer.

[X7] The powdery and/or granular material described in any one of [X1] through [X6], in which a volume-average particle size of the fine polymer particles (A) is not more than 0.23 μm.

[X8] The powdery and/or granular material described in any one of [X1] through [X7], in which a volume-average particle size of the fine polymer particles (A) is not less than 0.09 μm.

[X9] A resin composition containing: the powdery and/or granular material described in any one of [X1] through [X8]; and a matrix resin (C).

[X10] A method for producing a powdery and/or granular material, the method including an agglutinating step of preparing an agglutinate containing fine polymer particles (A) and a resin (B), and a drying step of airflow-drying or freeze-drying the agglutinate, in which: the fine polymer particles (A) contain a rubber-containing graft copolymer that includes an elastic body and a graft part grafted to the elastic body; the elastic body contains at least one selected from the group consisting of diene-based rubbers, (meth) acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the resin (B) is a liquid which has a viscosity of 100 mPa·s to 1,000,000 mPa·s at 25° C., a semisolid, or a solid; and an amount of the fine polymer particles (A) is 50% by weight to 99% by weight and an amount of the resin (B) is 1% by weight to 50% by weight, where 100% by weight represents a total amount of the fine polymer particles (A) and the resin (B).

[X11] The method described in [X10], in which the agglutinating step further includes a fine polymer particle spraying step of spraying an aqueous latex containing the fine polymer particles (A) and the resin (B) in the presence of a flocculant.

[X12] The method described in [X11], in which the agglutinating step further includes a flocculant spraying step of spraying the flocculant or a solution containing the flocculant in the presence of the fine polymer particles (A) and the resin (B).

[X13] The method described in any one of [X10] through [X12], in which the drying step is carried out at a temperature of not higher than 100° C.

[X14] A method for producing a powdery and/or granular material, the method including a mixing step of mixing an aqueous latex (A) containing fine polymer particles (A) with an aqueous latex (B) containing a resin (B), and a preparation step of preparing a powdery and/or granular material containing the fine polymer particles (A) and the resin (B) from a mixture solution obtained in the mixing step, in which: the fine polymer particles (A) contain a rubber-containing graft copolymer that includes an elastic body and a graft part grafted to the elastic body; the elastic body contains at least one selected from the group consisting of diene-based rubbers, (meth)acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the resin (B) is a liquid which has a viscosity of 100 mPa·s to 1,000,000 mPa·s at 25° C., a semisolid, or a solid; the powdery and/or granular material contains the fine polymer particles (A) in an amount of 50% by weight to 99% by weight and the resin (B) in an amount of 1% by weight to 50% by weight, with respect to 100% by weight in total of the fine polymer particles (A) and the resin (B); and the mixture solution contains droplets having a volume-average particle size of not less than x−σ and not more than x+5σ in an amount of 0.0% by weight to 14.0% by weight, with respect to 100% by weight of the resin (B) in the mixture solution, where x (μm) is a volume-average particle size of droplets in the aqueous latex (B), and σ is a standard deviation of the volume-average particle size.

[X15] The method described in any one of [X10] through [X14], in which a force required to break a block of the powdery and/or granular material is not more than 30000 Pa, where: the block is a block obtained by applying, to the powdery and/or granular material which is being allowed to stand, a load of 6.3 kg at 60° C. for 2 hours by placing a 6.3 kg weight on 30 g of the powdery and/or granular material contained in a cylindrical container having a diameter of 50 mm, and the force is a value obtained by measurement using a rheometer.

[X16] The method described in any one of [X10] through [X15], in which a volume-average particle size of the fine polymer particles (A) is not more than 0.23 μm.

[X17] The method described in any one of [X10] through [X16], in which a volume-average particle size of the fine polymer particles (A) is not less than 0.09 μm.

[Y1] A powdery and/or granular material containing fine polymer particles (A) and a resin (B), in which: the fine polymer particles (A) contain a rubber-containing graft copolymer that includes an elastic body and a graft part grafted to the elastic body; the elastic body contains at least one selected from the group consisting of diene-based rubbers, (meth)acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the resin (B) is a liquid which has a viscosity of 100 mPa·s to 1,000,000 mPa·s at 25° C., a semisolid, or a solid; the fine polymer particles (A) are contained in an amount of 50% by weight to 99% by weight and the resin (B) is contained in an amount of 1% by weight to 50% by weight, where 100% by weight represents a total amount of the fine polymer particles (A) and the resin (B); the powdery and/or granular material has pores with an average pore diameter of 0.03 μm to 1.00 μm; and a total volume of the pores is not less than 0.0600 mL/g.

[Y2] The powdery and/or granular material described in [Y1], in which an amount of granules having a volume-average particle size of not less than 1000 μm is not more than 3.00% by weight, with respect to 100% by weight of the powdery and/or granular material.

[Y3] The powdery and/or granular material described in [Y1] or [Y2], in which an amount of granules having a volume-average particle size of not less than 600 μm is not more than 6.00% by weight, with respect to 100% by weight of the powdery and/or granular material.

[Y4] The powdery and/or granular material described in any one of [Y1] through [Y3], in which: the powdery and/or granular material has pores with an average pore diameter of 0.03 μm to 1.00 μm; and a total volume of the pores is not less than 0.0800 mL/g.

[Y5] The powdery and/or granular material described in any one of [Y1] through [Y4], in which: the powdery and/or granular material has pores with an average pore diameter of 0.03 μm to 4.50 μm; and a total volume of the pores is not less than 0.1100 mL/g.

[Y6] The powdery and/or granular material described in any one of [Y1] through [Y5], in which an amount of granules having a volume-average particle size of not less than 600 μm is not more than 1.90% by weight, with respect to 100% by weight of the powdery and/or granular material.

[Y7] The powdery and/or granular material described in any one of [Y1] through [Y6], in which a force required to break a block of the powdery and/or granular material is not more than 30000 Pa, in which: the block is a block obtained by applying, to the powdery and/or granular material which is being allowed to stand, a load of 6.3 kg at 60° C. for 2 hours by placing a 6.3 kg weight on 30 g of the powdery and/or granular material contained in a cylindrical container having a diameter of 50 mm, and the force is a value obtained by measurement using a rheometer.

[Y8] A resin composition containing: the powdery and/or granular material described in any one of [Y1] through [Y7]; and a matrix resin (C).

[Y9] A method for producing a powdery and/or granular material, the method including an agglutinating step of preparing an agglutinate containing fine polymer particles (A) and a resin (B), and a drying step of airflow-drying or freeze-drying the agglutinate, in which: the fine polymer particles (A) contain a rubber-containing graft copolymer that includes an elastic body and a graft part grafted to the elastic body; the elastic body contains at least one selected from the group consisting of diene-based rubbers, (meth)acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the resin (B) is a liquid which has a viscosity of 100 mPa·s to 1,000,000 mPa·s at 25° C., a semisolid, or a solid; and the fine polymer particles (A) are contained in an amount of 50% by weight to 99% by weight and the resin (B) is contained in an amount of 1% by weight to 50% by weight, where 100% by weight represents a total amount of the fine polymer particles (A) and the resin (B).

[Y10] The method described in [Y9], in which the agglutinating step further includes a fine polymer particle spraying step of spraying the aqueous latex containing the fine polymer particles (A) and the resin (B) in the presence of a flocculant.

[Y11] The method described in [Y10], in which the agglutinating step further includes a flocculant spraying step of spraying the flocculant or a solution containing the flocculant in the presence of the fine polymer particles (A) and the resin (B).

[Y12] The method described in any one of [Y9] through [Y11], in which the drying step is carried out at a temperature of not higher than 100° C.

[Y13] The method described in any one of [Y9] through [Y12], in which a force required to break a block of the powdery and/or granular material is not more than 30000 Pa, where: the block is a block obtained by applying, to the powdery and/or granular material which is being allowed to stand, a load of 6.3 kg at 60° C. for 2 hours by placing a 6.3 kg weight on 30 g of the powdery and/or granular material contained in a cylindrical container having a diameter of 50 mm, and the force is a value obtained by measurement using a rheometer.

One or more embodiments of the present invention may be configured as follows.

[Z1] A method for producing a powdery and/or granular material, the method including a mixing step of mixing an aqueous latex (A) containing fine polymer particles (A) with an aqueous latex (B) containing a resin (B), and a preparation step of preparing a powdery and/or granular material containing the fine polymer particles (A) and the resin (B) from a mixture solution obtained in the mixing step, in which: the fine polymer particles (A) contain a rubber-containing graft copolymer that includes an elastic body and a graft part grafted to the elastic body; the elastic body contains at least one selected from the group consisting of diene-based rubbers, (meth)acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the resin (B) is a liquid which has a viscosity of 100 mPa·s to 1,000,000 mPa·s at 25° C., a semisolid, or a solid; the powdery and/or granular material contains the fine polymer particles (A) in an amount of 50% by weight to 99% by weight and the resin (B) in an amount of 1% by weight to 50% by weight, with respect to 100% by weight in total of the fine polymer particles (A) and the resin (B); the mixture solution contains droplets having a volume-average particle size of not less than x−σ and not more than x+5σ in an amount of 0.0% by weight to 14.0% by weight, with respect to 100% by weight of the resin (B) in the mixture solution, where x (μm) is a volume-average particle size of droplets in the aqueous latex (B), and σ is a standard deviation of the volume-average particle size.

[Z2] The method described in [Z1], in which a volume-average particle size of the fine polymer particles (A) is not more than 0.23 μm.

[Z3] The method described in [Z1] or [Z2], in which a volume-average particle size of the fine polymer particles (A) is not less than 0.09 μm.

[Z4] The method described in any one of [Z1] through [Z3], in which a force required to break a block of the powdery and/or granular material is not more than 30000 Pa, where: the block is a block obtained by applying, to the powdery and/or granular material which is being allowed to stand, a load of 6.3 kg at 60° C. for 2 hours by placing a 6.3 kg weight on 30 g of the powdery and/or granular material contained in a cylindrical container having a diameter of 50 mm, and the force is a value obtained by measurement using a rheometer.

[Z5] A powdery and/or granular material containing fine polymer particles (A) and a resin (B), in which: the fine polymer particles (A) contain a rubber-containing graft copolymer that includes an elastic body and a graft part grafted to the elastic body; the elastic body contains at least one selected from the group consisting of diene-based rubbers, (meth)acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the resin (B) is a liquid which has a viscosity of 100 mPa·s to 1,000,000 mPa·s at 25° C., a semisolid, or a solid; the powdery and/or granular material contains the fine polymer particles (A) in an amount of 50% by weight to 99% by weight and the resin (B) in an amount of 1% by weight to 50% by weight, where 100% by weight represents a total amount of the fine polymer particles (A) and the resin (B); in a case where a resin composition that is obtained by mixing the powdery and/or granular material with a matrix resin (C) is stirred under a stirring condition below, a stirring time taken from when stirring is started to when favorable dispersibility is obtained is not more than 80 minutes: where, as the stirring condition, a disper mixer having a blade diameter of 32 mm is used as a stirring device, and a rotation speed is 3000 rpm; and where the phrase "favorable dispersibility" means a state in which, when the resin composition is placed on a grindometer, the resin composition on a gauge is scraped with use of a metal scraper, and a state of dispersion is visually checked, a point on the grindometer is 0 μm, at which five to ten particles having an average particle size of not less than 10 μm have become apparent by scraping within a range 3 mm in width.

[Z6] The powdery and/or granular material described in [Z5], in which a volume-average particle size of the fine polymer particles (A) is not more than 0.23 μm.

[Z7] The powdery and/or granular material described in [Z5] or [Z6], in which a volume-average particle size of the fine polymer particles (A) is not less than 0.09 μm.

[Z8] The powdery and/or granular material described in any one of [Z5] through [Z7], in which a force required to break a block of the powdery and/or granular material is not more than 30000 Pa, in which: the block is a block obtained by applying, to the powdery and/or granular material which is being allowed to stand, a load of 6.3 kg at 60° C. for 2 hours by placing a 6.3 kg weight on 30 g of the powdery and/or granular material contained in a cylindrical container having a diameter of 50 mm, and the force is a value obtained by measurement using a rheometer.

EXAMPLES

Example A

The following description will discuss Embodiment 1 of the present invention in detail with reference to Examples A and Comparative Examples A. Note that one or more embodiments of the present invention are not limited to these examples. One or more embodiments of the present invention can be altered as appropriate within the scope of the gist disclosed herein. One or more embodiments of the present invention also include, in their technical scope, embodiments achieved by altering the embodiments. Note that, in the following Examples A and Comparative Examples A, "parts" means "parts by weight", and "%" means "% by weight"

<Component>

Components used in Production Examples A, Examples A, and Comparative Examples A are as follows:

Fine Polymer Particles (A)

Fine polymer particles (A) obtained in Production Examples A described below were used.

Resin (B)

A mixture of 67 parts by weight of epoxidized soybean oil (ADK CIZER O-130P manufactured by ADEKA CORPORATION) and 33 parts by weight of triethylene glycol bis[3-(-t-butyl-4-hydroxy-5-methylphenyl)propionate] (antioxidant) (Irganox 245, manufactured by BASF JAPAN LTD.) was used.

Matrix Resin (C)

Bisphenol A epoxy resin (JER828 manufactured by Mitsubishi Chemical Corporation) was used.

<Evaluation Methods>

First, the following description will discuss methods of evaluating resin compositions produced in Examples A and Comparative Examples A.

(Measurement of Volume-Average Particle Size)

The volume-average particle size (Mv) of an elastic body or fine polymer particles (A) dispersed in an aqueous latex was measured with use of Nanotrac WaveII-EX150 (manufactured by MicrotracBEL Corp.). A test specimen used for measurement was prepared by diluting the aqueous latex in deionized water. When the measurement was made, the refractive index of water and the refractive index of the elastic body or the fine polymer particles (A) obtained in each of Production Examples A were inputted, measurement time was set to 120 seconds, and the concentration of the test specimen was adjusted such that a load index fell within the range of 1 to 10.

The volume-average particle size (Mv) of each powdery and/or granular material was measured using a laser diffraction particle size distribution analyzer Microtrac MT3000II (manufactured by MicrotracBEL Corp.).

(Measurement of Volume-Average Particle Size and Contained Amount of Aqueous Latex (B) or Droplets in Mixture Solution)

The volume-average particle size and the contained amount of the aqueous latex (B) containing the resin (B) or of the droplets in the mixture solution containing the fine polymer particles (A) and the resin (B) were measured by a laser diffraction particle size distribution analyzer while using the aqueous latex (B) or the mixture solution as a test specimen. As the laser diffraction particle size distribution analyzer, Microtrac MT3000II (manufactured by MicrotracBEL Corp.) was used.

(Differential Scanning Calorimetry (DSC) of Resin (B))

Measurement was carried out with respect to the used resin (B) with use of DSC7020 (manufactured by Hitachi High-Tech Science Corporation) at a temperature increase rate of 10° C./min. As a result, a DSC thermogram of the resin (B) indicated an endothermic peak at −16.9° C.

(Measurement of Viscosity of Resin (B))

The used resin (B) was measured for its viscosity at a measurement temperature of 25° C. using a digital viscometer DV-II+Pro manufactured by BROOKFIELD and also using a spindle CPE-52 in accordance with a viscosity range, under the conditions in which shear rate was changed as necessary. As a result, the viscosity of the resin (B) was 11,000 mPa·s.

(Dispersibility of Powdery and/or Granular Material in Matrix Resin (C))

Powdery and/or granular materials obtained in Examples A and Comparative Examples A were each prepared in an amount of 15 parts by weight (15 g), and bisphenol A epoxy resin, which was the matrix resin (C), was prepared in an amount of 85 parts by weight (85 g). The prepared powdery and/or granular material and the bisphenol A epoxy resin were introduced into a container having a capacity of 200 mL. The capacity of the container was approximately twice as large as the volume of the prepared powdery and/or granular material and bisphenol A epoxy resin. The powdery and/or granular material and the bisphenol A epoxy resin were mixed with use of a disper mixer (manufactured by PRIMIX Corporation) having a stirring blade with a blade diameter of Φ32 mm at a rotation speed of 3000 rpm, and thus a resin composition was obtained. A resin composition was placed on a grindometer (grind gage), the resin composition on the gauge was scraped with use of a metal scraper, and the state of dispersion was visually checked. The point on the scale of the grindometer, at which there were five to ten particles (which became apparent by the scraping) within a range 3 mm in width, was read, and a time until the scale indicated 0 μm was measured. The results are shown in Table 1.

(Pore in Powdery and/or Granular Material)

With use of an automatic mercury porosimeter (pore size distribution measuring device) (manufactured by Shimadzu Corporation), the powdery and/or granular materials obtained in Examples A and Comparative Examples A were subjected to measurement under pressure of 20 psia to 3000 psia. From the obtained result, a total volume of pores having an average pore diameter of 0.03 μm to 1.0 μm, and a total volume of pores having an average pore diameter of 0.03 μm to 4.5 μm were calculated. The results are shown in Table 1.

(Anti-Blocking Property of Powdery and/or Granular Material)

With use of each of the powdery and/or granular materials obtained in Examples A and Comparative Examples A, the following operations (1) through (3) were carried out in this order to prepare a block of the powdery and/or granular material: (1) 30 g of the powdery and/or granular material was placed in a cylindrical container having a diameter of 50 mm; (2) a load of 6.3 kg was applied, to the powdery and/or granular material which is being allowed to stand, at 60° C. for 2 hours by placing a 6.3 kg weight on the powdery and/or granular material in the container; and (3) the obtained block was taken out from the container. Next, a force required to break the obtained block of the powdery and/or granular material was measured using a rheometer. The anti-blocking property was evaluated on the basis of the obtained result with reference to the following criteria.

Acceptable: A force required to break the block of the powdery and/or granular material is not more than 30000 Pa.

Unacceptable: A force required to break the block of the powdery and/or granular material is more than 30000 Pa.

1. Preparation of Fine Polymer Particles (A)

Production Example A

Production Example A1-1: Preparation of Aqueous Latex (L-A1) Containing Fine Polymer Particles (A)

Into a pressure-resistant polymerization apparatus were introduced 160 parts by weight of deionized water, 0.002 parts by weight of disodium ethylenediaminetetraacetate (EDTA), 0.001 parts by weight of ferrous sulfate heptahydrate, 0.029 parts by weight of polyoxyethylene lauryl ether phosphate, and 0.003 parts by weight of sodium hydroxide. In so doing, the polyoxyethylene lauryl ether phosphate turned into sodium polyoxyethylene lauryl ether phosphate in the presence of the sodium hydroxide, and functioned as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. After that, 76.5 parts by weight of butadiene (Bd) and 23.5 parts by weight of styrene (St) were introduced into the pressure-resistant polymerization apparatus, and the temperature inside the pressure-resistant polymerization apparatus was raised to 45° C. After that, 0.03 parts by weight of paramenthane hydroperoxide (PHP) was introduced into the pressure-resistant polymerization apparatus, and then 0.05 parts by weight of sodium formaldehyde sulfoxylate (SFS) was introduced into the pressure-resistant polymerization apparatus. Polymerization was then started. At the time 20 hours had elapsed from the start of the polymerization, residual monomers not used in the polymerization were removed by devolatilization under reduced pressure, and thereby the polymerization was ended. During the polymerization, PHP, polyoxyethylene lauryl ether phosphate, and sodium hydroxide were each added to the pressure-resistant polymerization apparatus in discretionarily selected amounts and discretionarily selected points in time. By the polymerization, an aqueous latex (R-A1), which contained an elastic body (core layer) containing polystyrene-butadiene rubber as a main component, was obtained. The volume-average particle size of the elastic body (core layer) contained in the obtained aqueous latex was 192 nm.

Into a glass reaction vessel were introduced 215 parts by weight of the aqueous latex (R-A1) of polystyrene-butadiene rubber (including 70 parts by weight of the elastic body containing polystyrene-butadiene rubber as a main component) and 82 parts by weight of deionized water. The glass reaction vessel had a thermometer, a stirrer, a reflux condenser, a nitrogen inlet, and a monomer adding device. While gas in the glass reaction vessel was replaced with nitrogen, the materials thus introduced were stirred at 60° C. Next, 2.6 parts by weight of 1,3-butylene glycol dimethacrylate and 0.07 parts by weight of t-butyl hydroperoxide (BHP) were added to the glass reaction vessel, and the resultant mixture was stirred for 10 minutes. Next, 0.004 parts by weight of EDTA, 0.001 parts by weight of ferrous sulfate heptahydrate, and 0.13 parts by weight of SFS were added to the glass reaction vessel, and the resultant mixture in the glass reaction vessel was stirred for 30 minutes. Next, 0.013 parts by weight of BHP was added to the glass reaction vessel, and the resultant mixture was stirred for another 30 minutes. Next, a mixture of 28.5 parts by weight of methyl methacrylate (MMA), 1.5 parts by weight of butyl acrylate (BA), and 0.085 parts by weight of BHP was continuously added to the glass reaction vessel over 120 minutes. Then, 0.013 parts by weight of BHP was added to the glass reaction vessel, and the resultant mixture in the glass reaction vessel was stirred for another hour so as to finish polymerization. Through the above operations was obtained an aqueous latex (L-A1) containing the fine polymer particles (A). 99% or more of the monomer component had been polymerized. The volume-average particle size of the fine polymer particles (A) contained in the obtained aqueous latex was 200 nm.

Production Example A1-2: Preparation of Aqueous Latex (L-A3) Containing Fine Polymer Particles (A)

Into a pressure-resistant polymerization apparatus were introduced 200 parts by weight of deionized water, 0.03 parts by weight of tripotassium phosphate, 0.002 parts by weight of EDTA, 0.001 parts by weight of ferrous sulfate heptahydrate, and 1.55 parts by weight of sodium dodecyl-benzenesulfonate (SDBS) as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. After that, 100 parts by weight of Bd was introduced into the pressure-resistant polymerization apparatus, and the temperature inside the pressure-resistant polymerization apparatus was raised to 45° C. After that, 0.03 parts by weight of PHP was introduced into the pressure-resistant polymerization apparatus, and then 0.10 parts by weight of SFS was introduced into the pressure-resistant polymerization apparatus. Polymerization was then started. At the time 15 hours had elapsed from the start of the polymerization, residual monomers not used in the polymerization were removed by devolatilization under reduced pressure, and thereby the polymerization was ended. During the polymerization, PHP, EDTA, and ferrous sulfate heptahydrate were each added to the pressure-resistant polymerization apparatus in discretionarily selected amounts and discretionarily selected points in time. By the polymerization, an aqueous latex (R-A2), which contained an elastic body containing polybutadiene rubber as a main component, was obtained. The volume-average particle size of the elastic body contained in the obtained aqueous latex was 90 nm.

Into a pressure-resistant polymerization apparatus were introduced an aqueous latex (R-A2) of polybutadiene rubber in an amount corresponding to 7 parts by weight of an elastic body containing polybutadiene rubber as a main component, 200 parts by weight of deionized water, 0.03 parts by weight of tripotassium phosphate, 0.002 parts by weight of EDTA, and 0.001 parts by weight of ferrous sulfate heptahydrate. Next, while the materials thus introduced were stirred, gas in the pressure-resistant polymerization apparatus was replaced with nitrogen, so as to sufficiently remove oxygen from the inside of the pressure-resistant polymerization apparatus. After that, 93 parts by weight of Bd was introduced into the pressure-resistant polymerization apparatus, and the temperature inside the pressure-resistant polymerization apparatus was raised to 45° C. After that, 0.02 parts by weight of PHP was introduced into the pressure-resistant polymerization apparatus, and then 0.10 parts by weight of SFS was introduced into the pressure-resistant polymerization apparatus. Polymerization was then started. At the time 30 hours had elapsed from the start of the polymerization, residual monomers not used in the polymerization were removed by devolatilization under reduced pressure, and thereby the polymerization was ended. During the polymerization, PHP, EDTA, and ferrous sulfate heptahydrate were each added to the pressure-resistant polymerization apparatus in discretionarily selected amounts and discretionarily selected points in time. By the polymerization, an aqueous latex (R-A3), which contained an elastic body (core layer) containing polybutadiene rubber as a main component, was obtained. The volume-average particle size of the elastic body (core layer) contained in the obtained aqueous latex was 195 nm.

Into a glass reaction vessel were introduced 215 parts by weight of the aqueous latex (R-A3) of polybutadiene rubber (including 71 parts by weight of the elastic body containing polybutadiene rubber as a main component) and 82 parts by weight of deionized water. The glass reaction vessel had a thermometer, a stirrer, a reflux condenser, a nitrogen inlet, and a monomer adding device. While gas in the glass reaction vessel was replaced with nitrogen, the materials thus introduced were stirred at 60° C. Next, 2.6 parts by weight of 1,3-butylene glycol dimethacrylate and 0.07 parts by weight of BHP were added to the glass reaction vessel, and the resultant mixture was stirred for 10 minutes. Next, 0.004 parts by weight of EDTA, 0.001 parts by weight of ferrous sulfate heptahydrate, and 0.13 parts by weight of SFS were added to the glass reaction vessel, and the resultant mixture in the glass reaction vessel was stirred for 30 minutes. Next, 0.013 parts by weight of BHP was added to the glass reaction vessel, and the resultant mixture was stirred for another 30 minutes. Next, a mixture of 22 parts by weight of MMA, 7 parts by weight of St, and 0.085 parts by weight of BHP was continuously added to the glass reaction vessel over 70 minutes. Then, 0.013 parts by weight of BHP was added to the glass reaction vessel, and the resultant mixture in the glass reaction vessel was stirred for another hour so as to finish polymerization. Through the above operations was obtained an aqueous latex (L-A3) containing the fine polymer particles (A). 99% or more of the monomer component had been polymerized. The volume-average particle size of the fine polymer particles (A) contained in the obtained aqueous latex was 200 nm.

2. Preparation of Powdery and/or Granular Material

Example A1: Preparation of Powdery and/or Granular Material

A homogenizer was used to mix water, the resin (B), and SDBS which is an emulsifying agent to prepare an aqueous emulsion (S-A1) (the amount of resin (B) contained was 50%) in which the resin (B) was emulsified. Next, 325 parts by weight of the aqueous latex (L-A1) (equivalent to 100 parts by weight of the fine polymer particles (A)) and 22.2 parts by weight of the aqueous emulsion (S-A1) (equivalent to 11.1 parts by weight of the resin (B)) were mixed to prepare an aqueous latex (L-A2) containing the fine polymer particles (A) and the resin (B). The aqueous latex (L-A2) was sprayed into a container in which a flocculative atmosphere was formed (i.e., into a flocculation chamber), and thus slurry containing an agglutinate containing the fine polymer particles (A) and the resin (B) was obtained. The flocculative atmosphere inside the container was formed as follows: (1) inside a cylindrical container having a height of 9 m and a diameter of 1.5 m, warm water at 46° C. was sprayed from a side spray nozzle which was attached to an upper part of an inner wall of the container, and thus the warm water was allowed to flow downward along an inner wall surface; and (2) during the above process (1), a 25% aqueous calcium acetate solution was dispersed, as fine droplets of 100 microns or smaller, inside the container from an internal mixing type two-fluid nozzle having a pore diameter of 2.0 mm by moisture vapor at pressure of 0.6 $Kg/cm^2G$. A temperature of the flocculative atmosphere inside the container was 60° C., and pressure of the flocculative atmosphere (pressure inside the container) was atmospheric pressure. The "inside of the container in which a flocculative atmosphere is formed" can also be said as "inside of a flocculation chamber". The aqueous latex (L-A2) was sprayed at spraying pressure of 7.3 $Kg/cm^2G$ with use of eight nozzles each of which is a hollow cone nozzle that is one type of pressurization nozzles and has a pore diameter of 2.0 mm. That is, gas phase flocculation was carried out in Example A1. Next, the slurry was subjected to centrifugal dehydration to obtain wet powder, which is the foregoing agglutinate. Two cycles in total of the operation of introducing the obtained wet powder into 500 parts by weight of ion exchanged water and the operation of subjecting the obtained mixture to centrifugal dehydration were carried out to obtain wet powder. A water content of the wet powder was 57%. Lastly, dry air at 50° C. was blown so as to allow the wet powder to float, and thus the wet powder was dried until a temperature of the wet powder reached 40° C. That is, airflow drying was carried out in Example A1. The dried powdery and/or granular material was sieved with use of a sieve with 32-mesh, and thus a powdery and/or granular material containing the fine polymer particles (A) and the resin (B) was obtained. The anti-blocking property of the obtained powdery and/or granular material was evaluated as "acceptable". The volume-average particle size of the obtained powdery and/or granular material measured was not more than 10 mm.

Example A2: Preparation of Powdery and/or Granular Material

With a method identical to that of Example A1, wet powder having a water content of 57% was obtained. Lastly, dry air at 110° C. was blown so as to allow the wet powder to float, and thus the wet powder was dried until a temperature of the wet powder reached 40° C. That is, airflow drying was carried out in Example A2. The dried powdery and/or granular material was sieved with use of a sieve with 32-mesh, and thus a powdery and/or granular material containing the fine polymer particles (A) and the resin (B) was obtained. The anti-blocking property of the obtained powdery and/or granular material was evaluated as "acceptable". The volume-average particle size of the obtained powdery and/or granular material measured was not more than 10 mm.

Comparative Example A1: Preparation of Powdery and/or Granular Material

With a method identical to that of Example A1, wet powder having a water content of 57% was obtained. Lastly, the wet powder was subjected to stationary drying for 48 hours in a box-type dryer at 50° C. That is, stationary drying was carried out in Comparative Example A1. The dried powdery and/or granular material was sieved with use of a sieve with 32-mesh, and thus a powdery and/or granular material containing the fine polymer particles (A) and the resin (B) was obtained.

Comparative Example A2: Preparation of Powdery and/or Granular Material 600 parts by weight of ion exchanged water having 4 parts by weight of calcium acetate dissolved therein and having its temperature controlled to 70° C. was prepared. Next, 325 parts by weight of the aqueous latex (L-A1) (equivalent to 100 parts by weight of the fine polymer particles (A)) and 22.2 parts by weight of the aqueous emulsion (S-A1) (equivalent to 11.1 parts by weight of the resin (B)) were introduced into 600 parts by weight of the ion exchanged water, and slurry containing an agglutinate containing the fine polymer particles (A) and the resin (B) was obtained. That is, liquid phase flocculation was carried out in Comparative Example A2. Next, the slurry was subjected to centrifugal dehydration to obtain wet powder, which is the foregoing agglutinate. Two cycles in total of the operation of introducing the obtained wet powder into 500 parts by weight of ion exchanged water and the operation of subjecting the obtained mixture to centrifugal dehydration were carried out to obtain wet powder. A water content of the wet powder was 60%. Lastly, the wet powder was subjected to stationary drying for 48 hours in a box-type dryer at 50° C. That is, stationary drying was carried out in Comparative Example A2. The dried powdery and/or granular material was sieved with use of a sieve with 32-mesh, and thus a powdery and/or granular material containing the fine polymer particles (A) and the resin (B) was obtained.

Comparative Example A3: Preparation of Powdery and/or Granular Material 600 parts by weight of ion exchanged water having 4 parts by weight of calcium acetate dissolved therein and having its temperature controlled to 70° C. was prepared. Next, 325 parts by weight of the aqueous latex (L-A1) (equivalent to 100 parts by weight of the fine polymer particles (A)) was introduced into 600 parts by weight of the ion exchanged water, and slurry containing an agglutinate containing the fine polymer particles (A) was obtained. That is, liquid phase flocculation was carried out in Comparative Example A3. Next, the slurry was subjected to centrifugal dehydration to obtain wet powder, which is the foregoing agglutinate. Two cycles in total of the operation of introducing the obtained wet powder into 500 parts by weight of ion exchanged water and the operation of subjecting the obtained mixture to centrifugal dehydration were carried out to obtain wet powder. A water content of the wet powder was 58%. Lastly, the wet powder was subjected to stationary drying for 48 hours in a box-type dryer at 50° C. That is, stationary drying was carried out in Comparative Example A3. The dried powdery and/or granular material was sieved with use of a sieve with 32-mesh, and thus a powdery and/or granular material containing the fine polymer particles (A) was obtained.

Comparative Example A4: Preparation of Powdery and/or Granular Material

The aqueous latex (L-A3) was sprayed into a container in which a flocculative atmosphere was formed (i.e., into a flocculation chamber), and thus slurry containing an agglutinate containing the fine polymer particles (A) and the resin (B) was obtained. The flocculative atmosphere inside the container was formed as follows: (1) inside a cylindrical container having a height of 9 m and a diameter of 1.5 m, warm water at 46° C. was sprayed from a side spray nozzle which was attached to an upper part of an inner wall of the container, and thus the warm water was allowed to flow downward along an inner wall surface; and (2) during the above process (1), a 25% aqueous calcium acetate solution was dispersed, as fine droplets of 100 microns or smaller, inside the container from an internal mixing type two-fluid nozzle having a pore diameter of 2.0 mm by moisture vapor at pressure of 0.6 Kg/cm²G. A temperature of the flocculative atmosphere inside the container was 60° C., and pressure of the flocculative atmosphere (pressure inside the container) was atmospheric pressure. The "inside of the container in which a flocculative atmosphere is formed" can also be said as "inside of a flocculation chamber". The aqueous latex (L-A2) was sprayed at spraying pressure of 7.3 Kg/cm²G with use of eight nozzles each of which is a hollow cone nozzle that is one type of pressurization nozzles and has a pore diameter of 2.0 mm. That is, gas phase flocculation was carried out in Comparative Example A4. Next, the slurry was subjected to centrifugal dehydration to obtain wet powder, which is the foregoing agglutinate. Two cycles in total of the operation of introducing the obtained wet powder into 500 parts by weight of ion exchanged water and the operation of subjecting the obtained mixture to centrifugal dehydration were carried out to obtain wet powder. A water content of the wet powder was 56%. Lastly, dry air at 50° C. was blown so as to allow the wet powder to float, and thus the wet powder was dried until a temperature of the wet powder reached 40° C. That is, airflow drying was carried out in Comparative Example A4. The dried powdery and/or granular material was sieved with use of a sieve with 32-mesh, and thus a powdery and/or granular material containing the fine polymer particles (A) was obtained. The anti-blocking property of the obtained powdery and/or granular material was evaluated as "acceptable". The volume-average particle size of the obtained powdery and/or granular material measured was not more than 10 mm.

Comparative Example A5: Preparation of Powdery and/or Granular Material

The powdery and/or granular material obtained in Comparative Example A4 in an amount equivalent to 100 parts by weight of the fine polymer particles (A) and the resin (B) in an amount of 11.1 parts by weight were mixed for 40 minutes by a planetary centrifugal mixer at 2000 rpm. Then, an obtained mixture was sieved with use of a sieve with 32-mesh, and thus granules were obtained. The volume-average particle size of the obtained powdery and/or granular material measured was not more than 10 mm.

Example A3: Preparation of Powdery and/or Granular Material

The aqueous latex (B) preparation step was carried out as follows: That is, water, the resin (B), and SDBS which is an emulsifying agent were mixed to obtain a mixture. Next, the obtained mixture was stirred (mixed) with use of a homogenizer. By the aqueous latex (B) preparation step, an aqueous latex (S-A2) was obtained which was an aqueous latex (B) containing the resin (B), i.e., an aqueous latex (B) containing droplets (B) containing one or more pieces of the resin (B). A contained amount of the resin (B) was 50% by weight, with respect to 100% by weight of the aqueous latex (S-A2). A volume-average particle size (particle size distribution) of droplets in the aqueous latex (S-A2), which is the aqueous latex (B), was measured by the foregoing method while using the aqueous latex (S-A2) as a test specimen. As a result, the droplets in the aqueous latex (S-A2) had the volume-average particle size of 5.60 μm and the standard deviation of 5.21 μm. Therefore, x−σ was 0.39, and x+5σ was 31.65.

325 parts by weight of the aqueous latex (L-A3) (equivalent to 100 parts by weight of the fine polymer particles (A)) and 22.2 parts by weight of the aqueous emulsion (S-A2) (equivalent to 11.1 parts by weight of the resin (B)) were mixed together. By this mixing step, an aqueous latex (L-A4), which is the mixture solution containing the fine polymer particles (A) and the resin (B), was prepared. A volume-average particle size and a contained amount (particle size distribution) of droplets in the mixture solution were measured by the foregoing method while using the mixture solution (aqueous latex (L-A4)) as a test specimen. As a result, the amount of droplets having the volume-average particle size of not less than 0.39 and not more than 31.65 was not more than the detection limit, with respect to 100% by weight of the resin (B) in the mixture solution (aqueous latex (L-A4)). In the present specification, results of not more than the detection limit are indicated as N.D. (abbreviation of "not detected"). The aqueous latex (L-A4) was sprayed into a container in which a flocculative atmosphere was formed (i.e., into a flocculation chamber), and thus slurry containing an agglutinate containing the fine polymer particles (A) and the resin (B) was obtained. The flocculative atmosphere inside the container was formed as follows: (1) inside a cylindrical container having a height of 9 m and a diameter of 1.5 m, warm water at 46° C. was sprayed from a side spray nozzle which was attached to an upper part of an inner wall of the container, and thus the warm water was allowed to flow downward along an inner wall surface; and (2) during the above process (1), a 25% aqueous calcium acetate solution was dispersed, as fine droplets of 100 microns or smaller, inside the container from an internal mixing type two-fluid nozzle having a pore diameter of 2.0 mm by moisture vapor at pressure of 0.6 Kg/cm²G. A temperature of the flocculative atmosphere inside the container was 60° C., and pressure of the flocculative atmosphere (pressure inside the container) was atmospheric pressure. The "inside of the container in which a flocculative atmosphere is formed" can also be said as "inside of a flocculation chamber". The aqueous latex (L-A2) was sprayed at spraying pressure of 7.3 Kg/cm²G with use of eight nozzles each of which is a hollow cone nozzle that is one type of pressurization nozzles and has a pore diameter of 2.0 mm. That is, gas phase flocculation was carried out in Example 3. Next, the slurry was subjected to centrifugal dehydration to obtain wet powder, which is the foregoing agglutinate. Two cycles in total of the operation of introducing the obtained wet powder into 500 parts by weight of ion exchanged water and the operation of subjecting the obtained mixture to centrifugal dehydration were carried out to obtain wet powder. A water content of the wet powder was 55%. Lastly, dry air at 50° C. was blown so as to allow the wet powder to float, and thus the wet powder was dried until a temperature of the wet powder reached 40° C. That is, airflow drying was carried out in Example 3. The dried powdery and/or granular material was sieved with use of a sieve with 32-mesh, and thus a powdery and/or granular material containing the fine polymer particles (A) and the resin (B) was obtained. The anti-blocking property of the obtained powdery and/or granular material was evaluated as "acceptable". The volume-average particle size of the obtained powdery and/or granular material measured was not more than 10 mm.

<Component>

Components used in Production Examples B, Examples B, and Comparative Examples B are as follows:

Fine Polymer Particles (A)

Fine polymer particles (A) obtained in Production Examples B described below were used.

Resin (B)

Mixtures identical with those used in Examples A were used.

Matrix Resin (C)

Bisphenol A epoxy resin was used, as with Examples A.

<Evaluation Methods>

First, the following description will discuss methods of evaluating resin compositions produced in Examples B and Comparative Examples B.

(Measurement of Volume-Average Particle Size)

The volume-average particle size (Mv) of an elastic body or fine polymer particles (A) dispersed in an aqueous latex was measured with use of test specimens prepared with a device and a method which are identical with those of Examples A. When the measurement was made, the refractive index of water and the refractive index of the elastic body or the fine polymer particles (A) obtained in each of Production Examples B were inputted, a measurement time

| | | Ex A1 | Ex A2 | Com Ex A1 | Com Ex A2 | Com Ex A3 | Com Ex A4 | Com Ex A5 | Ex A3 |
|---|---|---|---|---|---|---|---|---|---|
| Amount of resin (B) relative to 100 parts by weight of fine polymer particles (A) | Parts by weight | 11.1 | 11.1 | 11.1 | 11.1 | — | — | 11.1 | 11.1 |
| Agglutination method | — | Gas phase flocculation | Gas phase flocculation | Gas phase flocculation | Liquid phase flocculation | Liquid phase flocculation | Gas phase flocculation | Gas phase flocculation | Gas phase flocculation |
| Drying method | — | Airflow drying | Airflow drying | Stationary drying | Stationary drying | Stationary drying | Airflow drying | Airflow drying | Airflow drying |
| Drying temperature | ° C. | 50° C. | 110° C. | 50° C. | 50° C. | 50° C. | 50° C. | 50° C. | 50° C. |
| Total volume of pores having average pore diameter of 0.03 μm to 4.5 μm | (mL/g) | 0.1390 | 0.1013 | 0.1096 | 0.1042 | 0.0974 | 0.3300 | 0.1635 | 0.2013 |
| Total volume of pores having average pore diameter of 0.03 μm to 1.0 μm | (mL/g) | 0.1140 | 0.0722 | 0.0479 | 0.0460 | 0.0580 | 0.2629 | 0.1292 | 0.0810 |
| Granules having volume-average particle size of not less tnan 1000 μm with respect to 100% by weight of powdery and/or granular material | % | 0 | 0 | 0 | 3.23 | 4.25 | 0 | 5.45 | 0 |
| Granules having volume-average particle size of not less than 800 μm with respect to 100% by weight of powdery and/or granular material | % | 1.19 | 2.08 | 2.16 | 6.26 | 7.35 | 0 | 22.74 | 0 |
| Dispersibility | Minutes | 40 | 150 | 170 | 170 | 330 | 160 | 180 | 30 |

Example B

The following description will discuss Embodiment 2 of the present invention in detail with reference to Examples B and Comparative Examples B. Note that one or more embodiments of the present invention are not limited to these examples. One or more embodiments of the present invention can be altered as appropriate within the scope of the gist disclosed herein. One or more embodiments of the present invention also include, in their technical scope, embodiments achieved by altering the embodiments. Note that, in the following Examples B and Comparative Examples B, "parts" means "parts by weight", and "%" means "% by weight".

was set to 120 seconds, and the concentration of the test specimen was adjusted such that a load index fell within the range of 1 to 10. The volume-average particle size (Mv) of the powdery and/or granular material was measured with use of a device identical with that used in Examples A.

(Measurement of Volume-Average Particle Size and Contained Amount of Aqueous Latex (B) or Droplets in Mixture Solution)

The volume-average particle size and the contained amount of the aqueous latex (B) containing the resin (B) or of the droplets in the mixture solution containing the fine polymer particles (A) and the resin (B) were measured by a laser diffraction particle size distribution analyzer while using the aqueous latex (B) or the mixture solution as a test specimen. As the laser diffraction particle size distribution analyzer, Microtrac MT3000II (manufactured by Microtrac-BEL Corp.) was used.

(Differential Scanning Calorimetry (DSC) of Resin (B))

Measurement was carried out with respect to the used resin (B) with use of a device and conditions which were identical with those in Examples A. As a result, a DSC thermogram of the resin (B) indicated an endothermic peak at −16.9° C., as with Examples A.

(Measurement of Viscosity of Resin (B))

A viscosity of the used resin (B) was measured with use of a device and conditions which are identical with those in Examples A. As a result, the viscosity of the resin (B) was 11,000 mPa·s, as with Examples A.

(Anti-Blocking Property of Powdery and/or Granular Material)

With use of powdery and/or granular materials obtained in Examples B and Comparative Examples B, blocks of the powdery and/or granular materials were prepared by a method identical with that of Examples A. Next, a force required to break the obtained block of the powdery and/or granular material was measured using a rheometer. The anti-blocking property was evaluated on the basis of the obtained result with reference to the following criteria.

Acceptable: A force required to break the block of the powdery and/or granular material is not more than 30000 Pa.

Unacceptable: A force required to break the block of the powdery and/or granular material is more than 30000 Pa.

(Dispersibility of Resin Composition)

Powdery and/or granular materials obtained in Examples B and Comparative Examples B were each prepared in an amount of 15 parts by weight (15 g), and bisphenol A epoxy resin, which was the matrix resin (C), was prepared in an amount of 85 parts by weight (85 g). The prepared powdery and/or granular material and the bisphenol A epoxy resin were introduced into a container having a capacity of 200 mL, and mixed to obtain a resin composition. The capacity of the container was approximately twice as large as the volume of the prepared powdery and/or granular material and bisphenol A epoxy resin. The obtained resin composition was mixed with use of a disper mixer (manufactured by PRIMIX Corporation) having a blade diameter (Φ) of 32 mm at a rotation speed of 3000 rpm. A resin composition was placed on a grindometer (grind gage), the resin composition on the gauge was scraped with use of a metal scraper, and the state of dispersion was visually checked. The point on the scale of the grindometer, at which there were five to ten particles (which had the average particle size of not less than 10 μm and became apparent by the scraping) within a range 3 mm in width, was read. A stirring time taken from when stirring was started to when the scale indicated 0 μm, i.e., a stirring time until favorable dispersibility was achieved was measured. The results are shown in Table 2.

1. Preparation of Elastic Body

Production Example B

Production Example B1-1: Preparation of Polystyrene-Butadiene Rubber Latex (R-B1)

Into a pressure-resistant polymerization apparatus were introduced 160 parts by weight of deionized water, 0.002 parts by weight of disodium ethylenediaminetetraacetate (EDTA), 0.001 parts by weight of ferrous sulfate heptahydrate, 0.02 parts by weight of polyoxyethylene lauryl ether phosphate, and 0.003 parts by weight of sodium hydroxide. In so doing, the polyoxyethylene lauryl ether phosphate turned into sodium polyoxyethylene lauryl ether phosphate in the presence of the sodium hydroxide, and functioned as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. After that, 76.5 parts by weight of butadiene (Bd) and 23.5 parts by weight of styrene (St) were introduced into the pressure-resistant polymerization apparatus, and the temperature inside the pressure-resistant polymerization apparatus was raised to 45° C. After that, 0.03 parts by weight of paramenthane hydroperoxide (PHP) was introduced into the pressure-resistant polymerization apparatus, and then 0.05 parts by weight of sodium formaldehyde sulfoxylate (SFS) was introduced into the pressure-resistant polymerization apparatus. Polymerization was then started. At the time 20 hours had elapsed from the start of the polymerization, residual monomers not used in the polymerization were removed by devolatilization under reduced pressure, and thereby the polymerization was ended. During the polymerization, PHP, polyoxyethylene lauryl ether phosphate, and sodium hydroxide were each added to the pressure-resistant polymerization apparatus in discretionarily selected amounts and discretionarily selected points in time. By the polymerization, an aqueous latex (R-B1), which contained an elastic body (core layer) containing polystyrene-butadiene rubber as a main component, was obtained. The volume-average particle size of the elastic body (core layer) contained in the obtained aqueous latex was 240 nm.

Production Example B1-2: Preparation of Polystyrene-Butadiene Rubber Latex (R-B2)

Into a pressure-resistant polymerization apparatus were introduced 160 parts by weight of deionized water, 0.002 parts by weight of EDTA, 0.001 parts by weight of ferrous sulfate heptahydrate, 0.05 parts by weight of polyoxyethylene lauryl ether phosphate, and 0.003 parts by weight of sodium hydroxide. In so doing, the polyoxyethylene lauryl ether phosphate turned into sodium polyoxyethylene lauryl ether phosphate in the presence of the sodium hydroxide, and functioned as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. After that, 76.5 parts by weight of Bd and 23.5 parts by weight of St were introduced into the pressure-resistant polymerization apparatus, and the temperature inside the pressure-resistant polymerization apparatus was raised to 45° C. After that, 0.03 parts by weight of PHP was introduced into the pressure-resistant polymerization apparatus, and then 0.05 parts by weight of SFS was introduced into the pressure-resistant polymerization apparatus. Polymerization was then started. At the time 25 hours had elapsed from the start of the polymerization, residual monomers not used in the polymerization were removed by devolatilization under reduced pressure, and thereby the polymerization was ended. During the polymerization, PHP, polyoxyethylene lauryl ether phosphate, and sodium hydroxide were each added to the pressure-resistant polymerization apparatus in discretionarily selected amounts and discretionarily selected points in time.

By the polymerization, an aqueous latex (R-B2), which contained an elastic body (core layer) containing polystyrene-butadiene rubber as a main component, was obtained. The volume-average particle size of the elastic body (core layer) contained in the obtained aqueous latex was 170 nm.

Production Example B1-3: Preparation of Polystyrene-Butadiene Rubber Latex (R-B3)

Into a pressure-resistant polymerization apparatus were introduced 160 parts by weight of deionized water, 0.002 parts by weight of EDTA, 0.001 parts by weight of ferrous sulfate heptahydrate, 0.07 parts by weight of polyoxyethylene lauryl ether phosphate, and 0.003 parts by weight of sodium hydroxide. In so doing, the polyoxyethylene lauryl ether phosphate turned into sodium polyoxyethylene lauryl ether phosphate in the presence of the sodium hydroxide, and functioned as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. After that, 76.5 parts by weight of Bd and 23.5 parts by weight of St were introduced into the pressure-resistant polymerization apparatus, and the temperature inside the pressure-resistant polymerization apparatus was raised to 45° C. After that, 0.03 parts by weight of PHP was introduced into the pressure-resistant polymerization apparatus, and then 0.05 parts by weight of SFS was introduced into the pressure-resistant polymerization apparatus. Polymerization was then started. At the time 25 hours had elapsed from the start of the polymerization, residual monomers not used in the polymerization were removed by devolatilization under reduced pressure, and thereby the polymerization was ended. During the polymerization, PHP, polyoxyethylene lauryl ether phosphate, and sodium hydroxide were each added to the pressure-resistant polymerization apparatus in discretionarily selected amounts and discretionarily selected points in time. By the polymerization, an aqueous latex (R-B3), which contained an elastic body (core layer) containing polystyrene-butadiene rubber as a main component, was obtained. The volume-average particle size of the elastic body (core layer) contained in the obtained aqueous latex was 150 nm.

Production Example B1-4: Preparation of Polystyrene-Butadiene Rubber Latex (R-B4)

Into a pressure-resistant polymerization apparatus were introduced 200 parts by weight of deionized water, 0.03 parts by weight of tripotassium phosphate, 0.002 parts by weight of EDTA, 0.001 parts by weight of ferrous sulfate heptahydrate, and 1.5 parts by weight of sodium dodecylbenzenesulfonate (SDBS) as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. After that, 76.5 parts by weight of Bd and 23.5 parts by weight of St were introduced into the pressure-resistant polymerization apparatus, and the temperature inside the pressure-resistant polymerization apparatus was raised to 45° C. After that, 0.03 parts by weight of PHP was introduced into the pressure-resistant polymerization apparatus, and then 0.10 parts by weight of SFS was introduced into the pressure-resistant polymerization apparatus. Polymerization was then started. At the time 13 hours had elapsed from the start of the polymerization, residual monomers not used in the polymerization were removed by devolatilization under reduced pressure, and thereby the polymerization was ended. During the polymerization, PHP, EDTA, and ferrous sulfate heptahydrate were each added to the pressure-resistant polymerization apparatus in discretionarily selected amounts and discretionarily selected points in time. By the polymerization, an aqueous latex (R-B4), which contained an elastic body (core layer) containing polystyrene-butadiene rubber as a main component, was obtained. The volume-average particle size of the elastic body (core layer) contained in the obtained aqueous latex was 80 nm.

Production Example B1-5: Preparation of Polybutadiene Rubber Latex (R-B5)

Into a pressure-resistant polymerization apparatus were introduced 200 parts by weight of deionized water, 0.03 parts by weight of tripotassium phosphate, 0.002 parts by weight of EDTA, 0.001 parts by weight of ferrous sulfate heptahydrate, and 1.55 parts by weight of sodium dodecylbenzenesulfonate (SDBS) as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. After that, 100 parts by weight of Bd was introduced into the pressure-resistant polymerization apparatus, and the temperature inside the pressure-resistant polymerization apparatus was raised to 45° C. After that, 0.03 parts by weight of PHP was introduced into the pressure-resistant polymerization apparatus, and then 0.10 parts by weight of SFS was introduced into the pressure-resistant polymerization apparatus. Polymerization was then started. At the time 15 hours had elapsed from the start of the polymerization, residual monomers not used in the polymerization were removed by devolatilization under reduced pressure, and thereby the polymerization was ended. During the polymerization, PHP, EDTA, and ferrous sulfate heptahydrate were each added to the pressure-resistant polymerization apparatus in discretionarily selected amounts and discretionarily selected points in time. By the polymerization, an aqueous latex (R-B5), which contained an elastic body containing polybutadiene rubber as a main component, was obtained. The volume-average particle size of the elastic body contained in the obtained aqueous latex was 90 nm.

Production Example B1-6: Preparation of Polybutadiene Rubber Latex (R-B6)

Into a pressure-resistant polymerization apparatus were introduced an aqueous latex (R-B5) of polybutadiene rubber in an amount corresponding to 7 parts by weight of an elastic body containing polybutadiene rubber as a main component, 200 parts by weight of deionized water, 0.03 parts by weight of tripotassium phosphate, 0.002 parts by weight of EDTA, and 0.001 parts by weight of ferrous sulfate heptahydrate. Next, while the materials thus introduced were stirred, gas in the pressure-resistant polymerization apparatus was replaced with nitrogen, so as to sufficiently remove oxygen from the inside of the pressure-resistant polymerization apparatus. After that, 93 parts by weight of Bd was introduced into the pressure-resistant polymerization apparatus, and the temperature inside the pressure-resistant polymerization apparatus was raised to 45° C. After that, 0.02 parts by weight of PHP was introduced into the pressure-resistant polymerization apparatus, and then 0.10 parts by weight of SFS was introduced into the pressure-resistant polymerization apparatus. Polymerization was then started. At the time 30 hours had elapsed from the start of the polymerization, residual monomers not used in the polymerization were removed by devolatilization under reduced pressure, and thereby the polymerization was ended. During the polymerization, PHP, EDTA, and ferrous sulfate heptahydrate were each added to the pressure-resistant polymerization apparatus in discretionarily selected amounts and discretionarily selected points in time. By the polymerization, an aqueous latex (R-B6), which contained an elastic body (core layer) containing polybutadiene rubber as a main component, was obtained. The volume-average particle size of the elastic body (core layer) contained in the obtained aqueous latex was 195 nm.

2. Preparation of Fine Polymer Particles (A) (Formation of Graft Part by Polymerization)

Production Example B2-1: Preparation of Fine Polymer Particle Latex (L-B1)

Into a glass reaction vessel were introduced 201 parts by weight of the aqueous latex (the polystyrene-butadiene rubber latex) (R-B1) containing an elastic body (core layer) (including 70 parts by weight of the elastic body containing polystyrene-butadiene rubber as a main component) and 73 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. After that, a mixture of 28.5 parts by weight of methyl methacrylate (MMA), 1.5 parts by weight of butyl acrylate, and 0.1 parts by weight of t-butyl hydroperoxide (BHP) was added continuously to the glass reaction vessel over 80 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-B1) containing the fine polymer particles (A). 99% or more of the monomer component had been polymerized. The volume-average particle size of the fine polymer particles (A) contained in the obtained aqueous latex was 240 nm. The solid concentration (concentration of the fine polymer particles (A)) in the obtained aqueous latex (L-B1) was 30%.

Production Example B2-2: Preparation of Fine Polymer Particle Latex (L-B2)

A method identical with that of Production Example B2-1 was carried out, except that the aqueous latex (R-B2) containing the elastic body (core layer) was used instead of the aqueous latex (R-B1) containing the elastic body (core layer). In this way, an aqueous latex (L-B2) containing the fine polymer particles (A) was obtained. 99% or more of the monomer component had been polymerized. The volume-average particle size of the fine polymer particles (A) contained in the obtained aqueous latex was 170 nm. The solid concentration (concentration of the fine polymer particles (A)) in the obtained aqueous latex (L-B2) was 30%.

Production Example B2-3: Preparation of Fine Polymer Particle Latex (L-B3))

A method identical with that of Production Example B2-1 was carried out, except that the aqueous latex (R-B3)

containing the elastic body (core layer) was used instead of the aqueous latex (R-B1) containing the elastic body (core layer). In this way, an aqueous latex (L-B3) containing the fine polymer particles (A) was obtained. 99% or more of the monomer component had been polymerized. The volume-average particle size of the fine polymer particles (A) contained in the obtained aqueous latex was 150 nm. The solid concentration (concentration of the fine polymer particles (A)) in the obtained aqueous latex (L-B3) was 30%.

Production Example B2-4: Preparation of Fine Polymer Particle Latex (L-B4)

A method identical with that of Production Example B2-1 was carried out, except that the aqueous latex (R-B4) containing the elastic body (core layer) was used instead of the aqueous latex (R-B1) containing the elastic body (core layer). In this way, an aqueous latex (L-B4) containing the fine polymer particles (A) was obtained. 99% or more of the monomer component had been polymerized. The volume-average particle size of the fine polymer particles (A) contained in the obtained aqueous latex was 80 nm. The solid concentration (concentration of the fine polymer particles (A)) in the obtained aqueous latex (L-B4) was 30%.

Production Example B2-5: Preparation of Aqueous Latex (L-B5) Containing Fine Polymer Particles (A)

Into a glass reaction vessel were introduced 215 parts by weight of the aqueous latex (R-B6) of polybutadiene rubber (including 71 parts by weight of the elastic body containing polybutadiene rubber as a main component) and 82 parts by weight of deionized water. The glass reaction vessel had a thermometer, a stirrer, a reflux condenser, a nitrogen inlet, and a monomer adding device. While gas in the glass reaction vessel was replaced with nitrogen, the materials thus introduced were stirred at 60° C. Next, 2.6 parts by weight of 1,3-butylene glycol dimethacrylate and 0.07 parts by weight of BHP were added to the glass reaction vessel, and the resultant mixture was stirred for 10 minutes. Next, 0.004 parts by weight of EDTA, 0.001 parts by weight of ferrous sulfate heptahydrate, and 0.13 parts by weight of SFS were added to the glass reaction vessel, and the resultant mixture in the glass reaction vessel was stirred for 30 minutes. Next, 0.013 parts by weight of BHP was added to the glass reaction vessel, and the resultant mixture was stirred for another 30 minutes. Next, a mixture of 22 parts by weight of MMA, 7 parts by weight of St, and 0.085 parts by weight of BHP was continuously added to the glass reaction vessel over 70 minutes. Then, 0.013 parts by weight of BHP was added to the glass reaction vessel, and the resultant mixture in the glass reaction vessel was stirred for another hour so as to finish polymerization. Through the above operations was obtained an aqueous latex (L-B5) containing the fine polymer particles (A). 99% or more of the monomer component had been polymerized. The volume-average particle size of the fine polymer particles (A) contained in the obtained aqueous latex was 200 nm.

3. Preparation of Powdery and/or Granular Material

Example B1 (Production Example B3-1)

The aqueous latex (B) preparation step was carried out as follows: That is, water, 100 parts by weight of the resin (B), and 6.5 parts by weight of sodium polyoxyethylene lauryl ether phosphate which is an emulsifying agent were mixed to obtain a mixture. Next, the obtained mixture was stirred for 5 minutes with use of a homogenizer at 10000 rpm. By the aqueous latex (B) preparation step, an aqueous latex (S-B1) was obtained which was an aqueous latex (B) containing the resin (B), i.e., an aqueous latex (B) containing droplets (B) containing one or more pieces of the resin (B). A contained amount of the resin (B) was 50% by weight, with respect to 100% by weight of the aqueous latex (S-B1). A volume-average particle size (particle size distribution) of droplets in the aqueous latex (S-B1), which is the aqueous latex (B), was measured by the foregoing method while using the aqueous latex (S-B1) as a test specimen. As a result, the droplets in the aqueous latex (S-B1) had the volume-average particle size of 11.17 μm and the standard deviation of 8.18 μm. Therefore, x−σ was 2.99, and x+5σ was 52.07.

325 parts by weight of the aqueous latex (L-B1) (equivalent to 100 parts by weight of the fine polymer particles (A)) and 22.2 parts by weight of the aqueous latex (S-B1) (equivalent to 11.1 parts by weight of the resin (B)) were mixed together. By this mixing step, a mixture solution containing the fine polymer particles (A) and the resin (B) was obtained. A volume-average particle size and a contained amount (particle size distribution) of droplets in the mixture solution were measured by the foregoing method while using the obtained mixture solution as a test specimen. As a result, the amount of droplets having the volume-average particle size of not less than 2.99 and not more than 52.07 was not more than the detection limit, with respect to 100% by weight of the resin (B) in the mixture solution. In the present specification, results of not more than the detection limit are indicated as N.D. (abbreviation of "not detected").

Next, the preparation step was carried out as follows: First, 600 parts by weight of ion exchanged water having 4 parts by weight of calcium acetate dissolved therein and having its temperature controlled to 70° C. was prepared. Next, 347.2 parts by weight of the mixture solution obtained in the mixing step was introduced into 600 parts by weight of the ion exchanged water, and slurry containing an agglutinate containing the fine polymer particles (A) and the resin (B) was obtained. Next, the slurry was subjected to centrifugal dehydration to obtain wet powder, which is the foregoing agglutinate. Two cycles in total of the operation of introducing the obtained wet powder into 500 parts by weight of ion exchanged water and the operation of subjecting the obtained mixture to centrifugal dehydration were carried out to obtain wet powder. Lastly, the wet powder was dried in a dryer at 50° C. for 48 hours. In this way, a powdery and/or granular material containing the fine polymer particles (A) and the resin (B) was obtained. The anti-blocking property of the obtained powdery and/or granular material was evaluated as "acceptable". The volume-average particle size of the obtained powdery and/or granular material measured was not more than 10 mm.

Comparative Example B1 (Production Example B3-2)

The aqueous latex (B) preparation step was carried out as follows: That is, water, 100 parts by weight of the resin (B), and 24.0 parts by weight of sodium polyoxyethylene lauryl ether phosphate which is an emulsifying agent were mixed to obtain a mixture. Next, the obtained mixture was stirred for 5 minutes with use of a homogenizer at 10000 rpm. By the aqueous latex (B) preparation step, an aqueous latex (S-B2) was obtained which was an aqueous latex (B) containing the resin (B), i.e., an aqueous latex (B) containing droplets (B) containing one or more pieces of the resin (B). A contained amount of the resin (B) was 50% by weight, with respect to 100% by weight of the aqueous latex (S-B2). A volume-average particle size (particle size distribution) of droplets in the aqueous latex (S-B2), which is the aqueous latex (B), was measured by the foregoing method while using the aqueous latex (S-B2) as a test specimen. As a result, the droplets in the aqueous latex (S-B2) had the volume-average particle size of 1.46 μm and the standard deviation of 0.6 μm. Therefore, x−σ was 0.86, and x+5σ was 4.46.

325 parts by weight of the aqueous latex (L-B1) (equivalent to 100 parts by weight of the fine polymer particles (A)) and 22.2 parts by weight of the aqueous latex (S-B2) (equivalent to 11.1 parts by weight of the resin (B)) were mixed together. By this mixing step, a mixture solution containing the fine polymer particles (A) and the resin (B) was obtained. A volume-average particle size and a contained amount (particle size distribution) of droplets in the mixture solution were measured by the foregoing method while using the obtained mixture solution as a test specimen. As a result, the amount of droplets having the volume-average particle size of not less than 0.86 and not more than 4.46 was 14.8% by weight, with respect to 100% by weight of the resin (B) in the mixture solution. The results are shown in Table 2.

Next, with use of the mixture solution obtained in the mixing step, the preparation step was carried out by a method identical with that of Production Example B3-1, and thus a powdery and/or granular material was obtained.

Example B2 (Production Example B3-3)

The aqueous latex (B) preparation step was carried out as follows: That is, water, 100 parts by weight of the resin (B), and 13.0 parts by weight of sodium polyoxyethylene lauryl ether phosphate which is an emulsifying agent were mixed to obtain a mixture. Next, the obtained mixture was stirred for 5 minutes with use of a homogenizer at 10000 rpm. By the aqueous latex (B) preparation step, an aqueous latex (S-B3) was obtained which was an aqueous latex (B) containing the resin (B), i.e., an aqueous latex (B) containing droplets (B) containing one or more pieces of the resin (B). A contained amount of the resin (B) was 50% by weight, with respect to 100% by weight of the aqueous latex (S-B3). A volume-average particle size (particle size distribution) of droplets in the aqueous latex (S-B3), which is the aqueous latex (B), was measured by the foregoing method while using the aqueous latex (S-B3) as a test specimen. As a result, the droplets in the aqueous latex (S-B3) had the volume-average particle size of 5.96 μm and the standard deviation of 5.12 μm. Therefore, x−σ was 0.84, and x+5σ was 31.56.

325 parts by weight of the aqueous latex (L-B1) (equivalent to 100 parts by weight of the fine polymer particles (A)) and 22.2 parts by weight of the aqueous latex (S-B3) (equivalent to 11.1 parts by weight of the resin (B)) were mixed together. By this mixing step, a mixture solution containing the fine polymer particles (A) and the resin (B) was obtained. A volume-average particle size and a contained amount (particle size distribution) of droplets in the mixture solution were measured by the foregoing method while using the obtained mixture solution as a test specimen. As a result, the amount of droplets having the volume-average particle size of not less than 0.84 and not more than 31.56 was 4.9% by weight, with respect to 100% by weight of the resin (B) in the mixture solution. The results are shown in Table 2.

Next, with use of the mixture solution obtained in the mixing step, the preparation step was carried out by a method identical with that of Production Example B3-1, and thus a powdery and/or granular material was obtained. The anti-blocking property of the obtained powdery and/or granular material was evaluated as "acceptable". The volume-average particle size of the obtained powdery and/or granular material measured was not more than 10 mm.

Comparative Example B2 (Production Example B3-4) The aqueous latex (B) preparation step was carried out as follows: That is, water, 100 parts by weight of the resin (B), and 6.5 parts by weight of sodium polyoxyethylene lauryl ether phosphate which is an emulsifying agent were mixed to obtain a mixture. Next, the obtained mixture was stirred for 5 minutes with use of a homogenizer at 3000 rpm. By the aqueous latex (B) preparation step, an aqueous latex (S-B4) was obtained which was an aqueous latex (B) containing the resin (B), i.e., an aqueous latex (B) containing droplets (B) containing one or more pieces of the resin (B). A contained amount of the resin (B) was 50% by weight, with respect to 100% by weight of the aqueous latex (S-B4). A volume-average particle size (particle size distribution) of droplets in the aqueous latex (S-B4), which is the aqueous latex (B), was measured by the foregoing method while using the aqueous latex (S-B4) as a test specimen. As a result, the droplets in the aqueous latex (S-B4) had the volume-average particle size of 68.72 μm and the standard deviation of 36.54 μm. Therefore, x−σ was 32.18, and x+5σ was 251.42.

325 parts by weight of the aqueous latex (L-B1) (equivalent to 100 parts by weight of the fine polymer particles (A)) and 22.2 parts by weight of the aqueous latex (S-B4) (equivalent to 11.1 parts by weight of the resin (B)) were mixed together. By this mixing step, a mixture solution containing the fine polymer particles (A) and the resin (B) was obtained. A volume-average particle size and a contained amount (particle size distribution) of droplets in the mixture solution were measured by the foregoing method while using the obtained mixture solution as a test specimen. As a result, the amount of droplets having the volume-average particle size of not less than 32.18 and not more than 251.42 was 100.0% by weight, with respect to 100% by weight of the resin (B) in the mixture solution. The results are shown in Table 2.

Next, with use of the mixture solution obtained in the mixing step, the preparation step was carried out by a method identical with that of Production Example B3-1, and thus a powdery and/or granular material was obtained.

Example B3 (Production Example B3-5)

A mixing step including the aqueous latex (B) preparation step was carried out by a method identical with that described in Production Example B3-1, except that the aqueous latex (L-B2) containing the fine polymer particles (A) was used instead of the aqueous latex (L-B1) containing the fine polymer particles (A). By this mixing step, a mixture solution containing the fine polymer particles (A) and the resin (B) was obtained. A volume-average particle size and a contained amount (particle size distribution) of droplets in the mixture solution were measured by the foregoing method while using the obtained mixture solution as a test specimen. As a result, the amount of droplets having the volume-average particle size of not less than 2.99 and not more than 52.07 was not more than the detection limit, with respect to 100% by weight of the resin (B) in the mixture solution. The results are shown in Table 2. Next, with use of the mixture solution obtained in the mixing step, the preparation step was carried out by a method identical with that of Production Example B3-1, and thus a powdery and/or granular material was obtained. The anti-blocking property of the obtained powdery and/or granular material was evaluated as "acceptable". The volume-average particle size of the obtained powdery and/or granular material measured was not more than 10 mm.

Example B4 (Production Example B3-6)

A mixing step including the aqueous latex (B) preparation step was carried out by a method identical with that described in Production Example B3-2, except that the aqueous latex (L-B2) containing the fine polymer particles (A) was used instead of the aqueous latex (L-B1) containing the fine polymer particles (A). By this mixing step, a mixture solution containing the fine polymer particles (A) and the resin (B) was obtained. A volume-average particle size and a contained amount (particle size distribution) of droplets in the mixture solution were measured by the foregoing method while using the obtained mixture solution as a test specimen. As a result, the amount of droplets having the volume-average particle size of not less than 0.86 and not more than 4.46 was not more than the detection limit, with respect to 100% by weight of the resin (B) in the mixture solution. The results are shown in Table 2. Next, with use of the mixture solution obtained in the mixing step, the preparation step was carried out by a method identical with that of Production Example B3-1, and thus a powdery and/or granular material was obtained. The anti-blocking property of the obtained powdery and/or granular material was evaluated as "acceptable". The volume-average particle size of the obtained powdery and/or granular material measured was not more than 10 mm.

Example B5 (Production Example B3-7)

A mixing step including the aqueous latex (B) preparation step was carried out by a method identical with that described in Production Example B3-1, except that the aqueous latex (L-B3) containing the fine polymer particles (A) was used instead of the aqueous latex (L-B1) containing the fine polymer particles (A). By this mixing step, a mixture solution containing the fine polymer particles (A) and the resin (B) was obtained. A volume-average particle size and a contained amount (particle size distribution) of droplets in the mixture solution were measured by the foregoing method while using the obtained mixture solution as a test specimen. As a result, the amount of droplets having the volume-average particle size of not less than 2.99 and not more than 52.07 was not more than the detection limit, with respect to 100% by weight of the resin (B) in the mixture solution. The results are shown in Table 2. Next, with use of the mixture solution obtained in the mixing step, the preparation step was carried out by a method identical with that of Production Example B3-1, and thus a powdery and/or granular material was obtained. The anti-blocking property of the obtained powdery and/or granular material was evaluated as "acceptable". The volume-average particle size of the obtained powdery and/or granular material measured was not more than 10 mm.

Example B6 (Production Example B3-8)

A mixing step including the aqueous latex (B) preparation step was carried out by a method identical with that described in Production Example B3-1, except that the aqueous latex (L-B4) containing the fine polymer particles (A) was used instead of the aqueous latex (L-B1) containing the fine polymer particles (A). By this mixing step, a mixture solution containing the fine polymer particles (A) and the resin (B) was obtained. A volume-average particle size and a contained amount (particle size distribution) of droplets in the mixture solution were measured by the foregoing method while using the obtained mixture solution as a test specimen. As a result, the amount of droplets having the volume-average particle size of not less than 2.99 and not more than 52.07 was not more than the detection limit, with respect to 100% by weight of the resin (B) in the mixture solution. The results are shown in Table 2. Next, with use of the mixture solution obtained in the mixing step, the preparation step was carried out by a method identical with that of Production Example B3-1, and thus a powdery and/or granular material was obtained. The anti-blocking property of the obtained powdery and/or granular material was evaluated as "acceptable". The volume-average particle size of the obtained powdery and/or granular material measured was not more than 10 mm.

Example B7 (Production Example B3-9)

The aqueous latex (B) preparation step was carried out as follows: That is, water, the resin (B), and SDBS which is an emulsifying agent were mixed to obtain a mixture. Next, the obtained mixture was stirred (mixed) with use of a homogenizer. By the aqueous latex (B) preparation step, an aqueous latex (S-B5) was obtained which was an aqueous latex (B) containing the resin (B), i.e., an aqueous latex (B) containing droplets (B) containing one or more pieces of the resin (B). A contained amount of the resin (B) was 50% by weight, with respect to 100% by weight of the aqueous latex (S-B5). A volume-average particle size (particle size distribution) of droplets in the aqueous latex (S-B5), which is the aqueous latex (B), was measured by the foregoing method while using the aqueous latex (S-B5) as a test specimen. As a result, the droplets in the aqueous latex (S-B5) had the volume-average particle size of 5.60 μm and the standard deviation of 5.21 μm. Therefore, x−σ was 0.39, and x+5σ was 31.65.

325 parts by weight of the aqueous latex (L-B5) (equivalent to 100 parts by weight of the fine polymer particles (A)) and 22.2 parts by weight of the aqueous latex (S-B5) (equivalent to 11.1 parts by weight of the resin (B)) were mixed together. By this mixing step, an aqueous latex (L-B6), which is the mixture solution containing the fine polymer particles (A) and the resin (B), was prepared. A volume-average particle size and a contained amount (particle size distribution) of droplets in the mixture solution were measured by the foregoing method while using the mixture solution (aqueous latex (L-B6)) as a test specimen. As a result, the amount of droplets having the volume-average particle size of not less than 0.39 and not more than 31.65 was not more than the detection limit, with respect to 100% by weight of the resin (B) in the mixture solution (aqueous latex (L-B6)). The aqueous latex (L-B6) was sprayed into a container in which a flocculative atmosphere was formed (i.e., into a flocculation chamber), and thus slurry containing an agglutinate containing the fine polymer particles (A) and the resin (B) was obtained. The flocculative atmosphere inside the container was formed as follows: (1) inside a cylindrical container having a height of 9 m and a diameter of 1.5 m, warm water at 46° C. was sprayed from a side spray nozzle which was attached to an upper part of an inner wall of the container, and thus the warm water was allowed to flow downward along an inner wall surface; and (2) during the above process (1), a 25% aqueous calcium acetate solution was dispersed, as fine droplets of 100 microns or smaller, inside the container from an internal mixing type two-fluid nozzle having a pore diameter of 2.0 mm by moisture vapor at pressure of 0.6 Kg/cm²G. A temperature of the flocculative atmosphere inside the container was 60° C., and pressure of the flocculative atmosphere (pressure inside the container) was atmospheric pressure. The "inside of the container in which a flocculative atmosphere is formed" can also be said as "inside of a flocculation chamber". The aqueous latex (L-A2) was sprayed at spraying pressure of 7.3 Kg/cm²G with use of eight nozzles each of which is a hollow cone nozzle that is one type of pressurization nozzles and has a pore diameter of 2.0 mm. That is, gas phase flocculation was carried out in Example B7. Next, the slurry was subjected to centrifugal dehydration to obtain wet powder, which is the foregoing agglutinate. Two cycles in total of the operation of introducing the obtained wet powder into 500 parts by weight of ion exchanged water and the operation of subjecting the obtained mixture to centrifugal dehydration were carried out to obtain wet powder. A water content of the wet powder was 55%. Lastly, dry air at 50° C. was blown so as to allow the wet powder to float, and thus the wet powder was dried until a temperature of the wet powder reached 40° C. That is, airflow drying was carried out in Example B7. The dried powdery and/or granular material was sieved with use of a sieve with 32-mesh, and thus a powdery and/or granular material containing the fine polymer particles (A) and the resin (B) was obtained. The anti-blocking property of the obtained powdery and/or granular material was evaluated as "acceptable". The volume-average particle size of the obtained powdery and/or granular material measured was not more than 10 mm.

TABLE 2

| | Contained amount of droplets having volume-average particle size of not less than x − σ and not more than x + 5σ with respect to 100% by weight of resin (B) in mixture solution (% by weight) | Dispersibility (minutes) |
|---|---|---|
| Ex B1 | N.D. | 60 |
| Com Ex B1 | 14.8 | 150 |
| Ex B2 | 4.9 | 80 |
| Com Ex B2 | 100.0 | 100 |
| Ex B3 | N.D. | 40 |
| Ex B4 | N.D. | 40 |
| Ex B5 | N.D. | 40 |
| Ex B6 | N.D. | 80 |
| Ex B7 | N.D. | 30 |

According to one or more embodiments of the present invention, it is possible to provide the powdery and/or granular material which achieves excellent dispersibility of fine polymer particles in a matrix resin. Therefore, one or more embodiments of the present invention can be mixed with a matrix resin (such as a thermosetting resin or a thermoplastic resin) so as to be suitably used in various applications such as an adhesive agent, a coating material, and a molded product.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. A method for producing a powdery and/or granular material, said method comprising:

an agglutinating step of preparing an agglutinate containing fine polymer particles (A) and a resin (B); and a drying step of airflow-drying or freeze-drying the agglutinate; wherein the agglutinating step further includes a fine polymer particle spraying step of spraying an aqueous latex containing the fine polymer particles (A) and the resin (B) in a presence of a flocculant, the fine polymer particles (A) contain a rubber-containing graft copolymer that includes an elastic body and a graft part grafted to the elastic body, the elastic body contains diene-based rubbers, the graft part contains a polymer that contains, as one or more structural units, the one or more structural units derived from at least one type of monomer selected from the group consisting of aromatic vinyl monomers, vinyl cyanide monomers, and (meth)acrylate monomers, the resin (B) is a liquid which has a viscosity of 100 mPa's to 1,000,000 mPa's at 25° C., a semisolid, or a solid, and an amount of the fine polymer particles (A) is 50% by weight to 99% by weight and an amount of the resin (B) is 1% by weight to 50% by weight, where 100% by weight represents a total amount of the fine polymer particles (A) and the resin (B).

2. The method as set forth in claim 1, wherein the agglutinating step further includes a flocculant spraying step of spraying the flocculant or a solution containing the flocculant in the presence of the fine polymer particles (A) and the resin (B).

3. The method as set forth in claim 1, wherein the drying step is carried out at a temperature of not higher than 100° C.

4. A method for producing a powdery and/or granular material, said method comprising a mixing step of mixing an aqueous latex (A) containing fine polymer particles (A) with an aqueous latex (B) containing a resin (B), and a preparation step of preparing a powdery and/or granular material containing the fine polymer particles (A) and the resin (B) from a mixture solution obtained in the mixing step, wherein:

the mixing step further includes an aqueous latex (B) preparation step of preparing the aqueous latex (B) containing the resin (B), wherein in the aqueous latex (B) preparation step, 1.0 parts by weight to 30.0 parts by weight of an emulsifying agent is added with respect to 100 parts by weight of the resin (B), and a stirring speed in the aqueous latex (B) preparation step is 3000 rpm to 40000 rpm, the fine polymer particles (A) contain a rubber-containing graft copolymer that includes an elastic body and a graft part grafted to the elastic body;

the elastic body contains diene-based rubbers;

the graft part contains a polymer that contains, as one or more structural units, the one or more structural units derived from at least one type of monomer selected from the group consisting of aromatic vinyl monomers, vinyl cyanide monomers, and (meth)acrylate monomers;

the resin (B) is a liquid which has a viscosity of 100 mPa's to 1,000,000 mPa's at 25° C., a semisolid, or a solid;

the powdery and/or granular material contains the fine polymer particles (A) in an amount of 50% by weight to 99% by weight and the resin (B) in an amount of 1% by weight to 50% by weight, with respect to 100% by weight in total of the fine polymer particles (A) and the resin (B); and the mixture solution contains droplets having a volume-average particle size of not less than x−σ and not more than x+5σ in an amount of 0.0% by weight to 14.0% by weight, with respect to 100% by weight of the resin (B) in the mixture solution, where x (μm) is a volume-average particle size of droplets in the aqueous latex (B), and σ is a standard deviation of the volume-average particle size of droplets in the aqueous latex (B).

5. The method as set forth in claim 1, wherein a force required to break a block of the powdery and/or granular material is not more than 30000 Pa, where:

the block is a block obtained by applying, to the powdery and/or granular material which is being allowed to stand, a load of 6.3 kg at 60° C. for 2 hours by placing a 6.3 kg weight on 30 g of the powdery and/or granular material contained in a cylindrical container having a diameter of 50 mm; and the force is a value obtained by measurement using a rheometer.

6. The method as set forth in claim 1, wherein a volume-average particle size of the fine polymer particles (A) is not more than 0.23 μm.

*   *   *   *   *